US010366378B1

(12) United States Patent
Han et al.

(10) Patent No.: US 10,366,378 B1
(45) Date of Patent: Jul. 30, 2019

(54) PROCESSING TRANSACTIONS IN OFFLINE MODE

(71) Applicant: Square, Inc., San Francisco, CA (US)

(72) Inventors: Koun Han, San Francisco, CA (US); Michael Wells White, San Francisco, CA (US); Paul Abraham Botros, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 94 days.

(21) Appl. No.: 15/199,466

(22) Filed: Jun. 30, 2016

(51) Int. Cl.
G06Q 20/20 (2012.01)
G06K 7/00 (2006.01)

(52) U.S. Cl.
CPC ......... G06Q 20/204 (2013.01); G06K 7/0004 (2013.01); G06Q 20/202 (2013.01)

(58) Field of Classification Search
CPC .................................................... G06Q 20/20
USPC .......................................................... 705/17
See application file for complete search history.

(56) References Cited

U.S. PATENT DOCUMENTS

| 5,692,233 | A  | 11/1997 | Garman |
| 5,778,173 | A  | 7/1998 | Apte |
| 5,892,900 | A  | 4/1999 | Ginter et al. |
| 6,096,096 | A  | 8/2000 | Murphy et al. |
| 6,259,672 | B1 | 7/2001 | Lohrbach |
| 6,328,208 | B1 | 12/2001 | Artino et al. |
| 6,693,897 | B1 | 2/2004 | Huang |
| 6,725,444 | B2 | 4/2004 | Fergus |
| 6,975,717 | B1 | 12/2005 | Smith et al. |
| 6,980,638 | B1 | 12/2005 | Smith et al. |
| 7,092,380 | B1 | 8/2006 | Chen et al. |
| 7,096,003 | B2 | 8/2006 | Joao et al. |

(Continued)

FOREIGN PATENT DOCUMENTS

| CA | 2 879 290 A1 | 1/2014 |
| CA | 2 903 983 A1 | 9/2014 |

(Continued)

OTHER PUBLICATIONS

Advisory Action dated Mar. 3, 2017, for U.S. Appl. No. 15/087,581, of Quigley, O.S.C., et al., filed Mar. 31, 2016.

(Continued)

Primary Examiner — Russell S Glass
(74) Attorney, Agent, or Firm — Lee & Hayes, P.C.

(57) ABSTRACT

In some examples, methods and systems may process one or more payment transactions between a merchant and a buyer by detecting buyer's communication device as an instrument to approve or reject a payment transaction in offline mode. The method includes detecting at least one transaction activity associated with a payment system, establishing a communication channel between the POS terminal an RF communication device in proximity to the POS terminal to obtain at least one device characteristic of the communication device, related to the operational or physical features of the communication device; generating a digital fingerprint based in part on the obtained device characteristic and the information related to received payment object; determining whether the digital fingerprint substantially compares to an existing fingerprint in a database and if the existing fingerprint is substantially similar to the digital fingerprint, rejecting the payment transaction through presence of the communication device.

28 Claims, 14 Drawing Sheets

(56) References Cited

U.S. PATENT DOCUMENTS

| | | |
|---|---|---|
| 7,466,689 B1 | 12/2008 | Halpern et al. |
| 7,478,266 B2 | 1/2009 | Gatto et al. |
| 7,610,040 B2 | 10/2009 | Cantini et al. |
| 7,707,089 B1 | 4/2010 | Barton et al. |
| 7,752,135 B2 | 7/2010 | Brown et al. |
| 7,835,942 B1 | 11/2010 | Pavlic et al. |
| 7,866,546 B1 | 1/2011 | Vance |
| 8,041,338 B2 | 10/2011 | Chen et al. |
| 8,223,951 B1 | 7/2012 | Edelhaus et al. |
| 8,224,709 B2 | 7/2012 | Hirson |
| 8,396,808 B2 | 3/2013 | Greenspan |
| 8,494,478 B1 | 7/2013 | Ponnangath |
| 8,499,355 B1 * | 7/2013 | Goncharov ............. G06F 21/44 726/25 |
| 8,608,064 B2 | 12/2013 | Xu et al. |
| 8,635,117 B1 | 1/2014 | Acuna-Rohter |
| 8,635,354 B2 | 1/2014 | Martino et al. |
| 8,660,911 B2 | 2/2014 | Hirson et al. |
| 8,694,438 B1 | 4/2014 | Jernigan et al. |
| 8,724,815 B1 | 5/2014 | Roth et al. |
| 8,868,859 B2 | 10/2014 | Schmidt et al. |
| 8,964,533 B2 | 2/2015 | Moore et al. |
| 8,990,121 B1 | 3/2015 | Guise et al. |
| 9,037,491 B1 | 5/2015 | Lee |
| 9,466,055 B2 | 10/2016 | Kulasooriya et al. |
| 9,569,767 B1 | 2/2017 | Lewis et al. |
| 9,741,035 B1 | 8/2017 | White et al. |
| 9,881,302 B1 | 1/2018 | White et al. |
| 9,911,110 B2 | 3/2018 | Scott et al. |
| 10,002,198 B2 | 6/2018 | Felt et al. |
| 10,037,517 B1 | 7/2018 | Chi et al. |
| 10,037,521 B1 | 7/2018 | Botros et al. |
| 10,055,721 B1 | 8/2018 | Mocko et al. |
| 10,055,722 B1 | 8/2018 | Chen et al. |
| 10,217,110 B1 | 2/2019 | Chen et al. |
| 2001/0019614 A1 | 9/2001 | Madoukh |
| 2001/0051920 A1 | 12/2001 | Joao et al. |
| 2002/0016769 A1 | 2/2002 | Barbara et al. |
| 2002/0132662 A1 | 9/2002 | Sharp et al. |
| 2002/0156727 A1 | 10/2002 | LeVake et al. |
| 2002/0194137 A1 | 12/2002 | Park et al. |
| 2002/0194590 A1 | 12/2002 | Pong |
| 2003/0005251 A1 | 1/2003 | Wilson et al. |
| 2003/0009382 A1 | 1/2003 | D'Arbeloff et al. |
| 2003/0046235 A1 | 3/2003 | Lacivita et al. |
| 2003/0105688 A1 | 6/2003 | Brown et al. |
| 2003/0112942 A1 | 6/2003 | Brown et al. |
| 2003/0120608 A1 | 6/2003 | Pereyra |
| 2003/0191709 A1 | 10/2003 | Elston et al. |
| 2003/0204560 A1 | 10/2003 | Chen et al. |
| 2003/0222138 A1 | 12/2003 | Oppenlander et al. |
| 2004/0015954 A1 | 1/2004 | Tuerke et al. |
| 2004/0034684 A1 | 2/2004 | Payne |
| 2004/0088737 A1 | 5/2004 | Donlan et al. |
| 2004/0107356 A1 | 6/2004 | Shamoon et al. |
| 2004/0112959 A1 | 6/2004 | Jun |
| 2004/0122685 A1 | 6/2004 | Bunce |
| 2004/0168055 A1 | 8/2004 | Lord et al. |
| 2004/0210519 A1 | 10/2004 | Oppenlander et al. |
| 2004/0210566 A1 | 10/2004 | Smith et al. |
| 2005/0033688 A1 | 2/2005 | Peart et al. |
| 2005/0134683 A1 | 6/2005 | Quintana et al. |
| 2005/0279827 A1 | 12/2005 | Mascavage et al. |
| 2006/0031466 A1 | 2/2006 | Kovach |
| 2006/0034255 A1 | 2/2006 | Benning et al. |
| 2006/0036134 A1 | 2/2006 | Tarassenko et al. |
| 2006/0036541 A1 | 2/2006 | Schleicher |
| 2006/0039290 A1 | 2/2006 | Roden et al. |
| 2006/0059268 A1 | 3/2006 | Victor et al. |
| 2006/0123088 A1 | 6/2006 | Simmons et al. |
| 2006/0143239 A1 | 6/2006 | Battat et al. |
| 2006/0218228 A1 | 9/2006 | Mouline |
| 2006/0253338 A1 | 11/2006 | Metzger |
| 2007/0051794 A1 | 3/2007 | Glanz et al. |
| 2007/0106558 A1 | 5/2007 | Mitchell et al. |
| 2007/0150387 A1 | 6/2007 | Seubert et al. |
| 2007/0194110 A1 | 8/2007 | Esplin et al. |
| 2007/0194113 A1 | 8/2007 | Esplin et al. |
| 2007/0223408 A1 | 9/2007 | Thielke et al. |
| 2007/0255617 A1 | 11/2007 | Maurone et al. |
| 2007/0274291 A1 | 11/2007 | Diomelli |
| 2007/0280288 A1 | 12/2007 | Ma |
| 2008/0035725 A1 | 2/2008 | Jambunathan et al. |
| 2008/0052233 A1 | 2/2008 | Fisher et al. |
| 2008/0091944 A1 | 4/2008 | von Mueller et al. |
| 2008/0097851 A1 | 4/2008 | Bemmel et al. |
| 2008/0126213 A1 | 5/2008 | Robertson et al. |
| 2008/0189186 A1 | 8/2008 | Choi et al. |
| 2008/0208681 A1 | 8/2008 | Hammad et al. |
| 2008/0219453 A1 | 9/2008 | Chang et al. |
| 2008/0223918 A1 | 9/2008 | Williams et al. |
| 2008/0270302 A1 | 10/2008 | Beenau et al. |
| 2008/0275760 A1 | 11/2008 | Easterly et al. |
| 2008/0283590 A1 | 11/2008 | Oder, II et al. |
| 2008/0283592 A1 | 11/2008 | Oder, II et al. |
| 2009/0004998 A1 | 1/2009 | Aaron |
| 2009/0030885 A1 | 1/2009 | DePasquale et al. |
| 2009/0063339 A1 | 3/2009 | Santora |
| 2009/0094126 A1 | 4/2009 | Killian et al. |
| 2009/0245268 A1 | 10/2009 | Pugliese, IV |
| 2009/0248555 A1 | 10/2009 | Sada et al. |
| 2010/0021049 A1 | 1/2010 | Nikaido |
| 2010/0029265 A1 | 2/2010 | Khandekar et al. |
| 2010/0031049 A1 | 2/2010 | Shima et al. |
| 2010/0057612 A1 | 3/2010 | Wagenhals |
| 2010/0114744 A1 | 5/2010 | Gonen |
| 2010/0121726 A1 | 5/2010 | Coulter et al. |
| 2010/0169284 A1 | 7/2010 | Walter et al. |
| 2010/0267390 A1 | 10/2010 | Lin et al. |
| 2010/0293099 A1 | 11/2010 | Pauker et al. |
| 2010/0299220 A1 | 11/2010 | Baskerville et al. |
| 2010/0305993 A1 | 12/2010 | Fisher |
| 2010/0312617 A1 | 12/2010 | Cowen |
| 2010/0317318 A1 | 12/2010 | Carter et al. |
| 2010/0318446 A1 | 12/2010 | Carter |
| 2010/0325039 A1 | 12/2010 | Radu et al. |
| 2010/0327056 A1 | 12/2010 | Yoshikawa et al. |
| 2010/0332351 A1 | 12/2010 | Stone |
| 2010/0332400 A1 | 12/2010 | Etchegoyen |
| 2011/0016041 A1 | 1/2011 | Scragg |
| 2011/0016043 A1 | 1/2011 | Dornseif |
| 2011/0016054 A1 | 1/2011 | Dixon et al. |
| 2011/0035294 A1 | 2/2011 | Mizrah |
| 2011/0082798 A1 | 4/2011 | Michaud et al. |
| 2011/0084140 A1 | 4/2011 | Wen |
| 2011/0106936 A1 | 5/2011 | Galbreath et al. |
| 2011/0125566 A1 | 5/2011 | McLaughlin et al. |
| 2011/0128954 A1 | 6/2011 | Veenstra et al. |
| 2011/0131122 A1 | 6/2011 | Griffin et al. |
| 2011/0153438 A1 | 6/2011 | Dragt |
| 2011/0153453 A1 | 6/2011 | Ghafoor et al. |
| 2011/0154497 A1 | 6/2011 | Bailey, Jr. |
| 2011/0161233 A1 | 6/2011 | Tieken |
| 2011/0166997 A1 | 7/2011 | Dixon et al. |
| 2011/0196791 A1 | 8/2011 | Dominguez |
| 2011/0238473 A1 | 9/2011 | Sankolli et al. |
| 2011/0270761 A1 | 11/2011 | Graham, III et al. |
| 2011/0313925 A1 | 12/2011 | Bailey, Jr. |
| 2012/0030116 A1 | 2/2012 | Shirey et al. |
| 2012/0036076 A1 | 2/2012 | Vanderwall et al. |
| 2012/0078789 A1 | 3/2012 | Harrell |
| 2012/0084203 A1 | 4/2012 | Mehew et al. |
| 2012/0084210 A1 | 4/2012 | Farahmand |
| 2012/0101822 A1 | 4/2012 | Dinerstein |
| 2012/0109802 A1 | 5/2012 | Griffin et al. |
| 2012/0144461 A1 | 6/2012 | Rathbun |
| 2012/0166311 A1 | 6/2012 | Dwight et al. |
| 2012/0191522 A1 | 7/2012 | McLaughlin et al. |
| 2012/0191610 A1 | 7/2012 | Prasad |
| 2012/0233005 A1 | 9/2012 | White |
| 2012/0239556 A1 | 9/2012 | Magruder et al. |
| 2012/0265697 A1 | 10/2012 | Tuchman et al. |
| 2012/0271765 A1 | 10/2012 | Cervenka et al. |
| 2012/0284130 A1 | 11/2012 | Lewis et al. |

(56) References Cited

U.S. PATENT DOCUMENTS

| | | |
|---|---|---|
| 2012/0284187 A1 | 11/2012 | Hammad et al. |
| 2012/0310831 A1 | 12/2012 | Harris et al. |
| 2012/0330840 A1 | 12/2012 | Stinchcombe |
| 2013/0091042 A1 | 4/2013 | Shah et al. |
| 2013/0144701 A1 | 6/2013 | Kulasooriya et al. |
| 2013/0151405 A1 | 6/2013 | Head et al. |
| 2013/0159191 A1 | 6/2013 | Maiya et al. |
| 2013/0179281 A1 | 7/2013 | White et al. |
| 2013/0179352 A1 | 7/2013 | Dwyre et al. |
| 2013/0185124 A1 | 7/2013 | Aaron et al. |
| 2013/0185152 A1 | 7/2013 | Aaron et al. |
| 2013/0185208 A1 | 7/2013 | Aaron et al. |
| 2013/0189953 A1 | 7/2013 | Mathews |
| 2013/0198075 A1 | 8/2013 | Sakata et al. |
| 2013/0246187 A1 | 9/2013 | Chau et al. |
| 2013/0262307 A1 | 10/2013 | Fasoli et al. |
| 2013/0346175 A1 | 12/2013 | Muthu |
| 2013/0346244 A1 | 12/2013 | Nuzzi |
| 2014/0006194 A1 | 1/2014 | Xie et al. |
| 2014/0019274 A1 | 1/2014 | Hardin et al. |
| 2014/0019340 A1 | 1/2014 | Ruder et al. |
| 2014/0025958 A1 | 1/2014 | Caiman |
| 2014/0032415 A1 | 1/2014 | Lee et al. |
| 2014/0032470 A1 | 1/2014 | McCarthy et al. |
| 2014/0098671 A1 | 4/2014 | Raleigh et al. |
| 2014/0114853 A1 | 4/2014 | Guedj |
| 2014/0156534 A1 | 6/2014 | Quigley et al. |
| 2014/0172680 A1 | 6/2014 | Prabhu |
| 2014/0172700 A1 | 6/2014 | Teuwen et al. |
| 2014/0279518 A1 | 9/2014 | Acuna-Rohter |
| 2015/0081462 A1 | 3/2015 | Ozvat et al. |
| 2015/0095453 A1 | 4/2015 | Jain et al. |
| 2015/0170132 A1 | 6/2015 | Patel |
| 2015/0206416 A1 | 7/2015 | Marra et al. |
| 2015/0229623 A1 | 8/2015 | Grigg et al. |
| 2015/0278795 A1 | 10/2015 | Jiang et al. |
| 2015/0339660 A1 | 11/2015 | Meng et al. |
| 2015/0348040 A1 | 12/2015 | Bhorania et al. |
| 2015/0371216 A1 | 12/2015 | Olawale et al. |
| 2016/0007240 A1 | 1/2016 | Belghoul et al. |
| 2016/0094497 A1 | 3/2016 | Javed et al. |
| 2016/0110718 A1* | 4/2016 | Jajara .............. G06Q 20/322 705/44 |
| 2016/0335618 A1 | 11/2016 | Koh et al. |
| 2018/0357627 A1 | 12/2018 | Chen et al. |

FOREIGN PATENT DOCUMENTS

| | | |
|---|---|---|
| WO | 02/37219 A2 | 5/2002 |
| WO | 2012/037971 A1 | 3/2012 |
| WO | 2013/034953 A1 | 3/2013 |
| WO | 2014/014781 A1 | 1/2014 |
| WO | 2014/089288 A1 | 6/2014 |
| WO | 2014/138109 A1 | 9/2014 |

OTHER PUBLICATIONS

Final Office Action dated Mar. 9, 2017, for U.S. Appl. No. 14/578,765, of Chi, Y., et al., filed Dec. 22, 2014.
Notice of Allowance dated Sep. 18, 2017, for U.S. Appl. No. 14/271,379, of Lewis, J., et al., filed May 6, 2014.
Non-Final Office Action dated Oct. 4, 2017, for U.S. Appl. No. 14/578,765, of Chi, Y., et al., filed Dec. 22, 2014.
Non-Final Office Action dated Aug. 16, 2016, for U.S. Appl. No. 14/578,765, of Chi, Y., et al., filed Dec. 22, 2014.
Final Office Action dated Dec. 23, 2016, for U.S. Appl. No. 15/087,581, of Quigley, O.S.C., et al., filed Mar. 31, 2016.
Non-Final Office Action dated Jul. 8, 2016, for U.S. Appl. No. 15/087,581, of Quigley, O.S.C., et al., filed Mar. 31, 2016.
"Advancing Payment Security: MasterCard Contactless Security Overview," www.mastercard.com, retrieved from Internet URL: https://www.mastercard.com/contactless/doc/MasterCardContactless_SecurityFactSheet_2015.pdf, on Jun. 12, 2017, pp. 1-4.
Non-Final Office Action dated Jan. 2, 2015, for U.S. Appl. No. 14/271,379, of Lewis, J., et al., filed May 6, 2014.
Final Office Action dated Jun. 26, 2015, for U.S. Appl. No. 14/271,379, of Lewis, J., et al., filed May 6, 2014.
Non-Final Office Action dated Sep. 11, 2015, for U.S. Appl. No. 14/271,368, of Lewis, J., et al., filed May 6, 2014.
Non-Final Office Action dated Jan. 20, 2016, for U.S. Appl. No. 14/271,368, of Lewis, J., et al., filed May 6, 2014.
Non-Final Office Action dated Mar. 31, 2016, for U.S. Appl. No. 14/271,379, of Lewis, J., et al., filed May 6, 2014.
Non-Final Office Action dated Jul. 5, 2016, for U.S. Appl. No. 14/271,350, of Lewis, J., et al., filed May 6, 2014.
Final Office Action dated Jul. 29, 2016, for U.S. Appl. No. 14/271,368, of Lewis, J., et al., filed May 6, 2014.
Final Office Action dated Oct. 6, 2016, for U.S. Appl. No. 14/271,379, of Lewis, J., et al., filed May 6, 2014.
Notice of Allowance dated Oct. 13, 2016, for U.S. Appl. No. 14/271,368, of Lewis, J., et al., filed May 6, 2014.
Advisory Action dated Dec. 29, 2016, for U.S. Appl. No. 14/271,379, of Lewis, J., et al., filed May 6, 2014.
Final Office Action dated Jan. 18, 2017, for U.S. Appl. No. 14/271,350, of Lewis, J., et al., filed May 6, 2014.
Notice of Allowance dated Jun. 26, 2017, for U.S. Appl. No. 15/087,581, of Quigley, O.S.C., et al., filed Mar. 31, 2016.
Conkling, C., "General Credit Card (CC) Approval/Payment Process," Figure 2, dated Jan. 17, 2011, Retrieved from the Internet: URL<http://craigconkling.blogspot.com/2011/01/nfc-and-mobile-payment-initiative-4.html>, on Jun. 6, 2014, p. 1-1.
Conkling, C., "Mobile Trends Insight: NFC and the Mobile Payment Initiative-4," dated Jan. 17, 2011, Retrieved from the Internet URL: http://craigconkling.blogspot.com/2011/01/nfc-and-mobile-payment-initiative-4.html, on Jun. 6, 2014, pp. 1-15.
Cooper, D., et al., "Internet X.509 Public Key Infrastructure Certificate and Certificate Revocation List (CRL) Profile," Standards Track, pp. 1-151 (May 2008).
"Cryptography—PCI Encryption Key Management—Information Security Stack Exchange," published Jan. 1, 2011, XP055415553, Retrieved from the Internet URL: https://security.stackexchange.com/questions/1412/pci-encryptionkey-management, Retrieved on Oct. 13, 2017, pp. 1-3.
Denniswi, "How Can I change the Offline Mode Password in Microsoft Dynamice POS 2009?," Microsoft Dynamics, dated Nov. 8, 2011, Retrieved from the Internet URL: <https://community.dynamics.com/f/31/t/66698.aspx>, on Jun. 4, 2014, p. 1-1.
Evans, D. L., et al., "Security Requirements for Cryptographic Modules," FIPS PUB 140-2 Change Notices, pp. 1-69 (May 25, 2001).
Ferguson, R.B., "Passenger Hacks NYC computer system; The problem is more significant than GPS objections, according to the sofware engineer who hacked the system," eWeek, dated Dec. 28, 2007, Retrieved from the Internet URL: http://search.pro quest.com/printviewfile?accountid=14753, on Apr. 24, 2017, pp. 1-2.
"MasterCard and VeriFone Bring 'Tap & Go' Payments to Taxis," Wireless News, dated Nov. 15, 2006, Retrieved from the Internet URL: http://search.proquest.com/printviewfile?accountid=14753, on Apr. 24, 2017, pp. 1-2.
"Mobile payment," Wikipedia, dated Jul. 9, 2012. Retrieved from the Internet URL: https://en.wikipedia.org/w/index.php?title=Mobile_payment&oldid=501410747,on Feb. 27, 2018, pp. 1-8.
"Offline DB Support for POS," Stack Overflow, dated Jan. 24, 2013, Retrieved from the Internet URL: <http://stackoverflow.com/questions/14495935/offline-dbsupport-for-pos>, on Jun. 4, 2014, p. 1-2.
"Payment Card Industry (PCI) Hardware Security Module (HSM)," Security Requirements Version 1.0, XP055168869, pp. 1-26 (Apr. 2009).
Perez, S., "Revel Systems Debuts an iPad Point-Of-Sale in a Box," TechCrunch, dated Jun. 1, 2012, Retrieved from the Internet URL: <http://techcrunch.com/2012/06/27/revel-systems-debuts-an-ipad-point-of-sale-in-a-box>, on Jun. 4, 2014, pp. 1-5.
"PCI DSS compliant Key Management," published Jul. 31, 2011, XP055415555, Retrieved from the Internet URL: http://www.src-gmbh.de/pcinews/download/PCIWhitepaper-2011-07.pdf, on Oct. 13, 2017, pp. 1-3.

(56) References Cited

OTHER PUBLICATIONS

"Suncorp and live TaxiEpay to provider Mobile Payment Terminals for Hypercom," Anonymous Wireless News, dated Jun. 20, 2010, Retrieved from the Internet URL: http://search.pro quest. com/ printviewfile?accountid=14753, on Apr. 21, 2017, pp. 1-2.
Tanenbaum, A. S., "Distributed Systems: Principles and Paradigms (2nd Edition)," Pearson Prentice Hall, pp. 273-320 (2007).
"What is 'Offline Mode' and How Does It Work?," Vend, dated Dec. 20, 2011, Retrieved from the Internet URL: <http://support.vendhq. com/hc/enus/articles/201379940-What -is-Offline-Mode-and-how-does-it-work>, on Jun. 4, 2014, pp. 1-3.
"What is the Purpose of Retail Offline Sync Service and How Does It Work?," Microsoft Dynamics, dated Apr. 12, 2012, Retrieved from the Internet URL: <http://community.dynamics.com/ax/f/33/ p/77 406/149851.aspx>, on Jun. 4, 2014, p. 1-3.
Third Party Observation submitted for PCT Application No. PCT/ US2013/050345 on May 30, 2014.
Non-Final Office Action dated Jun. 13, 2014, in U.S. Appl. No. 13/786,262, of Scott J.B., et al., filed Mar. 5, 2013.
Non-Final Office Action dated Sep. 9, 2014, for U.S. Appl. No. 14/284,125, of Chen, G.H., et al., filed May 21, 2014.
Non-Final Office Action dated Dec. 19, 2014, in U.S. Appl. No. 13/786,262, of Scott J.B., et al., filed Mar. 5, 2013.
Final Office Action dated Jan. 15, 2015, for U.S. Appl. No. 14/284,125, of Chen, G.H., et al., filed May 21, 2014.
Non-Final Office Action dated Feb. 18, 2015, for U.S. Appl. No. 13/797,390, of Ruder, E., et al., filed Mar. 12, 2013.
Advisory Action dated Mar. 23, 2015, for U.S. Appl. No. 14/284,125, of Chen, G.H., et al., filed May 21, 2014.
Non-Final Office Action dated Jun. 5, 2015, for U.S. Appl. No. 14/284,125, of Chen, G.H., et al., filed May 21, 2014.
Final Office Action dated Aug. 12, 2015, for U.S. Appl. No. 13/797,390, of Ruder, E., et al., filed Mar. 12, 2013.
Non-Final Office Action dated Sep. 11, 2015, for U.S. Appl. No. 13/736,447, of Quigley, O.S.C., et al., filed Jan. 8, 2013.
Non-Final Office Action dated Sep. 11, 2015, in U.S. Appl. No. 13/786,262, of Scott J.B., et al., filed Mar. 5, 2013.
Final Office Action dated Oct. 6, 2015, for U.S. Appl. No. 14/284,125, of Chen, G.H., et al., filed May 21, 2014.
Examiner's Requisition for Canadian Patent Application No. 2,879,290, dated Nov. 9, 2015.
Final Office Action dated Mar. 24, 2016, in U.S. Appl. No. 13/786,262, of Scott J.B., et al., filed Mar. 5, 2013.
Non-Final Office Action dated Apr. 21, 2016, for U.S. Appl. No. 14/567,145, of White, M.W., et al., filed Dec. 11, 2014.
Examination Report No. 1 for Australian Patent Application No. 2014225973, dated May 6, 2016.
Advisory Action dated Jun. 1, 2016, in U.S. Appl. No. 13/786,262, of Scott, J.B., et al., filed Mar. 5, 2013.
Examination Report for European Patent Application No. 13859656. 4, dated Jun. 22, 2016.
Office Action for Canadian Patent Application No. 2,892,511, dated Jul. 19, 2016.
Non-Final Office Action dated Jul. 28, 2016, for U.S. Appl. No. 13/797,390, of Ruder, E., et al., filed Mar. 12, 2013.
Final Office Action dated Oct. 31, 2016, for U.S. Appl. No. 13/736,447, of Quigley, O.S.C., et al., filed Jan. 8, 2013.
Examination Report for European Patent Application No. 13819366. 9, dated Nov. 2, 2016.
Office Action for Canadian Patent Application No. 2,903,983, dated Nov. 4, 2016.
Final Office Action dated Dec. 29, 2016, for U.S. Appl. No. 14/567,145, of White, M.W., et al., filed Dec. 11, 2014.
Examiner's Requisition for Canadian Patent Application No. 2,879,290, dated Jan. 11, 2017.
Non-Final Office Action dated Feb. 16, 2017, for U.S. Appl. No. 14/274,481, of Chen, G.H., et al., filed May 9, 2014.
Non Final Office Action dated Mar. 3, 2017, for U.S. Appl. No. 14/567,118, of White, M.W., et al., filed Dec. 11, 2014.
Notice of Acceptance for Australian Patent Application No. 2014225973, dated Mar. 15, 2017.
Non-Final Office dated Mar. 24, 2017, for U.S. Appl. No. 14/495,390, of Botros, P.A., et al., filed Sep. 24, 2014.
Non-Final Office Action dated Apr. 6, 2017, for U.S. Appl. No. 14/274,524, of Mocko, C.L., et al., filed May 9, 2014.
Notice of Allowance dated Apr. 17, 2017, for U.S. Appl. No. 14/567,145, of White, M.W., et al., filed Dec. 11, 2014.
Final Office Action dated May 9, 2017, for U.S. Appl. No. 13/797,390, of Ruder, E., et al., filed Mar. 12, 2013.
Notice of Allowance for Canadian Patent Application No. 2,892,511, dated May 26, 2017.
Non-Final Office Action dated Jun. 2, 2017, for U.S. Appl. No. 13/786,262, of Scott, J.B., et al., filed Mar. 5, 2013.
Final Office Action dated Jun. 2, 2017, for U.S. Appl. No. 14/274,481, of Chen, G.H., et al., filed May 9, 2014.
Examination Report for European Patent Application No. 14760487. 0, dated Jun. 28, 2017.
Final Office Action dated Jul. 14, 2017, for U.S. Appl. No. 14/495,390, of Botros, P.A., et al., filed Sep. 24, 2014.
Advisory Action dated Sep. 13, 2017, for U.S. Appl. No. 14/274,481, of Chen, G.H., et al., filed May 9, 2014.
Notice of Allowance dated Sep. 15, 2017, for U.S. Appl. No. 14/567,118, of White, M.W., et al., filed Dec. 11, 2014.
Notice of Allowance dated Oct. 13, 2017, for U.S. Appl. No. 13/786,262, of Scott, J.B., et al., filed May 3, 2013.
Non-Final Office Action dated Oct. 31, 2017, for U.S. Appl. No. 14/274,481, of Chen, G.H., et al., filed May 9, 2014.
Final Office Action dated Nov. 1, 2017, for U.S. Appl. No. 14/274,524, of Mocko, C.L., et al., filed May 9, 2014.
Summons to attend oral proceedings for European Patent Application No. 13859656.4, dated Nov. 2, 2017.
Examiner's Requisition for Canadian Patent Application No. 2,903,983, dated Nov. 6, 2017.
Notice of Allowance for Canadian Patent Application No. 2,879,290, dated Jan. 9, 2018.
Advisory Action dated Jan. 31, 2018, for U.S. Appl. No. 14/274,524, of Mocko, C.L., et al., filed May 9, 2014.
Notification concerning the date of oral proceedings for European Patent Application No. 13819366.9, dated Mar. 5, 2018.
Notice of Allowance dated Apr. 6, 2018, for U.S. Appl. No. 14/578,765, of Chi, Y., et al., filed Dec. 22, 2014.
Notice of Allowance dated Apr. 9, 2018, for U.S. Appl. No. 14/495,390, of Botros, P.A., et al., filed Sep. 24, 2014.
Notice of Allowance dated Apr. 13, 2018, for U.S. Appl. No. 14/274,524, of Mocko, C.L., et al., filed May 9, 2014.
Notice of Allowance dated Apr. 24, 2018, for U.S. Appl. No. 14/284,125, of Chen, G.H., et al., filed May 21, 2014.
Final Office Action dated May 31, 2018, for U.S. Appl. No. 14/274,481, of Chen, G.H., et al., filed May 9, 2014.
Non-Final Office Action dated Aug. 7, 2018, for U.S. Appl. No. 13/736,447, of Quigley, O.S.C., et al., filed Jan. 8, 2013.
Advisory Action dated Aug. 31, 2018, for U.S. Appl. No. 14/274,481, of Chen, G.H., et al., filed May 9, 2014.
Non-Final Office Action dated Sep. 10, 2018, for U.S. Appl. No. 13/797,390, of Ruder, E., et al., filed Mar. 12, 2013.
Notice of Allowance dated Oct. 22, 2018, for U.S. Appl. No. 14/274,481, of Chen, G.H., et al., filed May 9, 2014.
Notice of Allowance for Canadian Patent Application No. 2,903,983, dated Oct. 24, 2018.
International Search Report and Written Opinion for International Patent Application No. PCT/US2013/050345, dated Oct. 4, 2013.
International Search Report and Written Opinion for International Patent Application No. PCT/US2013/073302, dated Apr. 18, 2014.
International Search Report and Written Opinion for International Patent Application No. PCT/US2014/020389, dated Jun. 17, 2014.
Extended European Search Report for European Patent Application No. 13859656.4, dated Sep. 4, 2015.
Extended European Search Report for European Patent Application No. 13819366.9 dated Feb. 19, 2016.
Extended European Search Report for European Patent Application No. 14760487.0 dated Jul. 7, 2016.

(56) References Cited

OTHER PUBLICATIONS

Final Office Action dated Feb. 1, 2019, for U.S. Appl. No. 13/736,447, of Quigley, O.S.C., et al., filed Jan. 8, 2013.
Non Final Office Action dated Feb. 14, 2019, for U.S. Appl. No. 16/105,918, of Chen, G.H., et al., filed Aug. 20, 2018.
Final Office Action dated Mar. 21, 2019, for U.S. Appl. No. 13/797,390, of Ruder, E., et al., filed Mar. 12, 2013.

\* cited by examiner

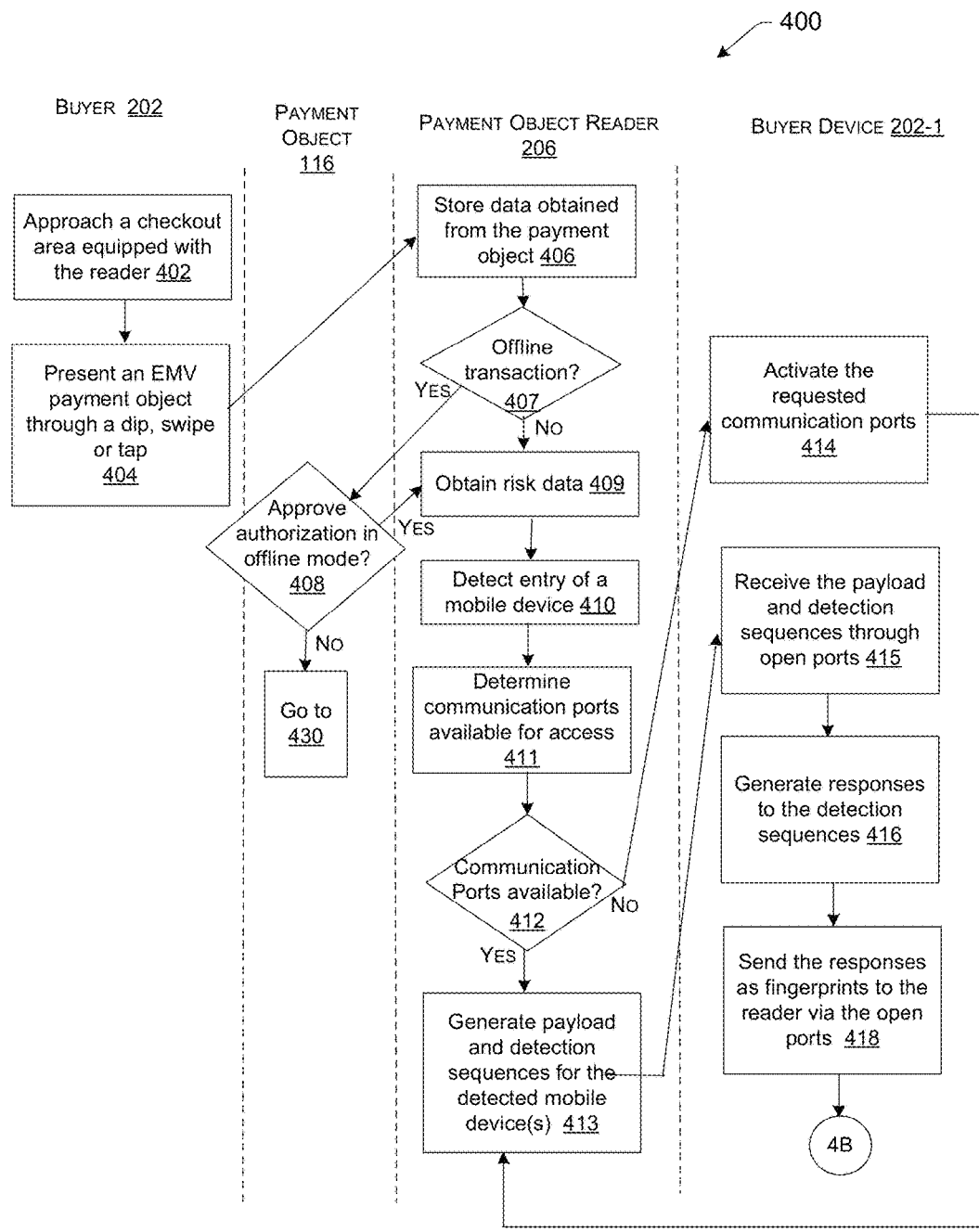

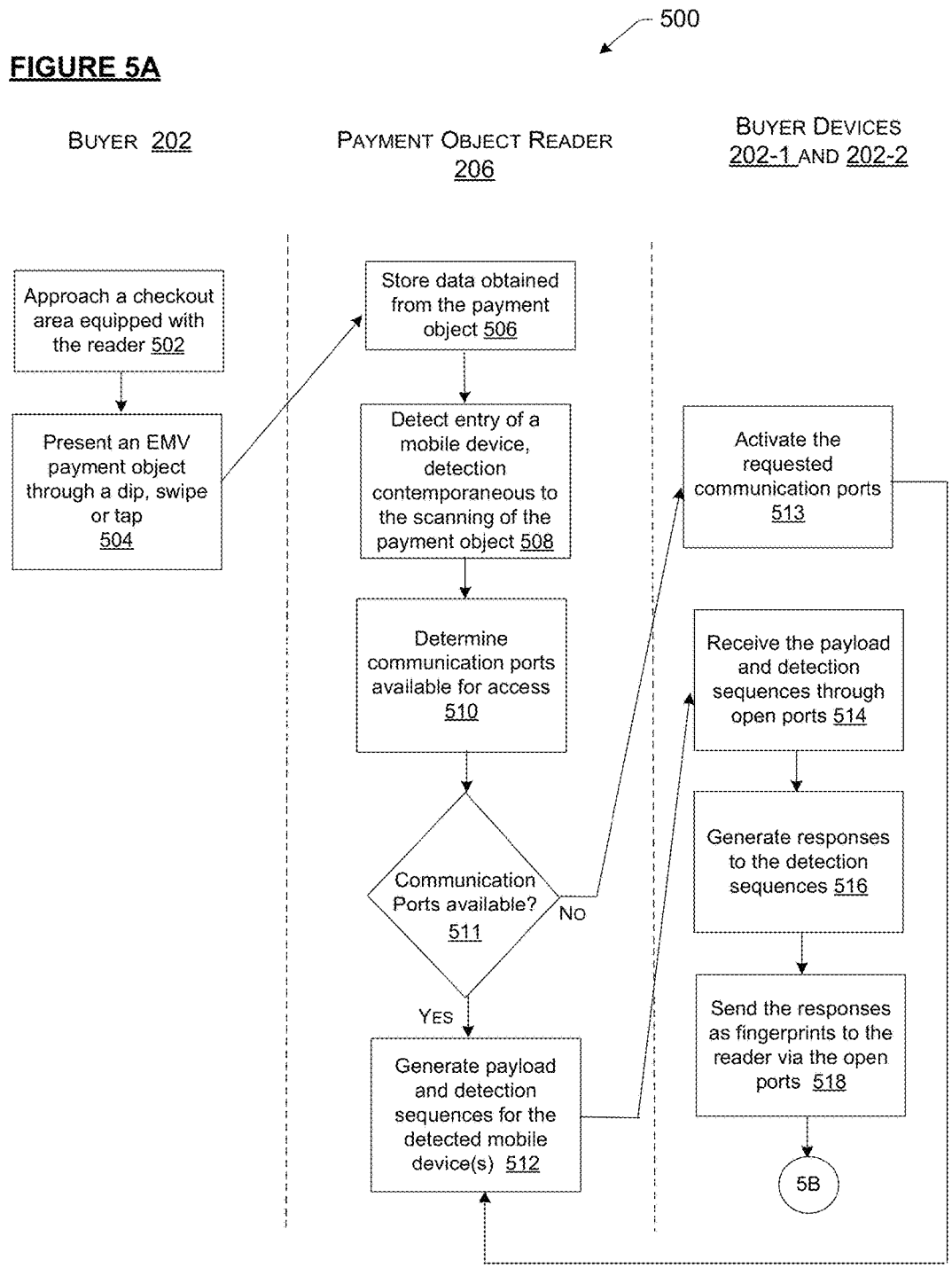

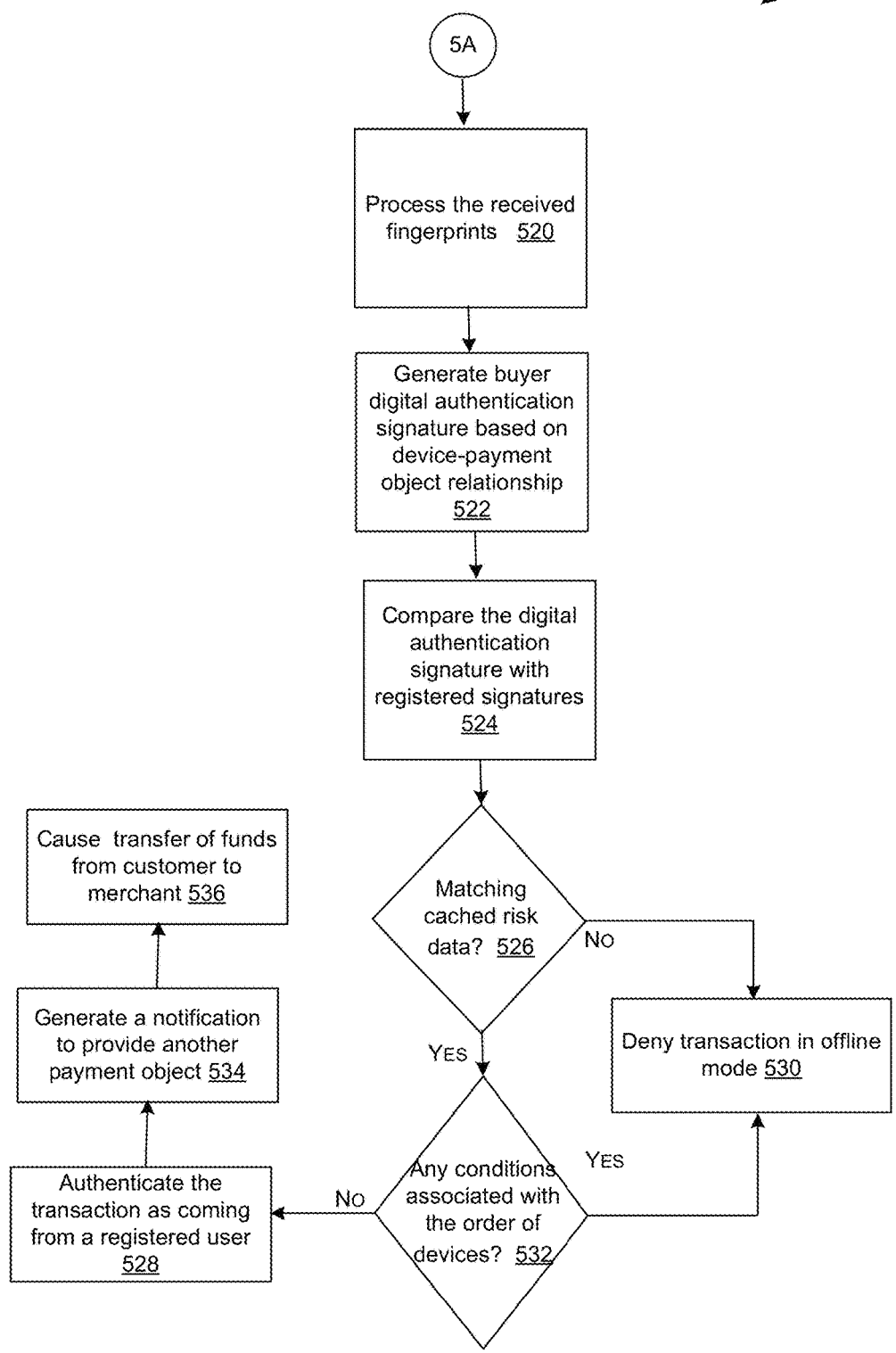

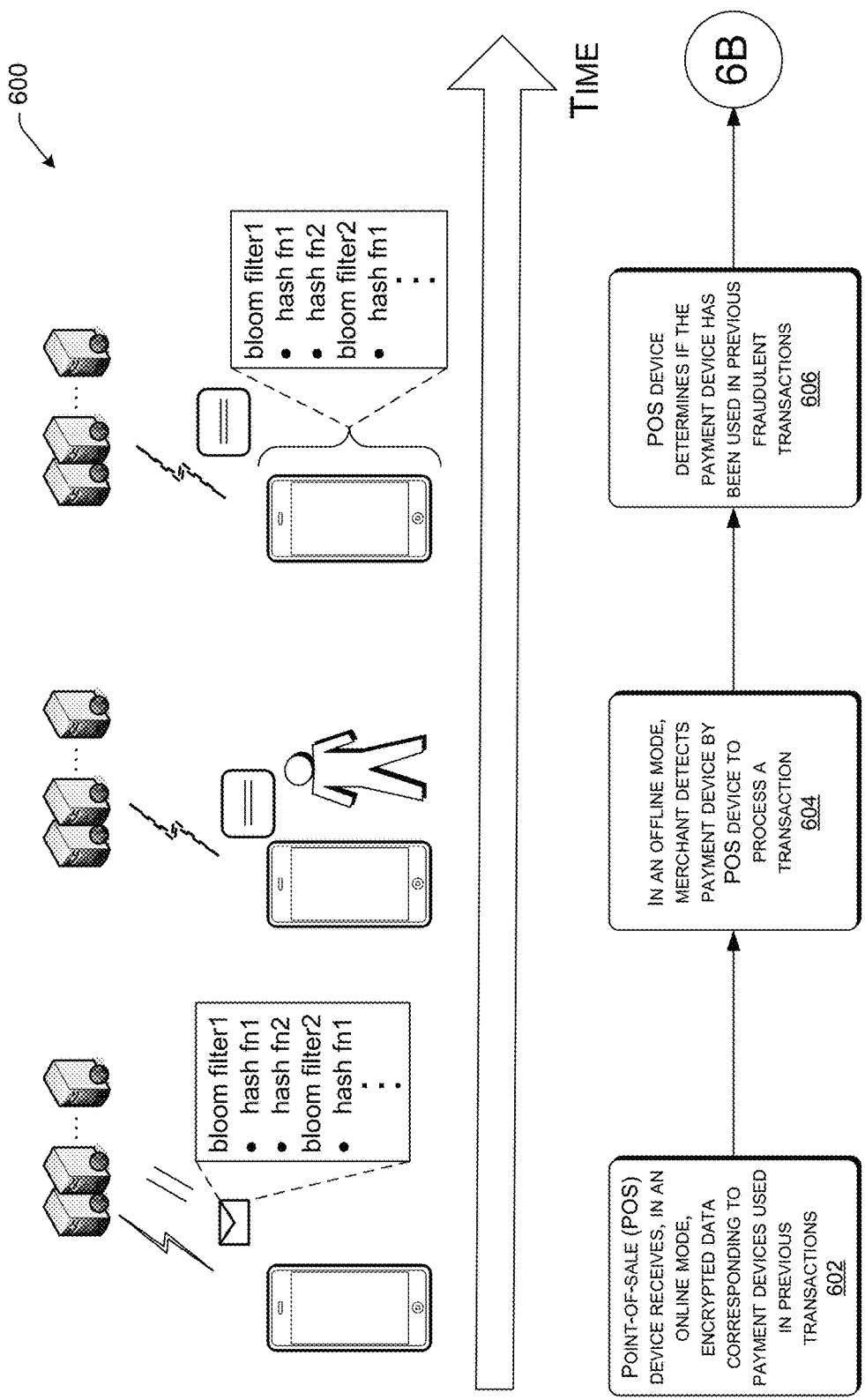

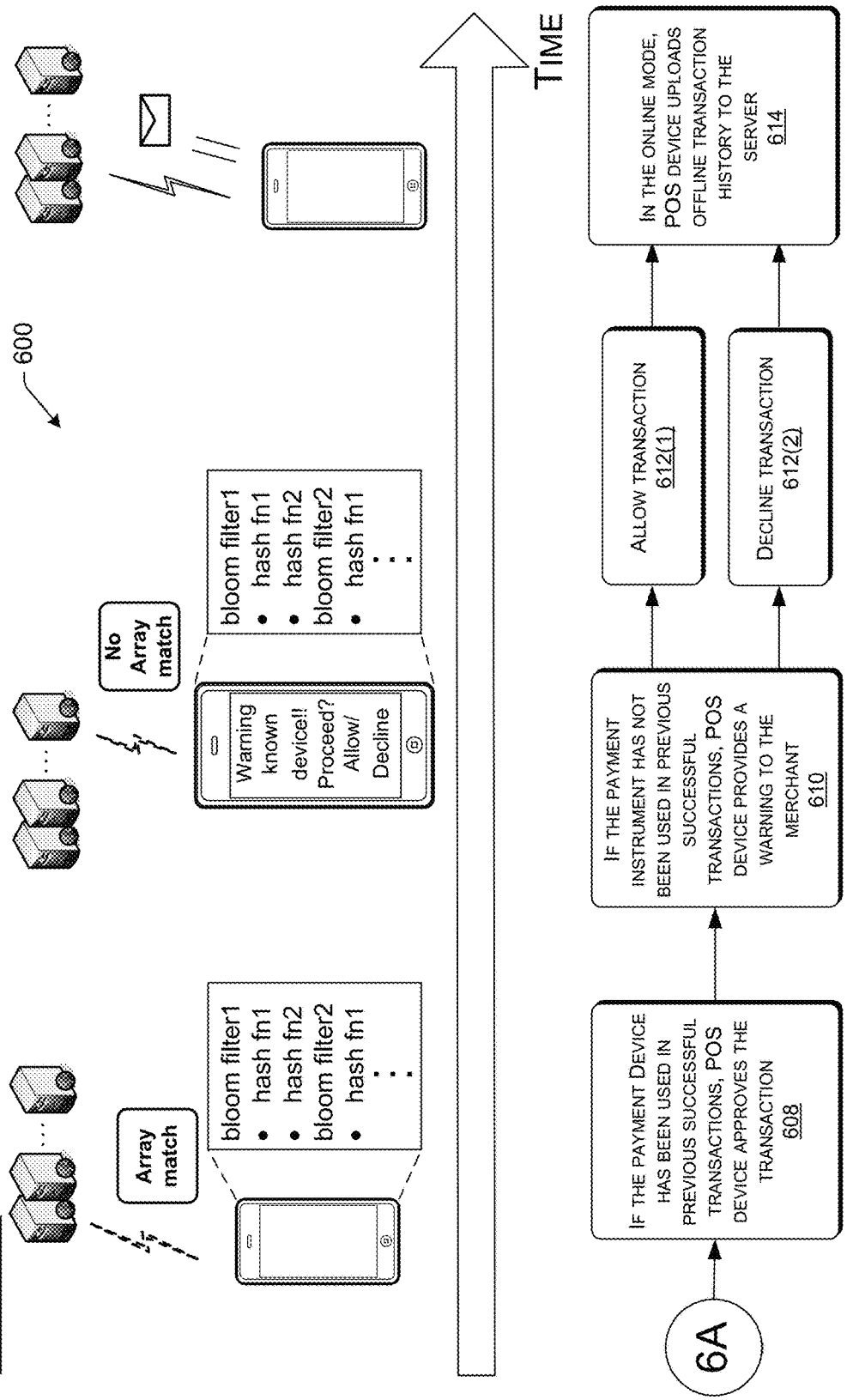

PROCESSING TRANSACTIONS IN OFFLINE MODE

TECHNICAL FIELD

Merchants often utilize an array of different point-of-sale (POS) devices, including mobile POS devices. Card readers are available to process electronic payment transactions initiated on the mobile POS devices associated with the merchants. The mobile POS devices are configured to operate in either an online mode or an offline mode. While in the online mode, the mobile POS device transmits transaction information from customers over the Internet at the time of the transaction. In the online mode, the merchant using the POS device knows if a transaction is successful (i.e., if a card is approved) prior to the customer departing the store.

In some markets where telecommunication costs are high, online authorizations can significantly increase costs, causing merchants to operate the POS devices in the offline mode. Also, in some situations, one of the devices may be in an area where the Internet connection is either unavailable or inconsistent. For example, consider a scenario in which a cab driver, who receives payment through a card reader connected to his mobile phone, drops a passenger in an area where cellular data network is unavailable. In the latter instances, when an operator of a POS device "swipes" a payment instrument, information regarding the payment instrument and a corresponding transaction are stored locally on the POS device for later sending to a remote service for authorization of the payment instrument (after the POS device transitions back to the online mode). Thus, while in the offline mode, a merchant does not know whether a payment instrument will be approved until well after the customer has left the merchant, the merchant may risk an unsuccessful transaction. Additionally, in such offline scenarios, cash is commonly considered to be faster at the point of sale for merchants than cards that require online authorization. Furthermore, the offline technology that applies to magnetic stripe cards cannot be implemented for chip-based cards as the governing protocols differ.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

FIGS. 4A and 4B are sequence diagrams illustrating a method of detecting a registered device at the time of authorization of an offline payment transaction, according to an embodiment of the present subject matter.

FIGS. 5A and 5B are sequence diagrams illustrating a method of detecting a cluster of registered devices at the time of authorization of an offline payment transaction, according to another embodiment of the present subject matter.

FIGS. 6A and 6B are sequence diagrams illustrating exemplary process for risk management in processing transactions occurring on a point-of-sale (POS) device when the device is in an offline mode, according to an embodiment of the present subject matter.

DETAILED DESCRIPTION

Figure 1:
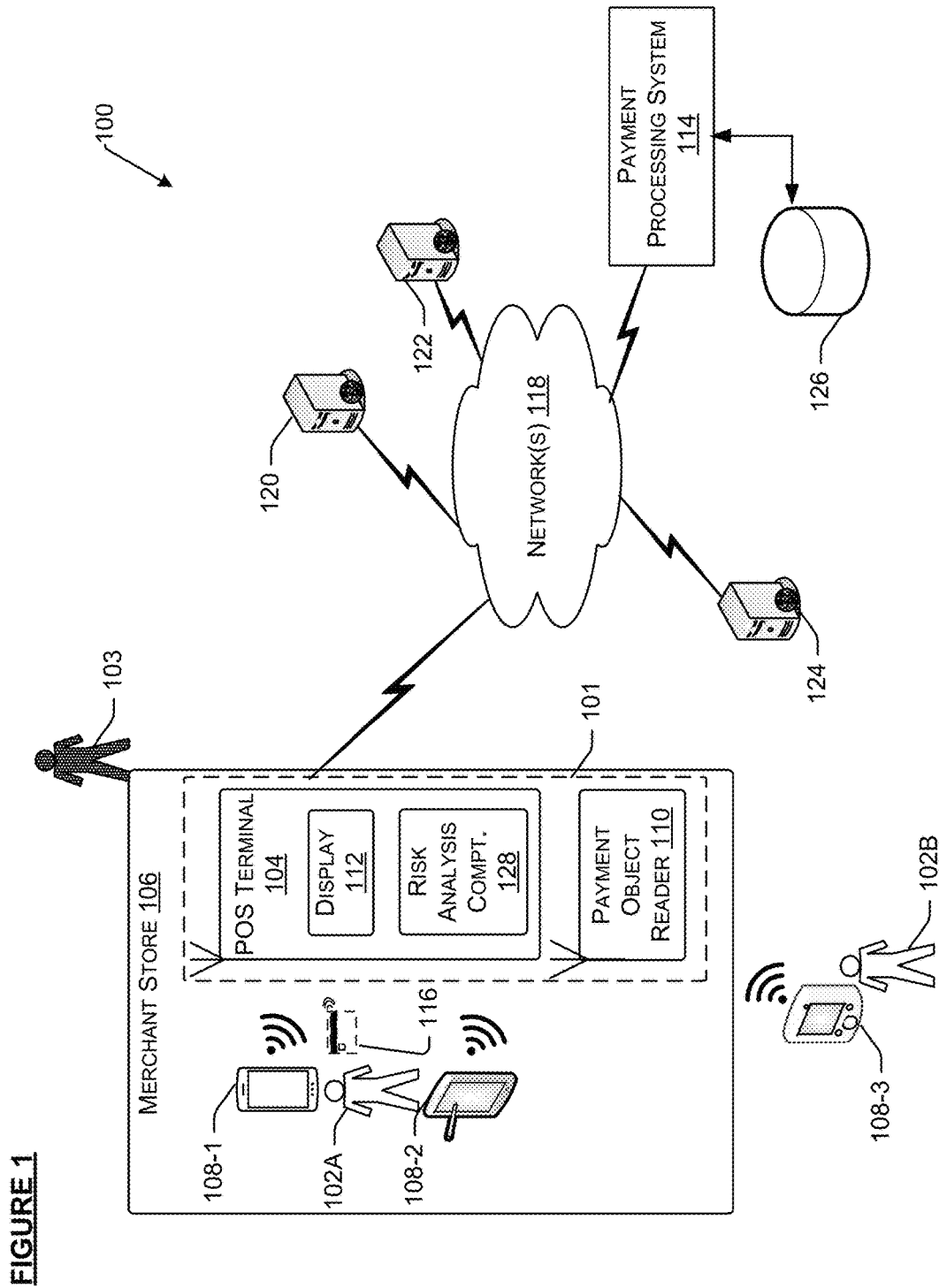
FIG. 1 is a network environment illustrating interaction between a point-of-sale (POS) terminal and a payment object reader, which when receives a method of payment, such as a chip-based credit card, in offline mode detects environmental parameters, e.g., a known device associated with high fraud risk, to reject a certain transaction, according to an embodiment of the present subject matter.

Some implementations described herein include techniques and arrangements for capturing and processing payments in an offline-mode, i.e., while at least one of the customer device and a merchant device (such as the point-of-sale (POS) terminal and/or the card reader) is offline with respect to a payment processor, particularly in a Europay-Mastercard-Visa (EMV) environment or contactless (Near-Field Communication or NFC) environment. The EMV environment can be defined as one where the payment instrument presented for a payment transaction has embedded therein an integrated-microcircuit or a "chip." Some implementations described herein include techniques and arrangements for detecting fraudulent transactions made by the merchant device, specifically in the offline mode, for example, by examining environmental parameters, such as signals being emitted from a recognized customer device at the time of payment, and other risk parameters corresponding to the merchant and/or the buyer, cached during previously established connection with a payment processing system (PPS), such as information corresponding to previously declined transactions.

Some implementations described herein include techniques and arrangements for managing the risk of fraudulent transactions made by the POS terminal operating in an online mode and applying similar logic in offline mode. In some instances, the PPS provides the POS device with up-to-date encrypted data associated with payment instrument identifiers. The encrypted data can include information associated with transactional data, such as whether an issuing bank or a card payment network (e.g., MasterCard®, VISA®, etc.) associated with the payment instrument has previously declined the payment instrument, customer shopping history (i.e., returning customer, frequency of transactions, amount spent on last transaction, amount spent for all transactions, member of a shopping reward program, etc.), customer information (i.e., name, address, income, etc.), and any other information which may be desirable to the merchant. In some instances, the PPS may send encrypted data in one or more bloom filters with one or more hash functions.

The disclosed methods and systems incorporate offline features disclosed in the EMV standard protocol specifications, including but not limited to: offline personal identification number (PIN) identification and offline transaction authorization for EMV transactions involving chip cards.

Generally, all EMV transactions include entry of a chip card followed by a personal identification number (PIN) to validate user's identity. This is hereinafter referred to as chip-and-PIN method. The validation of PIN can either be in the form of offline-PIN or online-PIN. The difference between an online and off-line PIN is that an online PIN is not stored on the card. For online PIN, once the cardholder enters the PIN at the point of sale terminal, the PIN is encrypted by the PIN pad and sent online to the host for validation, similar to how PIN debit transactions are authorized.

In an offline PIN situation, however, the PIN is stored securely on the chip card and during a transaction, when the cardholder enters the PIN, the POS terminal sends the PIN to the chip card for verification. The cardholder verification therefore takes place within the chip card. Thus, the EMV specification allows PIN validation to be performed between the payment card and the merchant device, eliminating the need to go online to verify the PIN.

Not all countries have adopted the chip-and-pin technology, some implementations use chip-and-signature, that is, they accept user's signature instead of PIN as proof of identity towards chip card payments. In the US, payment networks like VISA® have steered away from offline PIN and PIN in general and moved towards signature based validation.

To this end, implementations described herein include how PIN information is maintained and kept consistent between the card and the card issuer's host system by using an augmented PIN storage and verification methodology, particularly in offline mode.

Another provision of the EMV specification allows transactions to be authorized between the merchant device and the payment card with or without PIN validation. However, typically, the authorization is performed based on data residing either on the payment card and/or the conditions on the card reader that generally define an upper or lower floor limit of transactions that can be allowed. Card reader floor limits are generally set to zero in offline mode, which means all offline transactions are declined by the card reader unless the chip decides to approve them. Once the chip approves or declines the transaction, the POS terminal or the reader generally does not override chip's determination. Similar to PIN validation, traditionally, for a chip-based transaction, it is possible to authorize the payment using either an online or offline process, at least as per the EMV standard protocol. When online authorization is used, transaction information is sent to the card issuer for approval. When an offline process is used, the transaction information is transmitted from the terminal directly to the chip card itself for authorization by the chip. Transaction authorization is determined by issuer-defined risk parameters stored in the chip, rather than direct approval by the issuer. A hybrid process is also possible, whereby cardholder verification is conducted via offline PIN, and the transaction itself is authorized through online communication.

Few problems with this approach. One, chip based risk parameters do not consider risk parameters associated with the merchant, that particular customer involved in the transaction, or other known risk issues surrounding the merchant at that time. Such risk parameters are bound to change dynamically and can further improve the quality of risk scores generated by the chip to make a second determination of whether the offline transaction approved by the chip can indeed be approved.

Second, chip based risk parameters while secure are specific to the customer and are issued by the issuer based on customer's credit history, among other things. Additional risk parameters based on history of transactions associated with the merchant or the location of the terminal can be instrumental in risk score computation. As described herein, the risk scores however are distributed across various entities and so is the storage of risk parameters governing the scores. The distribution of risk scores makes risk parameters averse to fraudulent hacks and also provides a second layer or security in case the chip fails to provide offline transaction authorization. The implementations described herein allow for the offline transactions to be processed using an augmented approach of collecting and analyzing risk parameters corresponding to an arrangement of POS terminal, card reader and payment card, where offline transaction authorization is based on a risk heuristic model. The risk heuristic model can be implemented as a function of risk parameters, such as floor limit, random transaction selection value, and velocity checking, besides others, stored and verified by the chip on the payment card.

The risk parameters also include a cached copy of risk data obtained from the payment processing system (PPS). The risk data can be corresponding to the merchant, the buyer, the location of the store, and so on. A payment application executing on the POS terminal can obtain risk parameters from the PPS when online. The risk parameters can be stored either on the POS terminal or the card reader or both, say in a distributed manner. The cached risk data relates to, for example, the merchant that is party to the transaction. For example, risk data includes historical transaction data corresponding to transactions performed at the merchant's store location; historical transaction data corresponding to transactions performed at all store locations related to the merchant; historical transaction data corresponding to transactions related to all or specific merchants around the geographical location of transaction; historical transaction data corresponding to the time of the day; historical data corresponding to fraudulent, blacklisted customers (high-risk) or whitelisted (low-risk) customers specific to that merchant or the geographical location or areas surrounding it; historical transaction data corresponding to an average ticket price, and the like.

In some cases, where multiple transactions are being stored or approved in offline mode, the risk parameters also include a number of stored transactions, a value of the proposed stored transaction, and/or total value of all stored transactions in evaluating risk and determining whether the PPS can cover the transaction. The risk parameters can be compared to maximum and minimum threshold levels.

In some implementations, the risk parameters can be signals emitted by a device or a cluster of devices of a customer or merchant recognized as fraudulent. The mobile device has device characteristics that can be characterized by engineering tolerances, hardware imperfections inherent to analog components of the device, radio frequency response to certain signals, which make it unique with respect to another seemingly similar device. Such device characteristics can be used for device identification or fingerprinting, and are in some ways manifestation of an individual's identity and can therefore be used verification and authorization of a method of payment that requests a buyer to confirm his or her identity. The signals emitted by a device recognized to be associated with a registered customer tagged as high-risk is processed as such. In other words, in offline mode, the transaction may be rejected. For this, the PPS also sends previously stored environmental fraud signals corresponding to the store location or the locations surrounding the merchant or corresponding to high-risk or low risk customers that may have visited the store location in the past.

In one implementation, the risk heuristic model and the parameters can be dynamically modified by the payment processing system. For example, the thresholds can be modified through a communication, e.g., in the background when there is an Internet connection, with the payment processing system. Some risk parameters can also be updated to weigh more than the others.

As mentioned before, the risk parameters are either saved locally on the merchant's POS or remotely in a server, such as the PPS. If the risk parameters are saved on the POS terminal, the POS terminal retrieves the risk parameters during an offline transaction to determine whether or not the offline transaction can be authorized in combination or after the risk analysis performed by the chip card. If the risk parameters are saved on the server in the PPS, the POS terminal obtains a copy of risk parameters whenever a connection is established. The cached copy corresponds to the last-known state of the risk parameters, where the last-known state of the risk parameters were cached at an instant when the network connection between the POS terminal and the PPS was last available. The POS terminal queries the PPS for risk parameters either at predetermined time intervals or at random intervals while the POS terminal is online with respect to the PPS. In other cases, the PPS constantly updates the risk parameters as long as and whenever POS terminal establishes network connection with the PPS. In some cases, the POS terminal can modify the query to restrict the caching of risk parameters to a subset of all risk parameters. For example, the merchant can be willing to take higher risk and allow more customers to use the offline option, the merchant can define such merchant preferences in the query.

In an example scenario, a customer approaches a geo-fence of a merchant equipped with a card reader connected to a mobile POS terminal, such as a mobile phone. The customer introduces a chip card into the card reader. The card reader extracts the payment card information and also searches the landscape to detect any device (e.g., a customer device) in proximity to the card reader. For example, the card reader uses radio communication techniques or other location detection techniques (triangulation, for example) to measure, for example, signal strength from the devices within the geo-fence and accordingly, detect a device or a cluster of devices surrounding the card reader. The card reader then obtains device characteristics, such as unique identifiers such as the serial number of a device, International Mobile Station Equipment Identifier (IMEI), Advertising Identifier (IDFA), and the like. The device characteristics also include device location, device type, manufacturing or engineering tolerances, timing parameters, associated behaviors, etc.

The disclosed methods and systems obtain and register characteristics of a communication device, e.g., buyer phones, wearable devices, and other communication devices associated with the buyer during a first transaction made with a buyer's credit card or debit card, or as part of a registration process included in an interactive receipt. The characteristics are device characteristics such as manufacturing or engineering tolerances, timing parameters, associated behaviors, etc. Once a relationship is made between the buyer's credit card and the communication device of the buyer at the time of transaction in an online mode, the buyer can authorize all subsequent transactions by ensuring that the communication device is present when performing transaction with the credit card even in the offline mode. The presence of the communication device in conjunction with the credit card, both registered in a central processor, is used to validate or authenticate the payment transaction without the buyer having to input a security code or presenting other form of credential information and in online and offline scenarios. This method is referred to as device fingerprinting and can also be used as a risk parameter in the risk heuristic model.

According to the implementation, the risk heuristic model generates a risk score corresponding to a chip card being inserted into the card reader. As mentioned before, the risk score is a combination of logic applied by the integrated circuit in the card, the card reader and the cached data stored on the POS terminal. This augmented system of approving and/or storing transactions for future approval is secure as the offline approval logic is distributed across various entities. Furthermore, the logic is no longer dependent on the chip card and issuer set fixed limits rather the logic is more flexible to consider both buyer and seller profiles in decision making.

One of the problems with all traditional credit card transactions is that once the card is activated, it remains that way until the card is reported lost or stolen or the account is canceled or closed. During this time, any fraudulent party that gets access to the credit card information can use the credit card to their benefit and continue to do so until the owner of the credit card finds out and reports, especially in offline mode where there is no way to connect with the issuing bank. While anti-fraud techniques, such as holograms, photo IDs, authorization codes, and signature matching are somewhat successful, such techniques still do not establish, with certainty, that the cardholder is indeed the card owner. Further, these techniques are difficult to implement in some cases, e.g., offline scenarios, where real-time validation and authentication of card owner's identity is generally not as prompt as it is in the online mode. Thus, chip cards come with issuer-applied checks, to authenticate the transactions, not provisionally but formally and completely in the offline mode. The logic for authorizing transactions in the offline mode is limited to the chip card alone and is generally based on static values of floor limits of transaction value, etc. The fraudsters are known to abuse the system by introducing new chip cards or visit new locations to trick the traditional EMV offline capabilities.

To avoid at least the aforementioned risks and to make the payment experience seamless even in offline scenarios involving EMV chip cards, the method and systems described herein disclose friction-less and secure payment authentication technology by fingerprinting devices in a new and unique way and using that information along with seller and buyer landscape information to make decisions regarding authorization of offline transactions. The technology is disclosed herein for methods and systems to identify and fingerprint communication devices based on physical, mechanical, electromechanical, and/or operational characteristics, and registering the devices (and a payment card) based on such parameters and treating them as payment authorization instruments. Then subsequently detecting presence of a buyer device or a cluster of devices at the time of transaction made by a card connected to the buyer device and using presence of such devices towards authentication of a payment transaction to securely and reliably process the buyer's transaction by retrieving the buyer's financial account associated with the swiped card. Device fingerprint is one of the many risk parameters that the POS terminal collects. The POS terminal also collects other risk parameters corresponding to the merchant, customer, or store location in question. For example, the POS terminal collects information related to declined transactions corresponding to the factors mentioned above.

In one implementation, the buyer registers his device or devices at the time of a first purchase, e.g., at the merchant's location, using the card reader provided for receiving a payment instrument. The registration, in one example, requires no intervention from the buyer and is automatically initiated when a payment is initiated through a payment object, such as a payment card, or an NFC-based payment object. The card reader, through a radio transmitter/receiver, detects the presence of a number of devices in proximity to the card reader.

To register a device as a payment authentication instrument, the card reader obtains device characteristics from all devices, or in some cases, only the device that is closest to the card reader, and computes a digital signature, for example, for the buyer's device and as a result, the buyer. To this end, the payment object reader explores how it can establish communication links with the device and in what ways. Accordingly, the payment object reader customizes detection sequences and payload meant to query the device in a number of ways. The payment object reader sends the detection sequences and payload to the buyer's device through the communication ports that are available to it. The payload and detection sequences are also designed to obtain various kinds of hardware and software information, such as transmission measurements for example, among other things a measurement of the phase error, of the frequency error, of the power and of the spectrum, RSSI, RSSI vs. frequency measurements. In reception measurements, bit error rates may be measured. In another example, the measurements correspond receiver diversity performance. In yet another example, the measurements relate to the mechanical defect of anomalies of embedded components, or engineering tolerances, timing parameters, and radio signal inaccuracies.

Various components in the buyer devices have features within a given tolerance or threshold. By threshold, the similar phone has to be within the following specifications, for example, within power dissipation. The values are selected based on weighing of each feature from a weight plane diagram. The more critical a feature, the smaller tolerance is assigned. While such devices may be similar in shape and form, as per the device fingerprinting applied here, such devices do not qualify as a similar and are indicated as such through the measurements.

At this time, the card reader may also request for financial information from the buyer. The buyer either manually enters the card details, swipes the card, or scans the card using a scanner therein. The card reader uploads the card information and connects the fingerprint with the card information, e.g., in a look-up table locally accessible via the card reader. This process registers the buyer's device fingerprints as a valid payment authentication instrument at that merchant location. The next time buyer purchases a product or service at the merchant's location using the card reader, the buyer can use the registered device since the device and card relationship is already established in the look-up table. Depending on the value of the card relationship, the values are adjusted.

Instead of locally storing the device fingerprints, the card reader can store the registered device information on a server accessible via local area network, or even to a remote server to allow merchants from various locations to access the authentication instruments. At the time of detection, the card reader can detect another phone based on stored fingerprints, such as the manufacturing tolerance range of the phone, which is a value unique to that phone. In another example, the card reader can detect another device based on its radiated performance. In some cases, the card reader detects a cluster or a combination of devices instead of a single device.

As described above, the disclosed technology enables the checkout process to be completed in a shorter amount of time with or without using a single user-initiated verification action. The friction-less purchasing technology reduces the overall interaction time and payment flow to less than 10 seconds by removing the need to entering authentication code every single time. Furthermore, the device fingerprinting enables detection of the computing device within a certain distance from the POS terminal, allowing the user to authorize the transactions with a single tap or click.

The devices can be registered as one or more authentication or authorization instruments in lieu of a conventional means of authorization, such as PIN number or any other code that can be duplicated by fraudulent means. Thus, on receiving the authentication from the computing devices, a payment processing system can authenticate payment transactions using the registered computing devices at any merchant location. In some implementations, the buyer need not provide any identification or use any personal device at the time of payment. As long as the buyer is in possession of a device associated with the payment instrument at a merchant location, the buyer can walk out with a product or service.

While the description hereinafter discusses payment instruments being EMV-chip enabled, it will be understood that any other instrument that has associated with it payment information can be used in the offline mode including magnetic stripe, contactless and mobile payments. Further, the payment instrument in the offline mode can be used for targeted advertising, delivering rewards and coupons, establishing pre-orders, facilitating delivery of orders, and the like, specifically in the offline mode. Owing to the unique and personalized risk analysis, payment transactions are less vulnerable to frauds. Further, the payment process leveraging the risk model in the offline mode is friction-less, easier, more efficient, and more convenient especially when compared to traditional methods of payment that require confirmation of identify or entry of PIN and comparison with a remote system through online channels. Further, according to the present subject matter, it is possible the methods and systems to authenticate payment transaction by confirming presence of environmental signals or a cluster of devices in proximity to the payment instrument. So, the payment transaction is authenticated when both a wearable watch and mobile phone, previously registered to represent the buyer, are present. If the wearable watch or the mobile phone is missing, the transaction maybe be denied in the offline mode. This clustering leads to a more robust design of authentication.

The US payments ecosystems is soon going to be the second biggest adopter of EMV in the world with over a million POS systems now accepting chip cards. Although the US at one time had only 25% of the world's card payments, it has consistently accounted for ~50% of total global fraud, dating back to 2003. A primary driver of this was the absence of EMV in the US. With EMV now rolling out, and shoring up fraud prevention capabilities for card present channels, fraud is likely to move to electronic commerce/card-not-present (CNP)/offline channels, thus highlighting the importance of disclosed methods and systems.

By default, EMV transactions take longer than mag-stripe transactions, because of the multiple data exchanges that need to occur during an EMV payment authorization. Moreover, the POS checkout time can be severely impacted, as consumers adjust to a very different user experience. This can mean longer queues, increasing wait times for customers or requiring additional investment as merchants add staff to reduce queue length. To this end, offline processing of transaction with a fraud protection through the risk models can help in improving the chip-enabled card experience by resorting to offline transactions that get approved locally or stored locally for future processing.

Online authorization allows for an additional layer of security and fraud protection, since most fraud mitigation tools function online, in real-time. Online authorization also simplifies chip production, encryption key management and merchant infrastructure, and it saves cost and reduces overall complexity. But as highlighted before, online authorization is not always possible as the devices may be offline or the buyer queues may be too long to process transactions online. The primary advantage of allowing offline authorization is that it is consistent with global standards, ensuring compatibility and interoperability with international issuers' payment devices. In addition, it allows for transaction authorization functionality even in the absence of online connectivity (e.g., at a ticket kiosk or a farmer's market) as in Europe where almost 7 percent of all transactions rely on offline authorization.

It should be noted generally that "offline" implementations are not necessarily only useful or relevant when a device cannot connect to a remote server or external network. That is, the term "offline" as used herein should generally be considered to relate to the use of a feature, an application or device without requiring the use of a remote server or an external network, even if such a remote server or external network is available. For example, for a variety of reasons, a user or other entity may choose to use a local or offline copy or instance of an application even when a remote server or external network is available and might enable the same or a similar application to be used in an online mode. Among many reasons, the use of a local or offline implementation may in some cases provide performance advantages when compared to the use of an online application that requires communication with one or more remote servers. In addition, in some cases applications, which are used offline or from a local device may perform some of their interactions locally, but may also perform some interactions using one or more remote servers, if such servers are available. For example, an application might access some set of its information using the local device and access other information from a remote device—this may be useful, as just one example, to enable an application to retrieve more up to date information if a remote server is available, even when the application is running primarily against information that is stored locally.

While the embodiments described herein may relate to brick-and-mortar retails stores using POS terminals, including self-checkout terminals, it will be understood that the embodiments can be extended to shopping at any e-commerce location, including online shopping via merchant websites or applications.

Various embodiments and implementations of the disclosed purchasing technology are now described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

As used herein, a merchant may include any business engaged in the offering of goods or services for acquisition by buyers. Actions attributed to a merchant may include actions performed by owners, employees, or other agents of the merchant and thus no distinction is made herein unless specifically discussed. In addition, as used herein, a buyer may include any entity that acquires goods or services from a merchant, such as by purchasing, renting, leasing, borrowing, licensing, or the like. Hereinafter, goods and/or services offered by merchants may be referred to as items. Thus, a merchant and a buyer may interact with each other to conduct a transaction in which the buyer acquires an item from a merchant, and in return, the buyer provides payment to the merchant, for example through a biometric payment instrument.

As used herein, a 'payment transaction' or simply 'transaction' may include a financial transaction for the acquisition of goods and/or services that is conducted between a buyer and a merchant. For example, when paying for a transaction, the buyer can provide the amount that is due to the merchant using a payment proxy. In other cases, the payment transaction includes transfer of money from one party to another for any number of reasons. Thus, while the description refers to as buyer and merchant as parties to the payment transaction, it will be understood that the parties can be a sender and a recipient, a land lord and a renter, a bank and a bank customer, a first friend and a second friend, and so on.

As used herein, "network" or "payment network" is a type of network that typically includes an issuer node such as an issuer server, and a terminal or more usually a plurality of terminals connected in the payment network e.g. by wireless or wired connections. Terminals can be POS terminals, merchant terminals, bank terminals, home computers, PDA, laptops, cell phones or mobile phones etc. Transmission across the network is subject to errors and/or a bandwidth limitation, in particular the present invention relates to networks in which update information of a financial transaction routed through the payment network to a payment device is subject to a bandwidth limitation. This bandwidth limitation can be due to the protocol that governs how a payment transaction is transmitted across the network. For example, the protocol may only allow a certain bit or byte size for certain messages such as those containing update information. In a payment network each financial transaction is routed at an application layer from the issuer node to the terminal. Components of the financial transaction are transferred from the terminal to the payment device. One component of the financial transaction delivered to the payment device is update information. The update information for the payment device is recorded in non-volatile memory on the payment device. The payment network may use message switching rather than packet switching. A financial transaction is then transferred as a message which is routed in its entirety and as a separate entity. Each message contains addressing information, and at each node or switch of the network this information is read and the transfer path to the next node or switch is decided. Typically each message is stored (usually on hard drive due to RAM limitations) before being transmitted to the next node or switch. Hence the payment network could be a 'store-and-forward' network.

The present subject matter can be described with reference to a financial transaction such as a purchase transaction using a pre-authorized balance, defined as an amount or value which the cardholder has so far used and a pre-authorized limit, defined as the amount or value which the cardholder can use which is "pre-authorized" or does not have to be subject to an on-line authorization request which would seek authorization for the transaction through a payment card system (such as the MasterCard® network) from the issuer bank (i.e. the bank which issued the card). Purchases by the cardholder valued under the difference between the "pre-authorized balance" and the "pre-authorized limit" called the "pre-authorized amount" may take place "offline" (i.e. without the need to go on-line for authorization). The non-volatile memory on the payment device stores the current balance, which represents the current accumulated value of transactions authorized and a pre-authorized limit, which represents the ceiling that the balance may not exceed and an account number associated with the account.

The term 'payment card' or 'payment object' refers to a payment mechanism that includes a conventional debit card, a conventional credit card, a prepaid gift card, or the like, a smartcard that has an embedded integrate circuit chip (e.g., Europay-MasterCard-visa (EMV) card), a proxy card, or any card that functions as a combination of any of these mechanisms. The term 'proxy card' as used herein refers to a card that may or may not bear a card number or an account number that appears to be that of a real credit or debit card account (i.e., it is in the correct format), but where that card/account number is actually only a proxy for the buyer's real card/account number. Additionally, the payment card used in the example above is a specific type of a financial instrument. Other types of financial instruments, other than the payment card, can be used to initiate the transfer of funds. A financial instrument can be a software instrument or virtual instrument, such as a virtual wallet. Other examples of payment card may also include a prepaid card, a gift card, a rewards card, a loyalty points' card, a frequent flyer miles card, a check, cash, or any other kind of payment instrument that holds financial value or provides a promise to pay at a later time. Payment card may also include a payment object, such as an electronic device configured to initiate contactless payment transactions, e.g., a key fob, a mobile device (such as a mobile device having an NFC tag). And finally, the payment object can also be a payment proxy having a syntax of a monetary indicator followed by a string of alphanumeric characters or in general, any identifier that is representative of the buyer or merchant's financial account. The payment proxy can be used in the context of and within a webpage as part of the web address, a social networking handle or username, a forum, a messaging application, and so on.

The term "chip card" is a microcircuit card designed to communicate with a device external to the card, also known as a terminal or reader. These cards are used to effect various types of transaction, such as payment transactions and cardholder authentication transactions, for example. Microcircuit cards for banking applications (credit cards, debit cards, etc.) are able to communicate with payment terminals, for example. The EMV protocol is the standard protocol most used worldwide, notably for enabling secure payment transactions to be effected by microcircuit cards.

The EMV protocol was designed to reduce the risk of fraud during a payment transaction by enabling authentication of the card and the cardholder. This authentication process uses a combination of cryptograms (or encrypted keys) and digital signatures and may require entry by the cardholder of a code (usually called the PIN or personal code).

Depending on the type of card used, the circumstances or the amount concerned, an EMV card can function in an online mode or in an offline mode. In the online mode, the EMV card is able to communicate via a terminal with the corresponding issuing entity (for example the bank that issued the card) in order to verify that the current transaction is legitimate. In contrast, in the offline mode, the EMV card applies pre-stored verification criteria to decide whether the transaction should be authorized or refused.

The term 'biometric payment instrument' is a type of payment object or financial instrument that is biometrically identifiable and initialized by a biometric characteristic, such as a person's finger (e.g., for fingerprint recognition), face, iris or retina, heartbeat, voice, etc.

The term "landing page," as used here, refers to a virtual location identified by a personalized location address that is dedicated to collect payments on behalf of a recipient associated with the personalized location address. The personalized location address can include the payment proxy discussed above. In some embodiments, the landing page is identified by a uniform resource locator (URL) that includes a payment proxy, where the URL is accessible through a web browser application installed on a client device of the sender. For example, the URL is www....com/$charityName. In another example, the URL is www....com/$aaron. In some embodiments, the landing page is identified by a graphical user interface (GUI) of a mobile payment application installed on a client device of the sender. For example, the GUI of the mobile payment application is dedicated to $charityName, where there can be multiple GUIs each dedicated to a different payment proxy.

The landing page is generated by the payment service system to receive, e.g., collect, one or more payments on behalf of the recipient from one or more senders. The sender can access the landing page, e.g., by entering a URL into a web browsing application installed on the sender's client device. Upon navigating to the URL, the sender can simply enter a payment amount, e.g., in a web form field, and send the money, e.g., by selecting a "Pay" action button displayed on the website. In another example, the sender can access the landing page, e.g., by selecting a GUI within a mobile payment service application, where the GUI, e.g., is labeled with the payment proxy $aaron. The sender can further enter a payment amount at the GUI and send the money, e.g., by selecting a "Pay" action button displayed on the GUI.

The term "forum," as used here, refers to a media channel (e.g., a social networking website, a microblog, a blog, etc.) that enables user interaction and engagement through comments, posts, and/or messages. The forum can be employed by a service provider to provide various services to users of the forum, e.g., create messages, post comments, interact with one another, etc. Within a forum context, a user can indicate an intent to transfer money by specifying a payment proxy in a message that the user submits, e.g., "posts," on a particular forum, where that payment proxy carries the syntax of the monetary indicator preceding one or more alphanumeric characters. For example, the user posts a message "I support $funnyguy311 with $10." In such an example, the payment service system detects the user's intent to send money, e.g., $10, to "$funnyguy311" and initiates the transfer of money upon identification of a recipient financial account associated with "$funnyguy311." The monetary indicator can correspond to various currencies, e.g., dollar ($), euro (€), pound (£), yuan (¥), etc. Although use of the dollar monetary indicator ($) is used herein, it is to be understood that any currency symbol could equally be used.

The term "registration application" or "mobile payment portal" as used here, refers to any messaging application that enables communication between users (e.g., sender and recipient of a message) over a wired or wireless communications network. A service provider that delivers a communication service to users, e.g., chat capability, can employ the messaging application. The messaging application can include, for example, a text messaging application for communication between phones (e.g., conventional mobile telephones or smartphones), or a cross-platform instant messaging application for smartphones and phones that use the Internet for communication. Within a messaging application context, a user can indicate an intent to transfer money by specifying a payment proxy in a TO field of, e.g., a message, that the user inputs within the messaging application. For example, the user enters into the TO field "$redcross." In another example, the user enters into the TO field "$aaron." Once the user enters a payment proxy, or input, into the TO field, the user can enter a message in a body of the message, e.g., "Here is $10," and send the message. In various embodiments, the message can be a text message, a chat message, an email message, or indeed any other type of message that is capable of being exchanged between computing devices. Although this specification may employ text messages as an example, it is to be understood that the payment proxy technology may employ any of these types of messages. Upon receiving an indication to send (e.g., after detecting that the user has clicked "Send"), the messaging application transmits a message, e.g., the text message to a messaging application computer system ("messaging application system"). The messaging application system detects that the input in the TO field of the message it has received includes a syntax of a monetary indicator preceding one or more alphanumeric characters. In response, the messaging application system forwards the text message to the payment service system for processing. The payment service system identifies a recipient associated with the input (or payment proxy) that is derived from the TO field, and further identifies a recipient financial account associated with that recipient. Upon identification of the recipient financial account, the payment service system initiates the transfer of money.

It is noted that the payment proxy technology is equally applicable in other embodiments to various other content providers and various other types of providers, such as financial service providers or to any application that involves communication of messages between users, and that the payment proxy technology is not limited to media channels and/or messaging applications.

The preceding summary is provided for the purposes of summarizing some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

Turning now to the Figures, FIG. 1 is a network environment 100 illustrating interaction between a point-of-sale (POS) system 101, comprising of a POS terminal 104 and a payment object reader 110, and a buyer 102A equipped with a chip card. Mobile devices 108-1 and 108-2 are associated with a buyer 102A and a device 108-3 associated with another buyer 102B in the vicinity, according to an embodiment of the present subject matter. The buyers 102A and 102B are collectively referred to as buyer 102. In an example scenario, the buyer 102A approaches the POS terminal 104 being manned by a merchant 103, to pay for a product or service in a dedicated checkout area within a merchant store 106.

In one example, each of the devices 108-1, 108-2 or 108-3 is a hand-held device such as a mobile phone, laptop, tablet computer, and the like, associated with a buyer making the purchase. In another example, the computing device 108 is a mobile device that is wearable or otherwise connected to or associated with the buyer, for example, the computing device may be an Apple® watch or a Fitbit®. The mobile device has device characteristics that can be characterized by engineering tolerances, hardware imperfections inherent to analog components of the device, radio frequency response to certain signals, which make it unique with respect to another seemingly similar device. The device characteristics can also be unique identifiers associated with the device, such as device name, device identification number, and the like. Such device characteristics can be used for device identification or fingerprinting, and are in some ways manifestation of an individual's identity and can therefore be used verification and authorization of a method of payment that requests a buyer to confirm his or her identity.

The POS terminal 104 can be an electronic cash register that is connected to a payment object reader 110 capable of accepting a variety of payment instruments, such as credit cards, debit card, gift cards, near-field communication (NFC) based payment instruments, and the like. The POS terminal 104 can be connected to a central processing server, hereinafter referred to as the payment processing system (PPS) 114, to obtain inventory of available products and services and risk parameters. The POS terminal 104 can work in both online and offline modes to allow the merchant 103 to both access the inventory and provisionally process payments whether or not the communication network between the PPS 114 is established or not. While the embodiments described hereinafter focus on the offline implementation, the description can be extended into online mode as well.

Offline means that the POS terminal 104 does not need to connect to a card issuer to receive transaction authorization, whereas online means the POS terminal 104 connects to the card issuer for transaction authorization. When EMV transaction is completed online, the card issuer provides command scripts to the POS terminal 104 to be delivered to the chip card 116. The command scripts perform functions that are not necessarily relevant to the current transaction, but are important for the continued functioning of the application in the chip card 116. Command script processing is provided to allow for functions that are outside the scope of the EMV specification and may be done differently by various issuers or payment systems. Examples of such functions may include unblocking of offline PIN, update of transaction counters, and so on.

In the example scenario, the merchant 103 (in case of a manned store) or the buyer 102 (e.g., in a self-checkout aisle) selects at least one product from the inventory displayed on a display 112 of the POS terminal 104 and moves on to a "check-out" page to finalize the purchase transaction. At this stage, the buyer 102 may provide a payment object 116, such as a payment card or instrument (e.g., debit, credit, prepaid, checks, etc.), cash (or its equivalent), securities, biometric payment instrument (based on any kind of biometric characteristic, e.g., fingerprints, voice print, speech patterns, facial geometry, facial image, genetic signature, retinal iris scan, etc.), virtual currency, rewards, points, miles, etc., and/or other payment options, into a payment object reader 110 to pay for the items purchased. In the implementations described herein, the payment object 116 is a chip card with integrated circuitry that is based on EMV protocol. In the online mode, the EMV card is able to communicate via a terminal with the corresponding issuing entity (for example the bank that issued the card) in order to verify that the current transaction is legitimate. In contrast, in the offline mode, the EMV card applies pre-stored verification criteria to decide whether the transaction should be approved/authorized or declined. As described herein, the pre-stored verification criteria is distributed amongst various entities, such as the payment object 116, the POS terminal 104 and the payment object reader 110.

The payment object reader 110 may be a magnetic stripe card reader, optical scanner, smartcard (card with an embedded IC chip) reader (e.g., an EMV-compliant card reader or NFC enabled reader), radio frequency identification (RFID) reader, or the like, configured to detect and obtain data off any payment object. Accordingly, the payment object reader 110 may include hardware implementation, such as slots, magnetic tracks, and rails with one or more sensors or electrical contacts to facilitate detection and acceptance of a payment object. Additionally or optionally, the payment object reader 110 may also include a biometric sensor to receive and process biometric characteristics and process them as payment instruments, given that such biometric characteristics are registered with the payment processing system 114 and connected to a financial account.

Going back to the example scenario, the buyer 102 presents an EMV based card 116 having an integrated circuit ("chip card") and inserts it into an EMV card reader 110. The term "insert" here refers to any manner of triggering the payment object reader 110 to read data from a payment object, such as by dipping into, tapping, bringing in close contact or passing a card into or through the payment object reader 110, such an EMV-compliant card reader. The EMV chip card 116 and the EMV card reader 110 are designed to adhere to standards defined in the EMV specification. In the implementations described herein, the reader 110 and the terminal 104 are offline with respect to the PPS 114.

The payment object 116 has embedded thereto risk parameters to apply if the transaction is being performed offline. The risk parameters include floor limit, random transaction selection value, and velocity checking, and risk data includes values corresponding to the risk parameters. For example, the card issuer may set the transaction floor limit to be $1000 in the integrated circuit, which prevents the terminal to authorize the transaction exceeding $1000. In another example, the issuer may set the number of offline transactions to 3 a day, which prevents the card terminal to authorize a fourth offline transaction in a day. The payment object 116 applies logic based on one or more of the risk parameters to determine whether or not to approve a transaction in offline mode and/or forward the transaction to online mode. If the offline transaction is approved by the chip 116, the POS terminal 104 and the reader 110 collectively analyze additional risk parameters to determine whether or not the transaction should be approved.

Thus, in addition to the verification and authorization performed by the payment object 116, the POS terminal 104 performs a separate verification based on risk data cached from the PPS 114 at an earlier time instant. For this, the POS terminal 104 queries the PPS 114 continually while it is online with respect to the payment processing system 114 to obtain risk data and stores within the POS terminal 104 or a local database connected thereto to access during processing of offline transactions. The collection of risk data or selection of parameters corresponding to which risk data is collected can be dependent on the merchant/seller or customer/buyer history. For example, the POS terminal 104 sends risk parameters such as merchant identity, geographical location of the merchant or terminal, etc., to the PPS 114. The POS terminal 104 then requests risk data corresponding to risk parameters, such as risk data corresponding to all transactions declined, all transaction declined at the merchant's geographical location, all transactions declined at merchant's in proximity to the merchant's geographical location, customer details corresponding to all transactions declined, the transactions declined in the zip code or city same as merchant's location, the transaction declined corresponding to the products or services being offered at the location, the transactions declined corresponding to known payment objects, and so on. For example, the location is likely to see higher fraud for high ticket items, so the risk data corresponding to high ticket items.

The payment object reader 110 also extracts relevant payment transaction data, i.e., information required for processing payment transactions, including, but not limited to, debit account information, credit cardholders name, credit card number, expiration date and card verification value (CVV), digital permanent account number (PAN), etc. The payment object reader 110 encrypts the payment transaction data to use for processing the transactions if the offline transaction is approved or authorized by the payment object 116 based on the risk parameters residing on the chip and the POS terminal and/or the reader.

In some implementations, the risk parameters include device fingerprints corresponding to known devices at the merchant location. For example, the device fingerprints corresponding to all known customers at the merchant location are obtained when the POS terminal is online. The device fingerprints are later used to determine risk in offline mode and determine whether or not the customer is recognized to be fraudulent.

While the implementations described herein discuss the cached data to be residing on the POS terminal 104, it will be understood that the cached data can also reside on the payment object reader 110 or can be distributed between the POS terminal 104 and the payment object reader 110. The PPS 114 can encrypt the cached data such that only the reader can decrypt the data using cryptographic keys. Furthermore, the cached data can saved and accessed through one or more bloom filters as is explained in detail in FIGS. 6-9.

As addressed in the present disclosure, in one scenario, the buyer 102A is asked to validate or authenticate the method of payment by providing a passcode, PIN or some other kind of identification to prove that the buyer 102A who is in possession of the payment object is in fact authorized to make purchases with that object. Generally, passcode based authentication mechanisms may be easy to emulate by fraudsters to impersonate the buyer and get past the authentication hurdle. Furthermore, generally, the PIN is compared to a copy of PIN stored on a remote server or at the issuing bank. In offline mode, however, the PIN cannot be validated with server stored value at the time of transaction. To this end, the methods and systems described herein disclose the payment object reader 110 which assumes that a particular transaction is both authenticated and authorized or approved if the buyer 102A involved in the transaction is in possession of a recognized device and by analyzing other risk parameters stored as cached data. In some implementations, the authentication can be based on comparison of a customer entered PIN with a PIN stored in the chip of the payment object 116, optionally followed by a secondary authentication through device fingerprint. The following paragraphs describe how the methods and systems may make such detection. To allow detection of device fingerprint in the offline mode for purposes of authentication and/or authorization of offline transaction, the device fingerprint is first obtained when the customer first interacts with a payment object reader 110 or POS terminal 104 associated with the PPS 114. The POS system 101 that obtains device fingerprints does not have to be the same device where the customer is currently performing the transaction. The customer may have visited a different merchant or store location at an earlier time to register his or her device either voluntarily, e.g., through interaction with a payment application, or through explicit approval of registration. In another example, the customer can register his device simply through interaction with a POS system, like POS system 101.

The following sections describe how payment object reader 110 obtains device fingerprints both at the time of registration of the device and at the time of authorization of offline transactions. In one implementation, the payment object reader 110 includes device detection components (not shown) including, but not limited to, sensors, detectors, radio frequency transmitters and/or receivers. By leveraging the sensing capabilities of these components, the payment object reader 110 scans and receives information from devices 108-1, 108-2 and 108-3 (referred to as computing device(s) 108) surrounding the payment object reader 110. As shown, some devices may be outside the actual store but within the geo-fence established by the merchant 103. In another implementation, the payment object reader 110 receives information from all computing devices 108 irrespective of their distance from the payment object reader 110. In another implementation, the payment object reader 110 may query or target a specific reader, for example device(s) 108-1 and 108-2 within a geographical or logical fence or having a specific IMEI or MAC address, etc.

In one implementation, the payment object reader 110 extracts information related to the computing devices 108 with or without an explicit authorization from the devices 108 to share or exchange information through wired or wireless pairing or other such mechanisms. In some cases, multiple devices 108 may be connected to a single user, and the payment object reader 110 detects presence of all devices or a combination of devices 110 to determine identity of the buyer and as a result, the authenticity of a payment object user.

By detecting the buyer's device and confirming that the buyer's device belongs to the right buyer/customer or the registered buyer, the conventional steps of authentication and authorization in offline mode are skipped. To this end, the payment object reader 110 first registers the buyer's device and its characteristics at the time of first transaction or through a registration application or first time interaction of the buyer with the merchant payment system. The customer can set up rules to allow the device to be used as an authentication tools only in certain scenarios. In all other scenarios, the buyer enters an authentication code to validate a payment transaction. The steps of registering a buyer device and then detecting it in subsequent offline transactions are discussed hereinafter.

The present subject matter leverages on the fact that each device is different from another owing to subtle differences introduced, rather inadvertently, in the devices during design and manufacturing phases.

The different designs of wireless devices may also result in different performance characteristics for each device. These characteristics are generally too subtle or negligible to be observable by a naked eye or be distinguished by a generic computer. For example, various design characteristics may impact the quality of the speech and data services provided by a mobile device and its ability to provide communications in varying radio environments, like the radio front-end of the mobile device, which drives, in part, the radiated performance (a devices ability to receive and transmit radio signals) of the device may positively or negatively impact the quality of communications in various radio environments. Another factor may be the device's capability to cancel interfering radio signals from wanted radio signals in order to reduce the signal-to-noise ratio and thereby improve the quality of communications. Other design factors include (a) the performance of the device's digital signal processor, (b) the design of the device's operating system and associated applications including the handling of TCP/IP communication. As a result, the different devices 108 may have varying performance characteristics due to their design. In other words, devices 108 operating in the same radio environment may provide different qualities of communication.

As suggested previously, wireless devices like devices 108 and the payment object reader 110 utilize radio waves to support communication over distance. The device 108 transmits and receives information via the radio waves, which may be carried over predetermined frequency bands. An antenna connected to a transmitter and a receiver, along with the associated circuitry, allows the wireless device 108 to transmit and receive these radio wave signals. The design of the wireless device 108, including the antenna and the various transmit- and receiver-related components, impacts the ability of the wireless device 108 to transmit and receive radio wave signals, and hence defines and affects the radiated performance of the device, which as mentioned in the previous paragraph can be measured to differentiate one device from another. Some of the methods are described hereinafter.

In one implementation, the payment object reader 110 extracts or reads specific characteristics, e.g. physical, radio, magnetic, wireless, and the like, from the device 108. For example, the payment object reader 110 obtains radio fingerprints of the devices 108 by allowing its radio frequency transmitter and receiver to interact with the respective antenna transmitter and receiver of the devices 108, for example on a specific or selected frequency bands. It is assumed that the devices 108 are operating over a wide range of radio frequencies and output power levels. The cellular telephone devices, which are now common, for example, operate in the 800-900 MHz or 1700-1900 MHz range and at power levels of about 600 mW while blue tooth devices operate in the 2.4 GHz range at significantly lower power levels. The payment object reader 110 may send signals to the devices 108 on the frequency and at the power levels understood by devices 108, where the responses to the signals from the devices 108 help identify the devices 108 to a reasonable accuracy. The signals are within Specific Absorption Rate (SAR) limitations. In some implementations, the payment object reader 110 obtains radio fingerprints in the form of transmission and reception measurements of the devices 108. The transceiver of the payment object reader 110 may obtain transmission measurements for example, among other things a measurement of the phase error, of the frequency error, of the power and of the spectrum, RSSI, RSSI vs. frequency measurements. In reception measurements, bit error rates may be measured. In one implementation, the payment object reader 110 may include additional components, e.g., antenna elements, diplexers, antenna coupler, and the like, to facilitate or obtain more accurate measurements.

In another example, the radio fingerprints correspond to radiated performance characteristics, such as Effective Isotropic Radiated Power ("EIRP"), receiver sensitivity, Total Radiated Power ("TRP"), Total Isotropic Sensitivity ("TIS"), and envelope correlation, which is related to receiver diversity performance. These characteristics are also unique to a device given their design differences, given that all other signal propagation factors, such as propagation paths, physical environment, and the like remaining same. This is because in a wireless communication system, an RF modulated signal from a transmitter may reach a receiver via a number of propagation paths. The characteristics of the propagation paths typically vary over time due to a number of factors such as fading and multipath. Further, structures such as buildings, and surrounding terrain, including walls, contribute to the scattering and reflection of the transmitted signal. The scattering and reflection of the transmit signal results in multiple signal paths from the transmitter to the receiver. The contributors to the multiple signal paths change as the receiver moves. Other signal sources also contribute to the degradation of the desired signal. The other signal sources may be other transmitters intentionally operating on the same frequency as the desired signal, as well as transmitters that generate spurious signals in the frequency band of the desired signal. Yet another source of signal degradation may be generated within the receiver itself. Signal amplifiers and signal processing stages within the receiver may degrade the level of the desired signal with respect to the level of thermal noise. The signal amplifiers and processors within the receiver may also generate noise products or distort the received signal and further degrade its quality. The calculated value of the radiated performance characteristics, based on measurements described herein, may then be stored for future detection of the wireless device. At a future time, the radiated performance characteristics are compared to the stored values, in order to determine a radiated performance approval and/or certification of the wireless device.

Both during the detection and registration of the wireless device 108, the wireless device 108 may be placed in an anechoic chamber to provide RF isolation from the external environment and allow for the execution of detection of the devices 108 on the same frequency channels as used during the time of device registration.

Besides or in addition to radio fingerprints mentioned above, the payment object reader 110 obtains fingerprints of the devices 108 through the wireless transmitter and receiver and over Wi-Fi or Bluetooth communication protocols. In one implementation, the transmitter obtains the fingerprints from the devices 108 by transmitting and receiving command and control parameters to and from the devices 108. The command and control parameters place the wireless device in a detect mode and determine the quality and operations of a radio frequency (RF) link established between the wireless device and the base station. The wireless data communications link is also used to transmit command and control parameters from the wireless device to the base station. The quality of the RF link is stored in a database as wireless fingerprint of the device. At a future instance, the device 108 can be detected by re-establishing an RF link and determining the quality to be similar to one of the stored values, where each value corresponds to a unique device. In some implementations, the uplink and/or downlink data speed through the RF link may be used as parameters to detect a device 108 from amongst other devices.

In another implementation, the payment object reader 110 measures the manufacturing or engineering tolerances of the sub-components embedded in the devices 108. For example, the payment object reader 110 can measure the performance of microphone, accelerometer or other such sensors. In another example, the payment object reader 110 can measure the defects or anomalies in a particular device that are unique to the device.

In another implementation, the payment object reader 110 is configured to detect any open communication ports in the neighboring device and generate, on-the-fly for example, schemes to communicate detection sequences to the neighboring devices 108. The schemes are configured based on a communication protocol corresponding to the open port.

The payment object reader 110 sends a request to the buyer device 108 to open some communication ports to allow access of the devices 108. The payment object reader 110 also sends requests to allow the payment object reader 110 to make the measurements. Not just that, the payment object reader 110 requests whether it can store such information for future use. Furthermore, the payment object reader 110 requests the buyer to decide whether they would prefer the measurements to be stored locally or remotely. In other cases, the payment object reader 110 or even the merchant may make that determination either on the basis of the merchant location or on a transaction-to-transaction basis.

After obtaining the device fingerprints such as information related to the radiated performance, defects, manufacturing or engineering tolerances, etc., the payment object reader 110 stores the fingerprint data for future use such as detection, based for example of the buyer or merchant's direction. The payment object reader 110 may store such data locally within the reader or in a connected device, such as a POS terminal, or remotely in a server, such as a payment processing system 114. The payment object reader 110 also facilitates storage of the device information and maps the device information to the payment object that was presented at the time of transaction so as to create a relationship between the payment object and the specific device present at the time of transaction. Such relationships may be saved in various formats, such as charts, semantic maps, taxonomies, trees, and the like, and are hereinafter referred to device-object relationships.

While the description above may be described with reference to a single device being mapped to a single object, it will be understood that various variations are within the realm of this methodology. For example, multiple devices can be registered with a single payment object or multiple payment objects. In such implementations, the authorization or rejection of an offline payment transaction in response to an introduction of a payment object may be based on the detection of a specific device or a collection of devices. Alternatively, the authorization or rejection may be based on the detection of a specific cluster of devices, in a specific order or location. In another scenario, the authorization or rejection may be based on detection of a specific object with a specific device amongst the cluster of devices, where the absence of another device indicates a more formal means of authorization or rejection of an offline payment transaction. So, a buyer may be asked to key in a PIN or password shown on the first or a third device, either through a text or email notification, to authorize the payment transaction.

In one implementation, the device fingerprints serve as risk parameters and are stored as such in the PPS 114. The POS terminal 104 retrieves the relevant device fingerprints, and other risk data from the PPS 114. The POS terminal 104 determines which risk parameters to select for retrieval. Also, the POS terminal determines identities of frequently visiting customers, or frequently bought items against which the risk parameters are retrieved when the entities are online. So, the risk parameters and corresponding risk data can be a subset of the risk parameters and risk data residing at the PPS 114. The cached risk data and risk parameters are, therefore, relevant to the merchant, location, or customer in question.

The following paragraphs now describe the process of authentication and authorization of the offline transactions based on security features embedded in the chip of the payment object 116 augmented by additional risk models applied within the POS terminal 104 and/or payment object reader 110. To this end, when the buyer approaches a store with a payment object, such as a credit card, the payment object reader 110 first detects whether there is a connection established between the POS terminal 104 and the PPS 114 or any other entity through a long range communication network, such as the Internet. If yes, that is if the POS terminal and the payment object reader 110 are connected, the transactions are processed in an online mode. The buyer 102A dips his or her payment object 116 into the payment object reader 110. The payment object reader 110 obtains card information from the payment object 116, optionally including a PIN entered by the customer. The payment object reader 104 packages the information, applies encryption keys and sends it to the PPS 114 through the POS terminal 104. The PPS 114 after analysis sends the decrypted information to the payment networks, such as 120, 122 and 124. The issuer, for example, determines whether or not to approve the transaction and accordingly instructs the PPS 114, which then lets the customer know through the POS terminal 104.

The process flow, however, varies if the transaction is performed in the offline mode as the PPS or the issuer is not available to make real-time decisions. Thus, the payment object reader 110 proceeds to process the transactions in an offline mode.

In some implementations, the chip of the payment object 116 is inserted in the card reader 110. The chip obtains card data and determines, through its embedded security mode, whether the chip allows the transaction in offline mode or not. In the scenario where online connectivity is temporarily not available, it is possible for the terminal to use a second Generate AC to ask the chip to approve the transaction. The chip can respond with either a Transaction Certificate (TC) as approval of the transaction or respond with an Application Authentication Cryptogram (AAC) and indicate that it is declining the transaction. When the online authorization request is processed after a first Generate AC is completed and the terminal is unable to go online, the second Generate AC process between the terminal and card will be used to determine if the transaction is approved or not based on the applicable merchant (terminal) floor limits and issuer (card) offline risk parameters. If the transaction amount is below both limits, it may be approved offline and the card generates the TC. If the amount is above the terminal, network or issuer floor limit, the terminal can an offline decline and optionally revert to deferred authorization processing.

A deferred authorization is an authorization request or financial request (each hereafter referred to as "authorization") which occurs when a merchant captures transaction information while connectivity is interrupted; the merchant holds the transaction until connectivity is restored. After connectivity is restored, the merchant sends the transaction for an online authorization request, and receives an authorization response from the issuer. The POS system 101 can implement deferred authorization through a store-and-forward mechanism.

As described above, deferred authorization occurs when an online authorization request is submitted to the issuer for authorization after the card has left the terminal. This can occur for an EMV transaction when the terminal requests an Authorization Request Cryptogram (ARQC) at the first Gen AC and the initial attempt to authorize the transaction cannot be completed due to a communication issue. The terminal does not receive a response to the online authorization request from the issuer, and the terminal and card resolve in an offline decline. Later, the merchant sends the authorization request to the issuer seeking a decision (approval or decline). When submitting the authorization request, the POS terminal includes all standard EMV data (i.e., Field 55 data/DE 55, ARQC) in the deferred authorization request.

For example, if the chip declines the transaction, the POS terminal 104 and the payment object reader 110 can apply embedded risk models (described later) to determine whether or not the transaction can be processed as a store-and-forward transaction by the POS system, thus building over chip's existing security model. For example, the POS terminal or the card reader 110 can store the transaction data obtained from the payment object 116 and wait for the POS system 101 to go online and until then the POS terminal batches the chip-declined offline transactions. Once the POS system 101 establishes connection with the issuer, the POS system 101 sends the offline transactions to the issuer for processing, i.e., authorization and authentication, after the actual event of transaction at the merchant location.

In some cases, the chip can approve the transactions in the offline mode based on its own security model. However, chip has no information related to the merchant, location, customer or item type and the history of fraud related to the aforementioned factors, which may be seemingly tangential, but relevant, to the purchase. For example, a known fraudster can attempt to use a different card in offline mode. The chip is likely to allow the fraudster to consummate the transaction in offline mode. However, the implementations described herein are configured to detect the fraudster based on other risk parameters, such as device fingerprint associated with a known fraudster, ticket value of the purchase and so on. So, while the chip can approve the request as a force post request, where the chip approves a transaction and processes the transaction into settlement without obtaining any issuer authorization, the POS system 101 can apply another layer of security and reject the transaction or save the transaction a store-and-forward candidate.

Going back to the example scenario, once the POS terminal 104 determine the transaction to be an offline transaction and receive approval from the chip, the POS terminal 104 accesses the risk data and risk parameters cached at an earlier time instant. Based on the cached data, the POS terminal 104 determines whether there are any wireless devices in the range of the reader 110. If the customer is a frequent visitor to the store, it is likely that the POS terminal 104 has cached the device fingerprints from the PPS 114 to the POS terminal 104 at a time instant when the POS system 101 was online with respect to the PPS 114.

To this end, the reader 110 determines whether any of the neighboring devices is related to a stored device as per the device-object relationships retrieved from the cached data. For this, the payment object reader 110 measures the radiated performance, defects, manufacturing or engineering tolerances of the neighboring devices and compares it to the cached device fingerprints. If the payment object reader 110 identifies a device-object relationship and matches it to the current device-object pair as presented by the buyer, the payment object reader 110 treats it as a payment authorization instead of the conventional means of PIN or buyer-initiated authorization. This is particularly helpful in cases where the buyer wishes to maintain anonymity to prevent personal information of the buyer 102 from being collected by the merchant 103. As another example, the buyer 102 may be wary of the buyer's card data being misused to conduct fraudulent transactions. In another scenario, the buyer 102 may not be carrying a physical means of payment to furnish payment at the merchant's location. Additionally or optionally, the payment object reader 110 can also treat detected and identified device-object pair or device fingerprint as being connected to a known fraudster. This can be used in the risk heuristic model for determining a risk score associated with the offline transaction.

In some implementations, the POS terminal 104 separately detects the wireless devices in a manner explained above. The POS terminal 104 can use same detection sequences and ports to detect devices in its proximity. The device fingerprint obtained by the POS terminal 104 is also saved and compared with the device fingerprint obtained by the payment object reader 110. This kind of triangulation of data from both the payment object reader 110 and the POS terminal 104 to corroborate the identity of the buyer's devices. In some cases, the POS terminal 104 and the payment object reader 110 use separate communication channels for both detection and validation of the buyer device. In other cases, POS terminal 104 and the payment object reader 110 use different communication channels to both communicate with each other and with the buyer devices. According to related aspects of the present subject matter, triangulation of data may be by "direct" triangulation, e.g., as where the identity of the buyer device is determined from the point of intersection (or the point of least squares fit) of multiple device fingerprints (from multiple fingerprints corresponding to detection sequences). Alternatively, or in addition, triangulation may be "indirect," as where the identity of the buyer device is determined not only from the device fingerprints, but also from relative fingerprints originating from other devices in the proximity or historical purchases.

The POS terminal 110 also analyzes other the risk parameters, including but not limited to, merchant identity, customer identity, payment object, and item type, and corresponding history of declined transactions corresponding to these parameters. For example, the POS terminal 104 queries the PPS 114 for information pertaining to the risk parameters identified above at an earlier time instant when the devices are online. The POS terminal 104 can query for declined transactions associated with the location of the POS terminal, the merchant connected to the POS terminal, the merchants in the neighborhood of the merchant, known customers visiting the merchant, known payment objects, and so on.

The POS terminal 104 applies the cached data and the transaction data obtained from the payment object into a risk analysis component 128. Some of the cached data values weight more than the others. The POS terminal 104, based on the risk analysis component 128, generates a risk score to indicate the level of fraud risk associated with that specific offline transaction. In one implementation, the risk analysis component can be based on data validation, highly predictive artificial intelligence pattern matching, network data aggregation and statistical and/or heuristic models to calculate fraud risk in terms of risk scores. The risk analysis component 128 analyzes the current offline transaction and associated data against risk parameters and data from known fraudulent transactions cached at an earlier time.

The risk analysis component 128 generates a risk score and compares to the merchant or issuer specified risk threshold. In other examples, the risk threshold may be a dynamically changing value that varies based on the time of day, geo-location or price of the item, for example. The risk analysis component 128 is described in detail in FIG. 2. If the risk score satisfies a risk threshold, the offline transaction is approved. However, if the risk score does not satisfy the risk threshold, the offline transaction is rejected by the POS system 101 even though the transaction was approved by the chip of the payment object 116. On receiving rejection, the POS terminal 104 generates a message to display to the customer or buyer and/or merchant that the transaction has been declined in the offline mode and to re-attempt after online mode is enabled.

The POS terminal 104 saves the criteria under which the offline transaction was declined despite approval from the chip. Such criteria is helpful in adjusting weights to achieve a "best balance" in the face of the entire data set—a balance between correct estimation for low risk transactions and correct estimation for high risk transactions. The adjustment is terminated when the rate of successful weight adjustment, as measured by successive improvements in mean square error, begins to asymptote or flattens out. The POS terminal 104 can also save this criteria and new weights in the PPS 114 for future transactions.

However, on receiving authorization or contemporaneous to the authorization step, the POS terminal 104 or the payment processing system 114 on behalf of the merchant, generates a fund transfer request for the amount of product or service requested by the merchant 103 and approves the transaction to be "fulfilled" at a later time when the POS terminal establishes contact with the PPS 114. At that time, the POS terminal 104 sends the transaction data of the offline transaction along with a note of approval to a computer system 114 of a payment processing service, i.e., "PPS 114" via a communications network 118. The PPS 114 can be a cloud computing environment, a virtualized computing environment, a computer cluster, or any combination thereof. The PPS 114 can analyze the fund transfer request based on a plurality of rules stored in a knowledge database (not shown) before sending the fund transfer request to a computer system 120 of the PPS' acquirer or merchant's acquirer (hereinafter "acquirer 120"). For example, one of the rules in the knowledge base may be determining whether the request was authorized based on device fingerprinting as authentication in the offline mode. In one implementation, the acquirer 120 is a bank or financial institution that processes payments (e.g., credit or debit card payments) and may assume risk on behalf of a merchant 103 or a plurality of merchants 103 aggregated by and represented under PPS 114. The acquirer 120 sends the fund transfer request to the computer system 122 of a card payment network (e.g., Visa, MasterCard, Discover or American Express) (hereinafter "card payment network 122") to determine whether the transaction is authorized or deficient in any other way. In some implementations, PPS 114 may serve as an acquirer and connect directly with the card payment network 122. The card payment network 122 forwards the data to the computer system of an issuing bank 124. The issuer 124 is a bank or financial institution that offered a financial account (e.g., credit or debit card account) to the buyer 102A or 102B. The issuer makes a determination as to whether the buyer 102A has the capacity to absorb the relevant charge associated with the payment transaction.

Each of the aforementioned computer systems can include one or more distinct physical computers and/or other processing devices which, in the case of multiple devices, can be connected to each other through one or more wired and/or wireless networks. All of the aforementioned devices are coupled to each other through the communications network 118, including the Internet, intranet, a cellular network, a local area network, a wide area network, or any other such network, or combination thereof. Protocols and components for communicating over such a network are well known and are not discussed herein. Furthermore, PPS 114, the POS terminal 104, and the mobile device 108 can also communicate over the communications network 118 using wired or wireless connections, and combinations thereof. Since the payment transaction has been approved by the issuer 124 through the chip and the and/or the card payment network 122, a payment authorization message is communicated from the issuer to the merchant computing device 104 via a path opposite of that described above.

Figure 2:
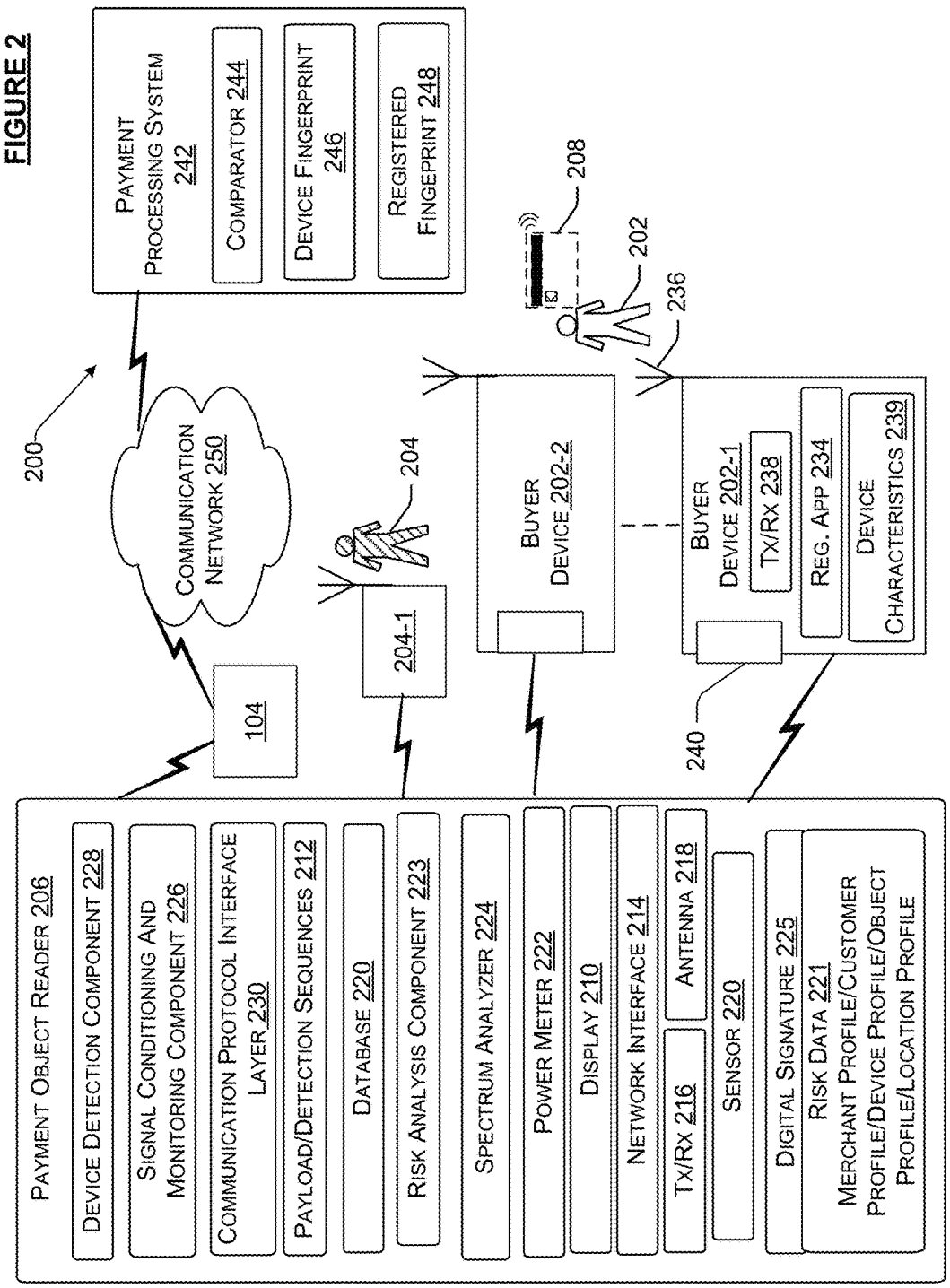
FIG. 2 is a diagram illustrating a system configured for (a) selective caching of risk parameters, (b) correlation of the cached data to data obtained in real-time off the payment object and proximate devices, and (c) authorization or rejection of a payment transaction in offline mode based on correlation, according to an embodiment of the present subject matter.

FIG. 2 is a diagram illustrating a system configured for selective caching of risk parameters, correlation of the cached data to data obtained in real-time, and authorization or rejection of a payment transaction in offline mode, according to an embodiment of the present subject matter.

As shown in FIG. 2, exemplary system 200 illustrating systems and methods to register a device 202-1, 202-2 or 204-1 with a payment object 208 being introduced in a payment object reader 206 to fulfill a payment transaction, and to detect the registered device in a subsequent transaction either at the same or a different merchant location, according to an implementation of the present subject matter. In the figure, the payment object reader 206 is shown to include certain components. It will be understood that some or all components can be included in the POS terminal, e.g., POS terminal 104. Alternatively, the components may be distributed between the POS terminal 104 and the payment object reader 206. The payment object reader 206 may have limited memory and may only receive cached data when analyzing but otherwise the cached data and components may be stored in the POS terminal 104.

In one implementation, the payment object reader 206 includes one or more components configured specifically to allow the buyer to detect a device and its device characteristics as payment authentication tools, for example, a display 210, a database 212, a network interface 214, a transmitter-receiver 216, an antenna 218, a sensor 220, a power meter 222, and a spectrum analyzer 224. As shown, the payment object reader 206 also includes a risk analysis component 223, signal conditioning and monitoring component 226, a device detection component 228, a communication protocol interface layer 230, and payload or detection sequences 232. As mentioned before, in one implementation, these components can be part of a POS terminal, such as POS terminal 104, connected to the payment object reader 206. The devices 202-1, 202-2 and 204-1 may each include a registration application 234, antenna 236, and transmitter-receiver 238 and device characteristics 239, besides other components (labeled only in device 202-1 for clarity). Examples of device characteristics include but are not limited to: timing parameters, radiated performance, wireless performance, quality of communication links, radio frequency response, transmission measurements, receiver measurements, and engineering tolerances.

The communication ports 240 shown can be either hardware or software implementations. In the scenarios explained here, devices 202-1 and 202-2 are associated with the buyer 202 and the device 204-1 is associated with device 204. These components are also described in FIG. 10.

In one implementation, the risk analysis component 223 is configured to selectively cache risk data from the PPS 242, whenever the PPS 242 is communicatively connected to the POS terminal 104. For example, the risk analysis component 223 can query the PPS 242 at periodic or predetermined time intervals. In another implementation, the risk analysis component 223 can query the PPS 242 at random time intervals or whenever it is idle, i.e., not engaged in a transaction. The risk analysis component 223 queries for risk parameters and/or risk data, or a subset of the data residing on PPS 242. The risk analysis component 223, through query, requests the PPS 242 to send a subset of risk data based at least on relevance of the risk parameters or the risk data 221 to the store location. For example, the caching may be based on stored caching rules, such as location of the store. The risk data 221 can also include merchant profile (merchant account information, inventory information, the demographic information, geographic location, bulk of purchase, the time lapsed between successive transaction, total amount earned, and the like) and customer profile (such as customer or merchant events, such as chargebacks (purchase transaction disputes), defaults, delinquencies, fraud, payment objects registered to the customer, device registered to the customer, customer preferences (e.g., uses credit card only), customer transaction history showing all transactions performed to the customer's name or payment object, and so on). The profile captures transaction history of the buyer and is representative of the buyer's purchase behavior (e.g., frequency) and interests. For example, if the buyer is a heavy purchaser of consumer electronics and sports accessories, categories "sports good" and "consumer electronics" may be assigned to the buyer. The buyer profile can also include buyer identifier associated with contactless payments, such as Apple Pay® or Google Wallet®. Such buyer identifiers may be sent to a buyer's phone after he or she registers for such options of contactless payments.

The risk data may be revised to capture any changes in the products/service purchase behavior of the buyer and/or any transaction occurring at the merchant location, neighboring locations, or corresponding to a type of item. In one embodiment, the risk data may be revised periodically after a suitable duration or every time the terminal goes online. In other embodiments, the risk data may be updated in an asynchronous manner, for example, when a transaction involving the merchant or buyer is completed and recorded in the risk data. The risk data is stored on the payment terminal or the reader or both, for example in a distributed or logical manner.

The risk analysis component 223, for example, may not retrieve data corresponding to a set of customers who have never visited the store or bought any item matching the store inventory. This selective caching process provides improved cache utilization because objects that are used multiple times are entered in the cache, whereas infrequently used objects are excluded from being stored in the cache. Furthermore, processing overhead is minimized by reducing unnecessary cache insertion and purging operations.

Further, risk data which are anticipated as being accessed only once or seldom accessed are designated as being exempt from being cached. In one implementations, the risk analysis component 223 stores the cached data 221 in a section of cache memory (not shown), which is comprised of banks of random access memory (RAM) chips. Hence, data can be accessed electronically rather than electromechanically. Hence cache access can be performed at extremely fast speeds. Another advantage is that implementing a global cache memory allows data to be shared and accessed by multiple users.

In one implementations, an activity monitor (not shown) tracks activity on the POS terminal 104 and payment object reader within a specified period of time or the entire time the POS system 101 is online or offline or both. Here, for example, the activity monitor can track the transactions being declined at the POS terminal 104. The activity monitor can track certain risk parameters because there have been enough requests for this particular risk data within a specified period of time. Here, for example, risk parameters may include disputed transactions for a threshold ticket value and/or a threshold number of transactions that is used to determine whether risk data 224 is stored or removed or updated, respectively, from PPS 242. Activity monitor may include information establishing the period of time over which risk data is relevant. For example, transactions older than 3 months may not be relevant. These and other risk parameters may be programmably set and in certain implementations dynamically adjusted to further optimize or otherwise change the operation of risk analysis component 221, PPS 242, and/or memory.

In some implementations, cached risk data is modified for each request of offline transaction that is handled regardless of whether the risk data was cached for a previous request or not. In an example, the cached risk data for any given request is only stored in cache memory for a defined period of time and deleted at the lapse of the request. In other implementations, the existing cache data is constantly updated and new data is written over existing data such that no data is ever deleted unless storage runs out. In certain implementations, a unique identifier and timestamp can be recorded in cache memory for a given request for cached data. After the defined period of time has passed within enough subsequent similar requests, then the unique identifier and associated timestamp become stale and can be removed/erased from cached data. Thus, with the proper settings of risk parameters, the amount of memory required for cached data can be significantly controlled and also only a small amount of information need be recorded in cache memory.

One of the risk parameters collected by the payment object reader 206 are device characteristics. Such device characteristics are collected and cached into the PPS when online, and can be cached along with other risk parameters as described above. Subsequent paragraphs describe the operation and structure of device detection component 228 that is configured to collect environment characteristics, including device characteristics, and detect a device as fraud or low risk based on detected characteristics.

In one implementation, the device detection component 228 is configured to detect devices through physical device characteristics 239, such as mechanical and operational differences, associated with a device accompanying a buyer. The communication protocol interface layer 230 includes various communication protocol interfaces available to the payment object reader 206 with which it can interact with other wireless devices, e.g., buyer associated devices 202-1, 202-2, and 204-1. The device detection component 228 is also configured to generate a profile or a signature 225 of the communication device in response to a received device characteristic, and register the device with a payment processor, such as payment processing system (not shown) for detection during a future use. The signature 225 also includes the mapping of the device characteristic with a payment object belonging to the buyer and is sent to the PPS coupled to the payment object reader. Device identification processes can also be accomplished locally in isolation at the payment object reader level without interaction or communication with external devices (e.g., RFID tag readers and POS devices or other wireless network access points). This isolation reduces the risk of electronic pick pocketing of device information that can occur when payment devices are continually in wireless communication with external devices.

To use a device or devices belonging to a buyer 202, e.g., devices 202-1 and 202-2, or device 204-1 for buyer 204, as tools for authorizing a payment instrument, the payment object reader 206 first registers the devices as such, when a buyer performs a first transaction or makes an authorization to this effect.

Assume that both buyers 202 and 204 walk into a store at the same time or around the same time. Buyer 202, however, approaches the payment object reader 206 first to pay for an item. While the payment object reader 206 detects all devices within the merchant's geo-fence, devices 202-1 and 202-2 associated with the buyer 202 may be closer. The payment object reader 206 uses radio communication techniques or other location detection techniques (triangulation, for example) to measure, for example, signal strength from the devices within the geo-fence to determine which device is the closest. In other cases, the merchant identifies the device as closest based on physical information such as device name, etc.

The device-payment object relationship, also referred to as the profile or signature of the communication device, can be stored in a central payment processing system, such as PPS 242, or locally within, for example, a secure enclave system, such as database 220, in the payment object reader 206. The PPS 242 may include a comparator 244, the device fingerprint/risk data 246 as received from the payment object reader 206, and registered fingerprints/risk data 248, which is a database of registered fingerprints/risk data from all known devices. Such registered fingerprints/risk data 248 may correspond to known fraudsters or known low-risk customers cached from the PPS 242 when payment object reader 206 was last online.

In one implementation, the payment object reader 206 sends a request to the neighboring devices, which are detected by a geographical or logical fence of the payment object reader 206, or to the closest device. So, the payment object reader 206 may send a request to all devices within the geo-fence or specific devices determined to be closest to the buyer 202. Assume that the payment object reader 206 sends requests to both the device 202-1 belonging to buyer 202, and device 204-1 belonging to buyer 204. For the sake of simplicity, the second device 202-2 of the buyer 202 is a wearable device, like a fitness tracker with limited functionalities, and connected to the main device 202-1, which is a mobile phone. The buyers 202 and 204 may receive these requests as email or text notifications, or a ping to the device invisible to the buyer.

Alternatively, the buyer 202 launches or opens a registration application or a mobile payment portal 234 (e.g., a payment application installed on the device or a web application in web browser) executing on a mobile device 202-1, e.g., a phone or a laptop, or the POS terminal (not shown) to initiate registration of the device 202-1 and any other devices that the buyer would like to register, for example device 202-2. The term "registration application" or "mobile payment portal" as used here, refers to any registration application that enables communication between users (e.g., sender and recipient of a message) over a wired or wireless communications network. The registration application 234 can be employed by a service provider that delivers a communication service to users, e.g., chat capability or capability to enter payment information, say through a form. The registration application 234 may include one or more components and/or engines, or a component and/or engine can include one or more applications. The registration application 234 can include, for example, a mobile payment application, a text messaging application for communication between phones (e.g., conventional mobile telephones or smartphones), or a cross-platform instant messaging application for smartphones and phones that use the Internet for communication.

The registration application 234 can also include, for example, a web browser application installed on a computing device 202-1 or 204-1 of the buyer 202 and 204 respectively, accessible via a uniform resource locator (URL). In some embodiments, the URL is identified by a graphical user interface (GUI) of a mobile payment application installed on the computing device 202-1 and 204-1.

The registration application 234 facilitates collection of and connection between the buyer's device characteristics 239 with the financial account information of the buyer. For example, the registration application 234 requests the buyer 202 to confirm whether the payment object inserted or being introduced in the card reader belongs to them and enter a card verification value (CVV) code for further confirmation. This step may be performed only at the time of registration. Once confirmation is received, the payment object reader 206 executes a control logic to determine which techniques, protocols, parameters, test sequences, components, etc., should it implement to register the device. Such registrations may also be automatic and initiated when the device is first detected.

At the time of both detection and validation of the device fingerprint for authentication or identification of a fraud customer, it may be useful to have data corresponding to all possible parameters, protocols and test sequences, however the device 202-1 may not be prepared or available for all kinds of communication. To communicate with the device 202-1, the device detection component 228 determines whether the corresponding communication ports in the device 202-1 are available or accessible and/or appropriate software permissions have been obtained to make the communication. To this end, the device detection component 226 through the communication protocol interface layer 230 determines which communication ports 240 of the device 202-1 are accessible, and accordingly its own ports to establish communication links with the available port. Alternatively, the reader 206 may send requests to activate certain ports 240 to allow seamless communication and further registration process. The buyer's device may respond with an automatic or user-initiated activation of the ports 240, e.g., by activating NFC, Wi-Fi, or Bluetooth communication.

Then the device detection component 228 establishes communication links with all or a selected number of available ports 240 using the appropriate communication protocol and the buyer may be notified when the reader 206 makes such connections. For example, the device detection component 228 queries the device 202-1 in response to a transaction activity for information related to manufacturing tolerances of the engineering sub-components of the device 202-1. Specifically, the reader 206 applies the device detection component 210 to measure the performance of the microphone, accelerometer, gyrometer, magnetometer, antenna transmitter and receiver, or any such sensor of the device 202-1. The device detection component 228 may also implement logic to interact with the hardware and software components of the device 202-1 to measure the tiniest subtleties or defects in the device 202-1 and record them as device fingerprints.

The device detection component 228 also activates the antenna 218 and receiver-transmitter 216, spectrum analyzer 224, sensor 220, and the like of the reader 206 to communicate with a corresponding antenna and transmitter-receiver of the device 202-1 through the radio communication protocol. The device detection component 228 detects parameters, either individually or in combination, rise-time signatures, spectral values, signal transients, hardware impairments, channel characteristics, power values, signal strength, identity of the received signals, say in terms of frequency or phase, timing parameters associated with the received signal, and the like, to obtain physical characteristics of the device 202-1 and store them as device fingerprints.

The device detection component 228 may also accompany request for information with specific sequences or payload 212, which it generates or modifies based on the available communication ports 240. The payload 232 may either be common between all devices being registered or unique for each device. The payload 212 can be a data signal or a series of instructions that trigger the device 202-1 or certain components, like the transmitter or sensors, to respond. The nature of responses from the device 202-1 or the content therein is said to be unique for each device and is saved as device fingerprints. The responses from the selected devices can also be in the form of affirmative or negative answers to queries from the payment object reader 206. The responses, whether binary or textual information, can be conditioned. The signal conditioning and monitoring component 226 performs such conditioning required to remove noise or to change data format, in select cases.

The device detection component 228 obtains the device fingerprints 246 and saves the values either locally or in a persistent remote location, such as PPS 242. The device detection component 228 also stores the relationship between the device fingerprints and the payment object presented at the time of transaction as device-object relationships, for example in registered device fingerprints 248. For this step, the buyer may be asked to enter an authorization code to confirm for the first time that the card in fact belongs to him. The reader 206 stores identifier of the payment object, such as the last four digits of the card. The device detection component 228 saves such relationships in a database 212 embedded in or associated with the reader 206. Additionally or alternatively, the device detection component 228 applies a cryptographic algorithm, for example encryption or tokenization, to the received relationships prior to storage.

This completes the registration of the device as an authentication tool for any subsequent payment transactions—offline transactions, for example. By setting up the relationships, the reader 206 allows that every time a user presents the payment object, like a credit card, with the device 202-1, the transaction is authenticated as being safe or tagged as risky in an offline mode. Conversely, if the user presents another object in the presence of the device 202-1, the user may be asked if they would like to try another card. In other cases, it may be determined if the new card is associated with a different device. If yes, the transaction may be rejected as a fraudulent attempt. In another scenario, the user may present the card but not have the registered device on him, in which case, he may have to authorize in the conventional manner. Additionally, as described herein, the transaction can be identified as potentially high risk due to presence of a known device associated with a fraudulent user. In this case, the offline transaction is rejected if a known device is present, otherwise the transaction is allowed if the chip logic approves the transaction in offline mode.

Thus, once saved in the database 212, the registered device fingerprints or the device-object relationships and other risk parameters can be retrieved or cached and used as valid authentication tools for payment instruments at the time of a payment transaction, for example through the point of sale terminal.

Now, the process of detection of the device using a registered device fingerprint is described. This detection can be used to either authenticate a user for an offline transaction or reject an offline transaction as being associated with a fraudulent user. At the time of offline transaction, when the buyer 202, on arrival at the point of payment, the buyer 202 presents the payment object that was optionally present at the time of registration at the merchant's location where the payment object reader 206 is installed. The payment object reader 206 obtains information pertaining to devices in proximity to the reader to see if any of the device fingerprints match existing database of whitelisted or banned devices. Accordingly, the offline transaction is either tagged low risk or high risk respectively.

In some implementations, the device detection component 228 captures the device fingerprints, for example, at least one of the radio fingerprints, the manufacturing tolerances, and the like, in a manner similar to the process of registration. So, the device detection component 206 first seeks permission from the proximate devices 202-1 and 204-2 and determines available open ports.

Subsequently, device detection component 228 generates a payload, which may be similar to the payload used at the time of registration, and waits for a response from the devices 202-1 and 204-1. In this manner, the device detection component 206 captures a digital device fingerprint of the devices 202-1 and 204-1 present at the merchant location. The device detection component 228 can implement a tokenization technique, similar to the one used at the time of device registration, to generate another digital signature 225 or representation of the imprint in response to the captured device fingerprints and the payment object presented at the merchant's location.

In one implementation, the reader 206 sends the generated digital signature 225 to the payment processing system 242 via the communication network 250 for comparison with registered device fingerprints from devices 202-1 and 204-1. The device detection component 228 can also fetch the registered device fingerprints from a local storage unit, as the case may be. For example, in case of offline mode, the registered device fingerprints are cached at an earlier time from the PPS 242 as real-time verification from the PPS 242 is not possible. The device detection component 228 subsequently verifies buyer identity based on the comparison. For example, the payment processing system 242 compares previously stored merchant profiles, buyer profiles or fingerprints of the devices registered by the buyer 202 and the digital signature 225 or profile obtained at the payment object reader 206 through the comparator 244. The generated fingerprints are compared with the fingerprints in the database and the fingerprint in the database that is closest to the generated fingerprint is selected as the match. The buyer profile includes an association of a previously obtained device characteristic with information identifying a previously received payment object. In one embodiment, the search algorithm takes more than one fingerprint from the database that are closest to the generated fingerprint and interpolates the most plausible device from the devices associated with the fingerprints. In one implementation, if the generated profile is substantially similar to the buyer profile, the payment processing system authorizes on account of confirming presence of the communication device, the payment transaction, where the authorizing further includes transfer of an amount of funds corresponding to the payment transaction from a financial account of the buyer to a financial account of the merchant.

So, if the digital signature 225 matches with a pre-registered and stored device-object relationship in database 116 associated with the payment processing system 242, which in this case is for device 202-1, the merchant 106 through the POS terminal, such as POS terminal 104, authorizes buyer's device fingerprint and the payment object as a legitimate means to make payment, or alternatively, is identified as one belonging to a known fraudster. If the digital signature 225 does not match, the payment object reader 206 generates a notification for the buyer 202 to try another means of payment or authorize through conventional means by providing an authorization code. Once authenticated, the payment transaction is fulfilled through the issuer, acquirer and card processing network, as described in FIG. 1, for example when the payment object reader 206 established online connection with the PPS 242. However, while in the offline mode, the payment object reader 206 along with the POS terminal unconditionally or conditionally approves the transaction. In other words, the customer is free to leave the store with the product or service since all possible risk analysis have been performed.

In some cases, the payment object reader 206 establishes a number of communication channels between the payment object reader 206 and the buyer's devices to confirm the device fingerprint.

In yet other cases, the PPS or the POS terminal 104 establishes separate communication channels with the buyer devices. The POS terminal 104 then obtains the device characteristic corresponding to the detected buyer devices. Then the POS terminal generates a second profile or device signature of the buyer device based at least in part on the obtained device characteristic from the POS terminal and the received payment object. It then transmits the second profile of the communication device to a payment processing system communicatively coupled to the POS terminal, or directly to the reader. The PPS 242 then corroborates whether the profile from the payment object reader is more accurate than the second profile from the POS terminal. Accordingly, in some implementations, if the second profile more accurately points to a device, the PPS 242 recalibrates the previously granted authorization.

The description above discussed device fingerprints as an example of risk parameters. It will be understood, however, that the authentication or rejection of a transaction in offline mode can be based on a single risk parameter or a combination (including specific order) of the risk parameters.

Figure 3A:
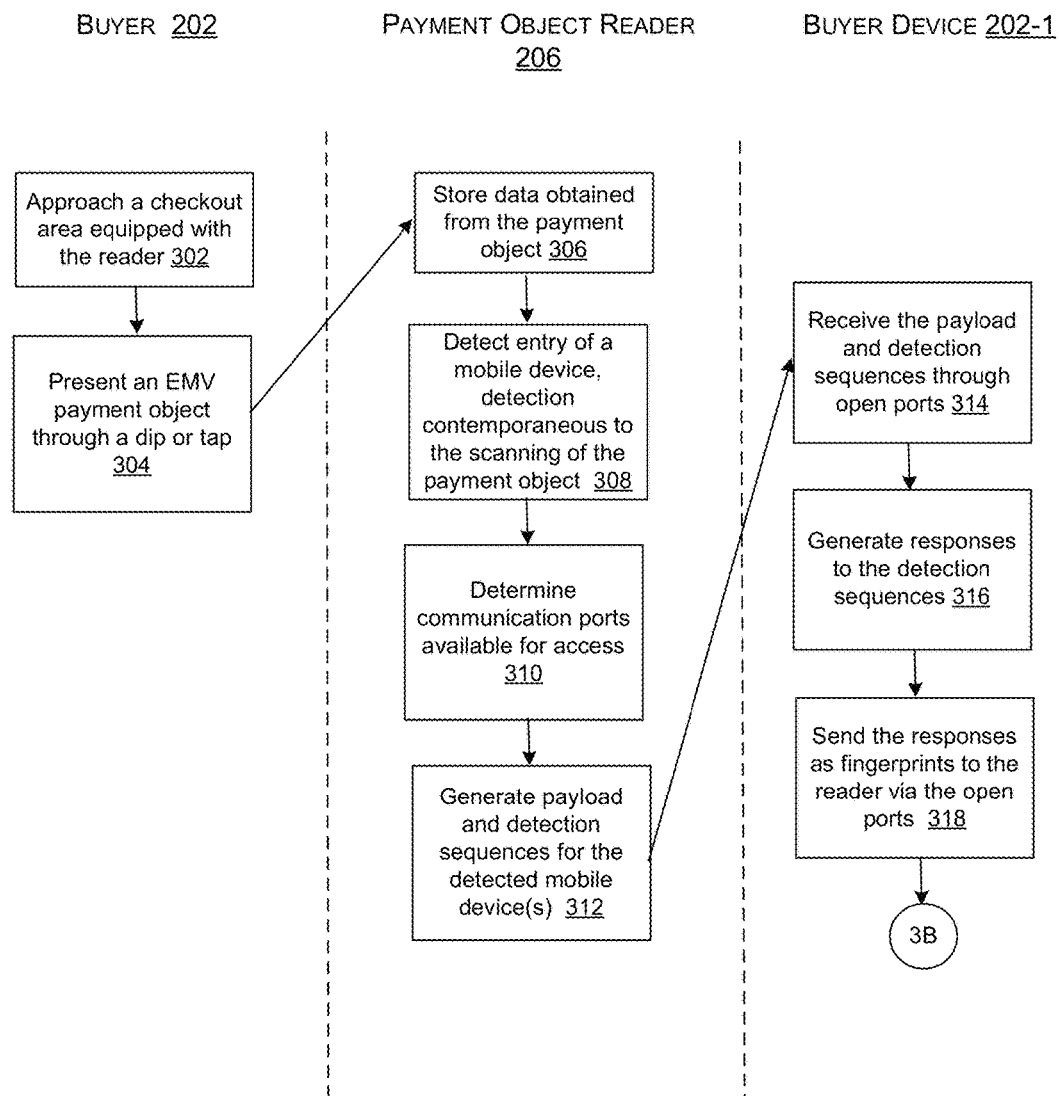
FIGS. 3A and 3B are sequence diagrams illustrating a method of registering a buyer's device with a payment processing system for use in authorization of a payment transaction in offline mode, according to an embodiment of the present subject matter.
Figure 3B:
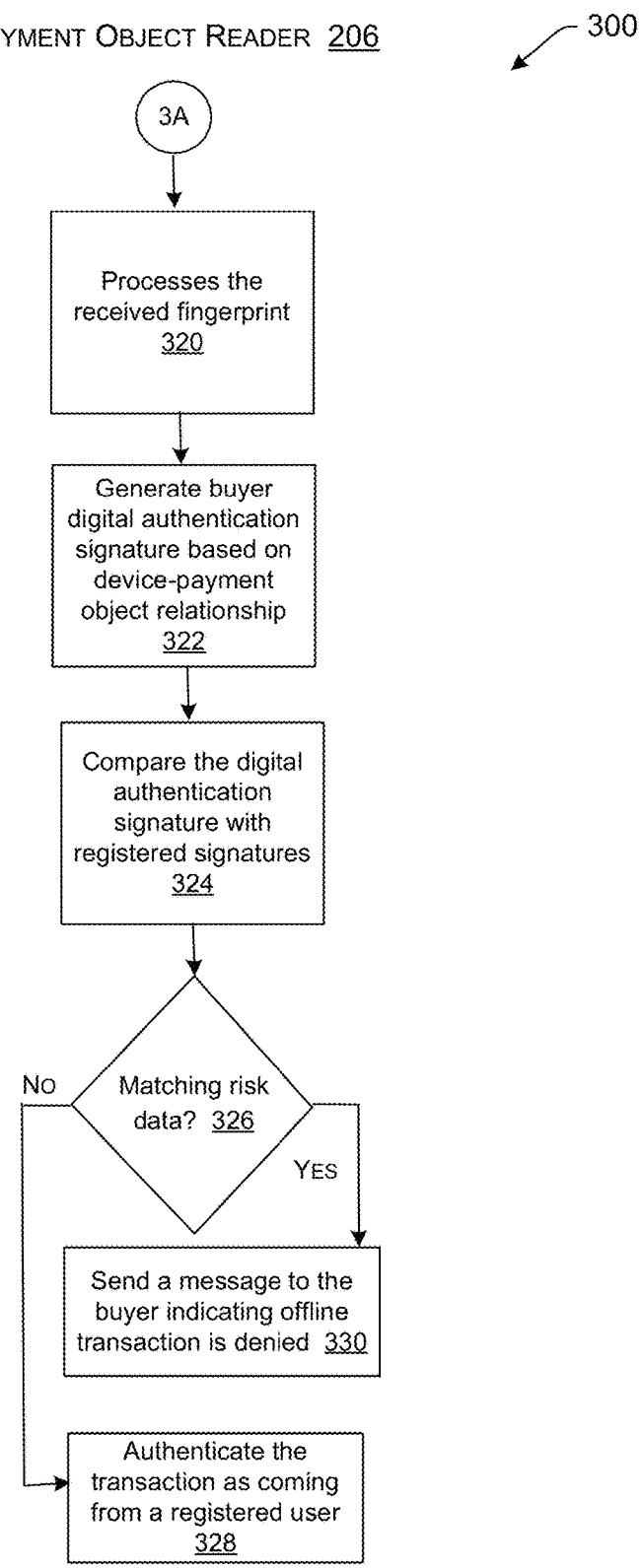

FIGS. 3A and 3B are sequence flows illustrating an example process 300 of a method of registering a buyer's device as an authorization instrument with a payment processing system to be used in processing of offline transactions, according to an embodiment of the present subject matter.

The process 300 can be performed by one or more components, devices, or modules such as, but not limited to, the mobile device, the payment processing system, merchant device or POS terminal, or payment beacon or other components or devices. For the sake of explanation, the description hereinafter is described with reference to components described in FIG. 2. As illustrated in FIG. 3, the process 300 includes a set of operations from block 302 to block 330. It will be understood that the method can be carried out by any component of the payment system, e.g., the POS terminal, PPS or both, for example contemporaneous to the payment object reader 206.

The process 300 starts with the operation at block 302. A buyer 202 with a buyer device 202-1 approaches a checkout area at a merchant location, which is equipped with a payment object reader 206 (step 302) and presents a method of payment, e.g., a payment object like a chip-based payment object operating on EMV technology, into the payment object reader 206, for example through a dip, swipe, tap or such action. This is also referred to as transaction activity. Other examples include: (a) a payment object being introduced in proximity to a payment system; (b) indication of someone accessing a payment account; (c) retrieving a transaction history; (d) approving authenticity of an action; and (e) detecting a payment transaction. Any kind of transaction activity can trigger the process of registration an/or detection described hereinafter (step 304) The payment object reader 206 may store the location coordinates of the buyer. The payment object reader 206 scans the payment object that was inserted or otherwise introduced in the payment object reader 206. For example, the payment object reader 206 scans the payment object information, e.g., the last four of the card data (step 306).

At this point, in one implementation, the payment object reader 206 can determine whether an authentication alternative is present, for example, by communicating with the payment processing system. Based on the payment card information, the payment processing system indicates whether a device has been registered corresponding to the payment object as a valid tool for authentication.

If not, the flow transitions to step 308 where the registration steps. If yes, that is if there is already a device registered, the flow transitions to checking whether any device in the neighborhood of the buyer, based on the location coordinates obtained at step 304, is the same as the device registered. In another implementation, the authentication alternative is checked after the devices around the buyer are scanned. This is further explained in the paragraphs below.

At step 308, after obtaining card information, the payment object reader 206 proceeds to detecting entry of the buyer device 202-1 through location detection techniques, such as techniques based on angulation, lateration, proximity detection, dead reckoning, geo-fence, global or local positioning systems, Bluetooth Technology, Near-Field Communication Technology, sensors-based technology, Radio frequency identification (RFID) system, or the like. In one embodiment, the present subject matter enables automatic geo-fence establishment and activation. According to the present subject matter, the geo-fence is defined and established based on a current location of an asset, for example using GPS data comprising latitude and longitude along with some predetermined area based on range or distance. In this manner, the user need not manually specify a location by drawing a perimeter, specifying a point location, or by any other means.

This step of detecting location of the devices with respect to the location of the payment object reader 206 may be performed contemporaneous to the step of scanning the payment object. Additionally, the payment object reader 206 can use buyer location to further zero in on the device that is most likely to be the buyer's (step 308).

The payment object reader 206 then determines how it can interact with the recognized buyer device or devices. The payment object reader 206 detects devices that are within a communication range dictated by a communication protocol, for example, wireless or RF protocol. Then the payment object reader 206 establishes communication channels with all or selected devices in its communication range. For this, the payment object reader 206 sends preliminary signals or data to explore communication ports in the device, which are available (step 310). Accordingly, the device detection component 228 of the payment object reader 206 generates payload and/or detection sequences adapted based on the available communication ports and in accordance with the communication protocols on which the ports operate (step 312). The detection sequences can be in the form of specific signals requesting the device to respond in a certain way. The detection sequences can also be information-gathering requests configured to obtain device fingerprints from the buyer devices. Device fingerprints include radio, mechanical or operational fingerprints—such as radiated performance, device defects, sensor performance, communication speed or lags, spectrum data, and the like.

The targeted buyer device receives the payload and detection sequences via the appropriate communication ports and protocols (step 314) and responds accordingly. For example, the detection sequences can be queries to which the device responds with a yes or a no. In another example, the detection sequences dictates how the payload can be sent to a particular component of the device, such as the sensors, to evaluate its performance. The detection sequences also include instructions to send the information back to the requestor, in this case the payment object reader 206. In some cases, the responses may be encoded at the buyer device level by appending randomly generated tokens to generate a digital authentication signature of the digital device fingerprint.

The buyer device can apply tokenized pseudo-random numbers (also referred to as hash keys) to the feature vectors to generate the device fingerprint. A National Institute of Standard and Technology (NIST) compliant True Random Number Generator (TRNG) can generate the pseudo-random numbers. The encoding can also be done based on keys generated by a cryptographic unit (not shown). Examples of keys include authentication keys, which include SCP03 master keys (Message Authentication Code Key: MAC, Encryption Key: ENC and Key Encryption Key: KEK, which are 256-bit Advanced Encryption Standard (AES) symmetric keys with associated key derivation data) or Key Agreement Keys (e.g., user server signature verification public key, user server static public key, user static key pair with both public and private key). The encrypted fingerprint can also be created using other schemes, such as fuzzy vault algorithm, a cancelable fuzzy vault scheme based on irreversible hash functions, such as hash functions, such as MD, RIPEMD, and SHA. (Step 316.)

The responses form the digital device fingerprints, which are to be used for device identification and authentication of a payment transaction at a later time, are then sent to the payment object reader, as shown in step 318. At step 320, shown in FIG. 3B, the payment object reader 206 processes the received fingerprint, e.g., performs signal modulation and conditioning. The reader (or a remoter server) also creates a buyer digital authentication signature 225 or device-payment object relationships including the obtained digital device fingerprints and data pertaining to the transaction, for example, the location and time of the transaction or buyer, or the card information. In one implementation, the payment object reader 206 further encrypts the received digital signature 225 and transmits the encrypted signature via a communication network, e.g., the USB/Wi-Fi connection (step 322), to a central server, such as the payment processing system 114, or keeps it local within an associated database. In one embodiment, the PPS 114 then compares the syntax and content of the buyer digital signature 225 with registered signatures to confirm whether or not buyer digital signature corresponds to a registered device (step 324). In another embodiment, the PPS 114 then transmits the buyer digital signature to one or more buyer mobile devices, such as those determined to be proximate to the POS terminal based on geo-fence data, to determine whether or not the buyer digital signature corresponds to a registered biometric payment instrument. In some implementations, the digital device fingerprint may be stored in the database if the digital device fingerprint does not exist in the database, wherein storing enables use of the communication device as an authentication instrument in subsequent payment transactions between the buyer and the merchant. Also, rejecting the payment transaction if the digital device fingerprint does not exist in the database.

If the match operation (step 326) as a result of the comparison at step 324 yields a "Yes," the flow transitions to step 328. First, the PPS 114 identifies the buyer as a registered user (e.g., after performing the comparison itself, or after receiving a confirmation from a buyer mobile device proximate to the POS terminal after the buyer mobile device performs the comparison, etc.). Then, the PPS 114 authorizes the payment transaction as approved since the device was previously registered (step 328).

If the match operation (step 326) as a result of the comparison at step 324 yields a "No," the flow transitions to step 330 where the buyer is sent a notification on his device or the buyer is asked to key in a card verification value or some other kind of authentication code into a field in the payment object reader's display message. The code is also saved in the device-object relationship and is retrieved every subsequent time the device alone is used as a means for authenticating a payment transaction. This is described in FIGS. 4A and 4B. This completes the registration of the device with the payment object or the merchant location. Every subsequent time, the customer makes a payment transaction, the entry of an authentication code is replaced by the payment object reader detecting and confirming the presence of a registered device, where the device detection based on the detection of device characteristics such as mechanical or operational performance parameters.

Figure 4B:
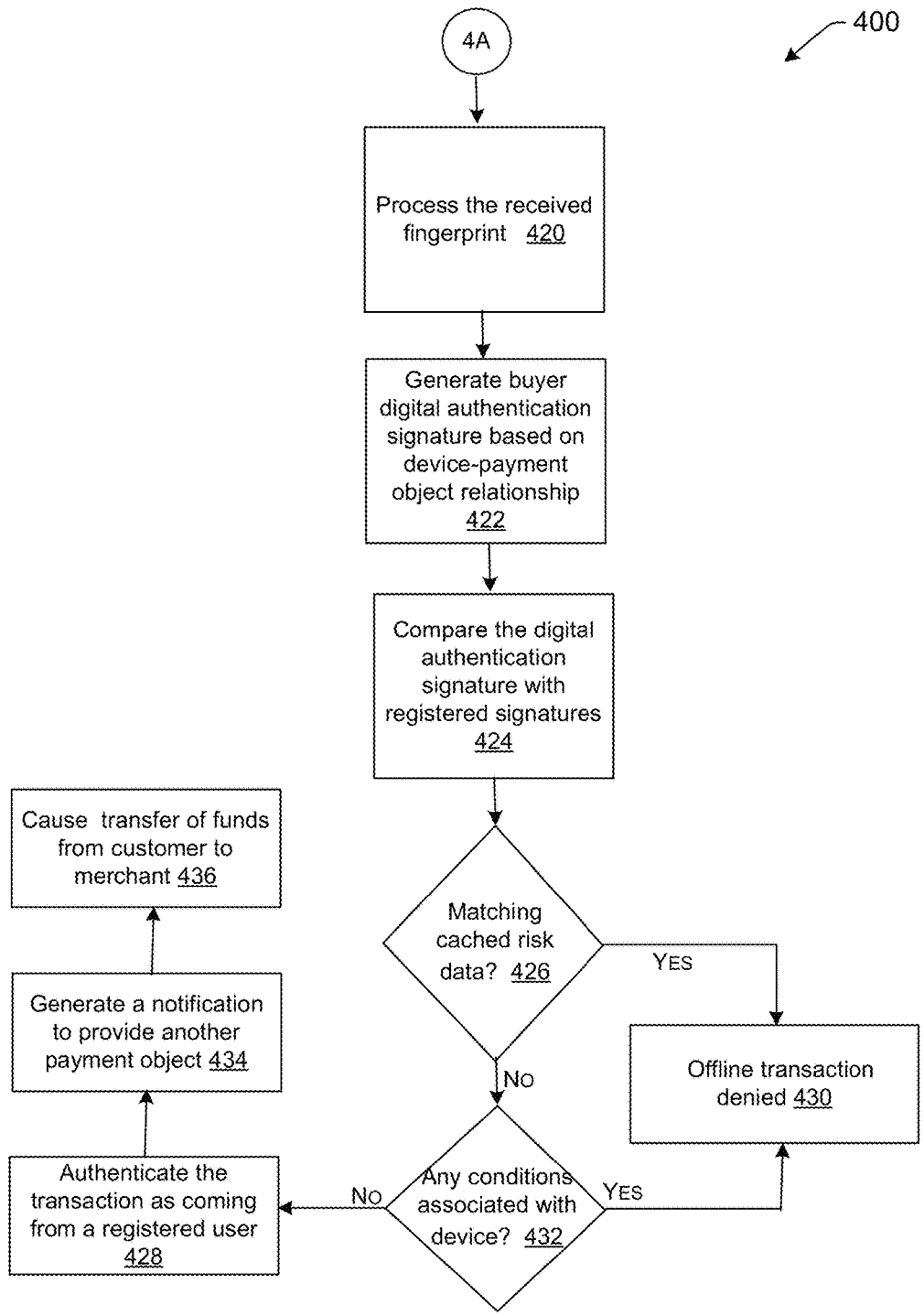

FIGS. 4A and 4B are sequence flow methods that depict detecting a registered device at the time of a payment transaction in offline mode, according to an embodiment of the present subject matter. The process 400 can be performed by one or more components, devices, or modules such as, but not limited to, the mobile device, the payment processing system, merchant device or POS terminal, or payment beacon or other components or devices. For the sake of explanation, the description hereinafter is described with reference to components described in FIG. 2. Since the transaction occurs in an offline mode or turns into an offline mode mid-transaction, the connection between the PPS and the payment object reader or the POS terminal does not exist for the purposes of this figure description. As illustrated in FIG. 4, the process 400 includes a set of operations from block 402 to block 430.

The process 400 starts with the operation at block 402. A buyer 202 with a buyer device 202-1 approaches a checkout area at a merchant location, which is equipped with a payment object reader 206 (step 402) and presents a method of payment, e.g., a payment object like a chip-based credit card operating on EMV technology, into the payment object reader 206 (step 404) The payment object reader 206 may store the location coordinates of the buyer. The payment object reader 206 scans the payment object that was inserted or otherwise introduced in the payment object reader 206. For example, the payment object reader 206 scans the payment object information, e.g., the last four of the card data or other PAN (step 406). The payment object reader 206 also determines at this point whether or not the transaction is in offline mode or online mode. For example, the payment object reader 206 may determine based on the payment object information and connection status identifier whether or not a connection can or has been established with the payment processing system 242. In some implementations, the merchant may have forced the POS terminal to operation in offline mode by disconnecting network connectivity. In the decision block 407, if the determination yields that the transaction is being processed in offline mode, the flow transitions to step 408. However, if the transaction is being processed in online mode, the process transitions to step 410.

At this point, in one implementation, the EMV payment object determines, based on the risk parameters such as floor limit, random transaction selection value, and velocity checking, whether or not to approve the transaction in offline mode (step 408). These parameters or the logic applied by the integrated circuit of the payment object are generally not known the customer or the merchant. If the chip approves the payment transaction in offline mode, the flow transitions to additional risk analysis augmented by the POS terminal and the payment object reader 206 at step 409. If the chip rejects the payment transaction in offline mode, the merchant can either enter in the online mode and the flow transitions to step 404 or the customer can attempt to make the transaction with a different payment object and possibly, different criteria to approve transactions in offline mode. In some implementations, the POS terminal can implement a store-and-forward technique to process payments in offline mode in case the chip rejects the transactions.

At step 409, the payment object reader 206 can determine whether an authentication alternative is present, for example, by communicating with the POS terminal and accessing cached risk data stored in the POS terminal. The POS terminal based on the cached data determines if such alternative is present. Based on the payment card information, the POS terminal indicates whether, for example, a device has been registered corresponding to the payment object as a valid tool for authentication. Alternatively, the POS terminal detects devices within an established geofence to detect all devices and obtain corresponding fingerprints as described in steps below. Even though the description describes device fingerprinting, the description should be extended to include fingerprinting of the environment surrounding the payment transaction. Examples include, but are not limited to, merchant identification, customer identification, location identification, time of transaction, nature of transaction, ticket price of the transaction, item type in the transaction, and identification of merchants in the neighborhood or zip code of the merchant. For all such identification, the POS terminal or the payment object reader establishes local and short range connectivity with the entities in the environment.

If cached data does not indicate any known fraud or low risk devices, the flow transitions to step 308 of FIG. 3 where the registration steps begin. If yes, i.e., if there is already a device registered, the flow transitions to checking whether any device in the neighborhood of the buyer, based on the location coordinates obtained at step 404, is the same as the device registered. This step would require all devices to be queried. In another implementation, the authentication alternative is checked after the device of the buyer is affirmed so only that specific device is queried. This is further explained in the paragraphs below.

At block 410, after obtaining card information, the payment object reader 206 proceeds to detecting entry of the buyer device 202-1 through location detection techniques, such as techniques based on triangulation, trilateration, multi-laterations, geo-fence, global or local positioning systems, and the like. This step may be performed contemporaneous to the step of scanning the payment object. Additionally, the payment object reader 206 can use buyer location to further zero in on the device that is most likely to be the buyer's (step 410).

The payment object reader 206 then determines how it can interact with the recognized buyer device or devices. For this, the payment object reader 206 sends preliminary signals or data to explore communication ports in the device, which are available for access and communication (step 411). If there is even one communication port available as determined in step 412, the flow control moves to step 413. In some cases, the payment object reader may detect a number of communication ports that are available or can be made available on request. In such cases, the merchant or the buyer selects a communication port. In other cases, the selection process can be automated such that ports that meet certain conditions are enabled or used. For example, power-saving or time-saving communication channels are set up.

If no ports are available for access as determined in step 412, the flow transitions to step 414 where the buyer is asked to activate certain ports to allow communication. After activation, the flow either moves to 411 or 413. If no activation is detected within a specified period of time, the POS terminal detects current environment data based on other risk parameters, such as merchant, store, item type, or customer identification.

At block 413, the device detection component 228 of the payment object reader 206 generates payload and/or detection sequences adapted based on the available communication ports and in accordance with the communication protocols on which the ports operate. The payload and detection sequences may be exactly the ones that were used at the time of registration. In other implementations, a unique payload is generated every time. The detection sequences can be in the form of specific signals requesting the device to respond in a certain way. The detection sequences can also be information-gathering requests configured to obtain digital device fingerprints from the buyer devices. Digital device fingerprints include radio, mechanical or operational fingerprints—such as radiated performance, device defects, sensor performance, communication speed or lags, spectrum data, and the like. In some implementations, the payment object reader 206 detects the device and other environmental risk parameters without a payload and detection sequence, for example through a uni-directional communication mechanism.

In other implementations, the targeted buyer device receives the payload and detection sequences via the appropriate communication ports and protocols (step 415) and responds accordingly. Thus, based on the detection sequences and payload, the buyer device responds in a certain manner, which is captured by the sequences or payload or some other signal and sent to the payment object reader via the same or a different communication channel. In some cases, the responses may be encoded at the buyer device level. The buyer device can also apply tokenized pseudo-random numbers (also referred to as hash keys) to the feature vectors to generate the digital device fingerprint. A National Institute of Standard and Technology (NIST) compliant True Random Number Generator (TRNG) can generate the pseudo-random numbers. The encoding can also be done based on keys generated by a cryptographic unit (not shown). Examples of keys include authentication keys, which include SCP03 master keys (Message Authentication Code Key: MAC, Encryption Key: ENC and Key Encryption Key: KEK, which are 256-bit Advanced Encryption Standard (AES) symmetric keys with associated key derivation data) or Key Agreement Keys (e.g., user server signature verification public key, user server static public key, user static key pair with both public and private key). The encrypted fingerprint can also be created using other schemes, such as fuzzy vault algorithm, a cancelable fuzzy vault scheme based on irreversible hash functions, such as MD, RIPEMD, and SHA. (Step 416.)

The responses form the digital device fingerprints, which are to be used for device identification and authentication of an offline payment transaction at a later time, are then sent to the payment object reader, as shown in step 418.

At step 420, the POS terminal (or the payment object reader 206) processes the received fingerprint, e.g., performs signal modulation and conditioning. The reader (or a remoter server) also creates a buyer digital signature or device-payment object relationships including the obtained digital device fingerprints and data pertaining to the transaction, for example, the location and time of the transaction or buyer, or the card information. In one implementation, the payment object reader 206 further encrypts the received digital signature and transmits the encrypted signature to the POS terminal via a short range communication network, e.g., the Bluetooth connection (step 422). In one embodiment, the POS terminal then compares the syntax and content of the buyer digital signature with cached registered signatures to confirm whether or not buyer digital signature corresponds to a registered device or a known fraudulent device (step 424). In another embodiment, the payment object reader 205 then transmits the buyer digital signature to one or more buyer mobile devices, such as those determined to be proximate to the POS terminal based on geo-fence data, to determine whether or not the buyer digital signature corresponds to a registered or known fraudulent device or merchant or customer.

The payment object reader 206 and the POS terminal access cached data obtained from the PPS 242 at an earlier time when online mode had been established and network connectivity between the PPS 242 and the POS terminal enabled communication and transfer of cached data. The cached data includes risk data pertaining to risk parameters, such as history of declined transactions at a merchant location, history of declined transactions related to a customer, history of declined transaction If the match operation (step 426) as a result of the comparison at step 424 yields a "Yes," the flow transitions to step 428, or optionally to step 432 (as shown). First, the PPS 114 identifies the buyer as a known user (e.g., after performing the comparison itself, or after receiving a confirmation from a buyer mobile device proximate to the POS terminal after the buyer mobile device performs the comparison, etc.). Then, the POS terminal authorizes the offline payment transaction as approved since the device was previously registered and is known to be low risk. Optionally, the POS terminal can reject an offline transaction previously authorized by the chip of the payment object, as the risk analysis yields the user to be fraudulent (step 428). Alternatively or additionally, the payment object reader 206 confirms to check whether there are any rules associated with the device, which restrict or override authentication via device as shown in step 432. For example, the rule may be reject or approve all transactions during peak hours between 9:00 AM to 5:00 PM.

If the match operation (step 426) as a result of the comparison at step 424 yields a "No," the transaction is passed as previously authorized by the chip of the payment object. In this case, the buyer may need to provide authentication code in the conventional manner to proceed with the transaction (step 430).

At step 432, the POS terminal also checks whether the registered device corresponding to the buyer digital signature is associated with any rules or conditions that restrict the use of the registered buyer device as a tool for payment authentication. Additional determination is whether the condition is valid for the current payment transaction. If the condition restricts use of the buyer device for authentication due to the conditions, the flow transitions to step 430. However, if there are no conditions or the condition does not apply to the current transaction, the offline payment transaction is authenticated or declined through the presence of buyer device. For example, the rules may allow the buyer to use the credit card unconditionally, but the fingerprint connected to the credit card and device may be authorized for a payment of a certain amount only, or unauthorized for certain purchases. Thus, the restrictions can define the time and/or manner in which the buyer can use device as an authentication tool. Conditions on the time of use of the device can include, for example, limiting to or exclusion of specific dates or date ranges, specific days of the week, specific time ranges within a day (e.g., "11:00 AM to 2:00 PM" or "lunchtime"), etc., or any combination thereof. Conditions on the manner of use of the device can include, for example, limiting to or exclusion of specific merchants or types/categories of merchants (e.g., restaurants); limiting to or exclusion of particular goods or services; setting a maximum amount per transaction, or per merchant, or per merchant per transaction (which could apply to a specific merchant or to all merchants); limiting to or exclusion of a particular location or locations where the funds can be used, etc., or any combination thereof. Further, the buyer can be allowed to specify exceptions to some or all of the conditions. Hence, the conditions can be in the form of a whitelist (allowable items), or a blacklist (non-allowable items), or a combination thereof. At least some of the conditions may be hyperlinked to take the buyer to additional pages/screens, to allow the buyer define more-specific conditions.

For example, by using the PPS 114, a parent (the funder or account holder) of a school-age child (the beneficiary and also the buyer whose fingerprint is registered) can allocate $40 from the parent's bank account per week, for use by the child only for the purpose of buying lunch during school days and in offline mode. The funder specifies to the PPS 114 which funds are to be provided, the identity of the beneficiary and the conditions to be imposed on the beneficiary's use of the funds; these items of information collectively form at least part of an "allowance plan" that is stored by the PPS 114 in a database and used by the PPS 114 to regulate the beneficiary's subsequent use of the funds. The PPS 114 has access to an account of the funder that contains those funds and can draw upon those funds as needed. This allowance plan can be saved in offline mode on the user's device and cached from the PPS 114 onto the merchant's POS terminal when in online mode. Since, the child is likely to go to the same merchant everyday, the allowance plan can be locally saved on the merchant POS terminal for easy access.

The beneficiary can then make use of the funds by using one of various predetermined payment mechanisms (discussed further below) to initiate a transaction with a third party, such as a merchant. When the beneficiary initiates a transaction, the POS terminal (without any connection to the PPS 114) receives and evaluates information about the requested transaction against the conditions specified (by the funder) in the allowance plan. Based on that evaluation, the POS terminal determines whether to authorize payment for the transaction from the specified funds of the funder using the device. In some embodiments, the POS terminal may receive or determine information that allows it to make a preliminary authorization decision even before a transaction has been initiated.

When the connection between the POS terminal and the PPS 114 is established, the actual fund transfer occurs. The POS terminal reports the transaction details in online mode. In response to identification of the buyer's financial account and based at least on one or more conditions (restrictions), the PPS 114 through the acquirer 112 and issuer 114 computing systems, causes the funds to be transferred from the user's financial account to the merchant's financial account (step 436).

If, however, the authorization cannot be made, say due to insufficient funds or a restriction, the POS terminal 104 notifies the buyer that he/she is not a registered and to provide with another object through stored customer communication identification (step 434). The POS terminal 104 may further generate real-time instructions to facilitate the merchant to allow registration at this time. For example, the POS terminal 104 presents real-time and customized instructions, such as, "press a button located at the bottom of the reader," "turn the device off for five seconds" "register your device at this time," "move the device an inch closer to the terminal," "do you need additional assistance?" "connecting to a support representative," "your bank has approved registration," and so on. To this end, the merchant 109 submits user engagement input in response to each of the configuration instructions while the POS terminal waits. Other examples of user engagement input include providing authentication or security keys as a visual, audio or haptic input.

As mentioned before, in some cases, the PPS or the POS terminal can perform the process of registering, either in parallel with the payment object reader or exclusively. In such cases, the process includes establishing one or more communication channels between a plurality of components within the payment system and the communication device through the selected communication port; obtaining, by each of the plurality of components, the device characteristic corresponding to the communication device; generating, by each of the plurality of components, instances of the digital device fingerprints corresponding to the communication device based at least in part on the obtained device characteristic; and then corroborating the instances of the digital device fingerprints to determine the authenticity of the communication device in relation to the transaction activity. And if the corroboration indicates that another component separate from the communication device more accurately matches the authorization standards, the POS terminal can recalibrate the authorization of the payment transaction.

In some cases, the digital device fingerprint can be an aggregated device fingerprint obtained from a cluster of devices. To this end, a cluster indicator can be accessed to determine whether the registered fingerprint corresponds to a fingerprint from a cluster of buyer devices. This can be performed in selected cases, for example in scenarios where the existing fingerprint has been found to be substantially similar to the digital device fingerprint. In some cases, the cluster indicator can also indicate whether the existing fingerprint includes an order of the cluster of communication devices. The fingerprints corresponding to a cluster of devices are now discussed with reference to FIG. 5.

FIG. 5 is a sequence flow diagram illustrating a method of detecting a cluster of registered devices at the time of an authentication of an offline payment transaction, according to another embodiment of the present subject matter. The process 500 can be performed by one or more components, devices, or modules such as, but not limited to, the mobile device, the payment processing system, merchant device or POS terminal, or payment beacon or other components or devices. For the sake of explanation, the description hereinafter is described with reference to components described in FIG. 2. As illustrated in FIG. 5, the process 500 includes a set of operations from block 502 to block 532.

The process 500 starts with the operation at block 502. A buyer 202 with a cluster of buyer devices 202-1, 202-2, . . . 202-N, approaches a checkout area at a merchant location, which is equipped with a payment object reader 206 (step 502) and presents a method of payment, e.g., a payment object like an EMV-credit card or a debit card, into the payment object reader 206 (step 504) The payment object reader 206 may store the location coordinates of the buyer. The payment object reader 206 scans the payment object that was inserted or otherwise introduced in the payment object reader 206. For example, the payment object reader 206 scans the payment object information, e.g., the last four of the card data and PAN and determines the transaction to be in offline mode (step 506).

After obtaining card information, the payment object reader 206 proceeds to detecting entry of the buyer device 202-1, . . . N through location detection techniques, such as techniques based on triangulation, trilateration, multi-laterations, geo-fence, global or local positioning systems, and the like. This step may be performed contemporaneous to the step of scanning the payment object. Additionally, the payment object reader 206 can use buyer location to further zero in on the devices that is most likely to be the buyer's (step 508). Thus, all devices in close proximity to the buyer 202 may be tagged as buyer devices. Optionally, the buyer can indicate which devices, for example through a registration application executing on a mobile device, belong to him. In some implementations, the payment object reader 206 constantly or at predefined intervals scans entry of a buyer device or a specific cluster of buyer devices (in a specific order or without) into a geo-fence of the payment object reader 206. Accordingly, it may send request for authorization of the payment transaction to the detected devices.

The payment object reader 206 then determines how it can interact with the recognized buyer device or devices. For this, the payment object reader 206 sends preliminary signals or data to explore communication ports in the device, which are available for access and communication. In one implementation, the payment object reader 206 sends signals to a first communication device, or a primary device before probing other devices (step 510). Accordingly, the device detection component 228 of the payment object reader 206 generates payload and/or detection sequences adapted based on the available communication ports and in accordance with the communication protocols on which the ports operate (step 512).

In other implementations, a unique payload is generated every time. The detection sequences can be in the form of specific signals requesting the device to respond in a certain way. The detection sequences can also be information-gathering requests configured to obtain device fingerprints from the buyer devices. Device fingerprints include radio, mechanical or operational fingerprints—such as radiated performance, device defects, sensor performance, communication speed or lags, spectrum data, and the like. The payload may be different for different devices or the same. Further, the payment object reader 206 either queries all relevant devices at the same time or in quick succession. In other implementations, the payment object reader 206 first verifies whether a first device is registered before querying a second or third device.

The targeted buyer devices receive the payload and detection sequences via the appropriate communication ports and protocols (step 514) and respond accordingly. In some cases, the responses may be encoded at the buyer device level. The buyer device can also apply tokenized pseudo-random numbers (also referred to as hash keys) to the feature vectors to generate the device fingerprint. A National Institute of Standard and Technology (NIST) compliant True Random Number Generator (TRNG) can generate the pseudo-random numbers. The encoding can also be done based on keys generated by a cryptographic unit (not shown). Examples of keys include authentication keys, which include SCP03 master keys (Message Authentication Code Key: MAC, Encryption Key: ENC and Key Encryption Key: KEK, which are 256-bit Advanced Encryption Standard (AES)

symmetric keys with associated key derivation data) or Key Agreement Keys (e.g., user server signature verification public key, user server static public key, user static key pair with both public and private key). The encrypted fingerprint can also be created using other schemes, such as fuzzy vault algorithm, a cancelable fuzzy vault scheme based on irreversible hash functions, fingerprint minutiae algorithms based on a thinned fingerprint image as opposed to an original fingerprint image using hash functions, such as hash functions, such as MD, RIPEMD, and SHA. (Step 516.)

The responses form the device fingerprints corresponding to each of the devices, along with their location coordinates, which are to be used for device identification and authentication of a payment transaction at a later time, are then sent to the payment object reader, as shown in step 518.

At step 520, the payment object reader 206 processes the received fingerprint, e.g., performs signal modulation and conditioning. The reader (or a remoter server) also creates a buyer digital signature or device-payment object relationships including the obtained device fingerprints and data pertaining to the transaction, for example, the location and time of the transaction or buyer, or the card information. In one implementation, the payment object reader 206 further encrypts the received digital signature and transmits the encrypted signature via a short range communication network, e.g., Bluetooth connection (step 522). The payment object reader 206 also saves in the signatures additional details as to the location of the devices with respect to the object. For example, the payment object reader 206 records that a device 202-1 was to the left of the reader, while device 202-2 was located on the right. Further, it may record device particulars, for example the operating system or device type (wearable device, mobile device, tablet, etc.) along with the data. The data mappings are therefore complex and no longer a 1:1 relationships. The device-object relationships in the signature are therefore cluster relationships.

In one embodiment, the PPS 114 then compares the syntax and content of the buyer digital signature with cached registered signatures to confirm whether or not buyer digital signature corresponds to a registered cluster signature. The payment object reader 206 and the POS terminal access cached risk data obtained from the PPS 242 at an earlier time when online mode had been established and network connectivity between the PPS 242 and the POS terminal enabled communication and transfer of cached data. The cached data includes risk data pertaining to risk parameters, such as history of declined transactions at a merchant location, history of declined transactions related to a customer, history of declined transactions related to the payment object, or the communication device associated with the customer. Such risk data may be stored within merchant, customer, payment object and communication device profiles respectively.

So, the payment object reader determines whether the cluster devices and the distribution of the devices in the cluster matches with the stored signature (step 524). In another embodiment, the POS terminal then transmits the buyer digital signature to one or more buyer mobile devices, such as those determined to be proximate to the POS terminal based on geo-fence data, to determine whether or not the buyer digital signature corresponds to a registered device.

If the match operation (step 526) as a result of the comparison at step 424 yields a "Yes," the flow transitions to step 528. First, the POS terminal identifies the buyer as a registered user (e.g., after performing the comparison itself, or after receiving a confirmation from a buyer mobile device proximate to the POS terminal after the buyer mobile device performs the comparison, etc.). Then, the POS terminal re-authorizes the payment transaction as approved since the cluster of devices was previously known to be authentic (step 528). Alternatively, the POS terminal identifies the buyer as a known fraudulent user (e.g., after performing the comparison itself, or after receiving a confirmation from a buyer mobile device proximate to the POS terminal after the buyer mobile device performs the comparison, etc.). Then, the POS terminal rejects the offline payment transaction since the cluster of devices was previously known to be fraudulent (step 528). In some cases, the device fingerprinting may be a secondary or a first method of authorization. The second method of authorization can be a user engagement, in the form or a key or tap entry. To this end, the method includes receiving a request for authorization of the transaction activity on a most proximate payment system in response to a determination of a current geographical location of the communication device and a proximate payment system based on a current geographical location of neighboring payment systems with respect to the communication device; establishing one or more communication links with the payment processing system and through the payment system to send a confirmation message to the buyer, the confirmation message including a confirmation link; and sending, to the payment processing system, an indication of buyer engagement with the confirmation link, wherein the buyer engagement includes an additional identifier selected from a group of a buyer name, a buyer address, a buyer email address, a buyer phone number, a social security number, a passcode set at the time of registration of the communication device, and a transaction detail, wherein the transfer of the money transfer amount is authorized in response to the received indication of the buyer engagement.

If the match operation (step 526) as a result of the comparison at step 424 yields a "No," the offline transaction continues to be authorized as per chip logic and the buyer may need to provide authentication code in the conventional manner to proceed with the transaction (step 530).

At step 532, the PPS 114 also checks whether the registered device corresponding to the buyer digital signature is associated with any rules or conditions that restrict the use of the registered buyer device as a tool for payment authentication. Additional determination is whether the condition is valid for the current payment transaction. If the condition restricts use of the buyer device for authentication due to the conditions, the flow transitions to step 430. However, if there are no conditions or the condition does not apply to the current transaction, the payment transaction is authenticated through the presence of buyer device. For example, the rules may allow the buyer to use the credit card unconditionally, but the fingerprint connected to the credit card and device may be authorized for a payment of a certain amount only, or unauthorized for certain purchases. Thus, the restrictions can define the exact combination or location of devices in the cluster (e.g., device 202-1 and 202-2 must be present). Conditions on the manner of use of the device can include, for example, limiting to or exclusion of specific merchants or types/categories of merchants (e.g., restaurants); limiting to or exclusion of particular goods or services; setting a maximum amount per transaction, or per merchant, or per merchant per transaction (which could apply to a specific merchant or to all merchants); limiting to or exclusion of a particular location or locations where the funds can be used, etc., or any combination thereof. For example, requiring devise 202-1 and 202-2 to be present at merchant location A, while devices 202-1, . . . 202-N to be located at other merchants. Further, the buyer can be allowed to specify exceptions to some or all of the conditions. Hence, the conditions can be in the form of a whitelist (allowable items), or a blacklist (non-allowable items), or a combination thereof. At least some of the conditions may be hyperlinked to take the buyer to additional pages/screens, to allow the buyer define more-specific conditions.

If, however, the authorization cannot be made, say due to restriction, the POS terminal 104 notifies the buyer that he/she is not a registered and to retry with another object (step 534). The POS terminal 104 may further generate real-time instructions to facilitate the merchant to allow manual entry of an authorization code at this time. To this end, the merchant 109 submits user engagement input in response to each of the configuration instructions while the POS terminal waits. Other examples of user engagement input include providing authentication or security keys as a visual, audio or haptic input.

FIGS. 6A and 6B collectively illustrate a process 600 for risk management in transactions occurring on a point-of-sale (POS) terminal or POS device when the device is in an offline mode, according to an embodiment of the present subject matter.

FIG. 6A illustrates, at 602, a POS device receiving, in an online mode, encrypted data associated with previous transactions from a payment service, such as PPS 608. The PPS may save the encrypted data in a merchant profile on one or more computing devices. In some embodiments, a merchant may modify the respective merchant profile, and may select a set of criteria to be included in the encrypted data. The set of criteria may include, but is not limited to, information regarding prior payment instrument approval (i.e., designating the customer as trusted), customer information, known low-risk or high-risk customer devices, or cluster of devices, and/or customer payment history. In some embodiments, the encrypted data may include information regarding stolen cards and/or known nefarious customers (i.e. customers who are known to have payments declined).

As depicted at 602, the data may be encrypted using bloom filters with hash functions. The bloom filter may use the hash functions to determine information about a customer without the risk of the customer's payment instrument identifier being stolen or otherwise used in a nefarious manner (e.g., through reconstruction). In various embodiments, the hash functions hash or map the customer's payment instrument identifier (i.e., an element) to designated array positions of a bloom filter array to test whether the criterion is met (i.e., a positive match occurs when all of the mapped-to array positions have a value of one "1"; no match occurs, and the criterion is not met, if any of the array positions contain a zero ("0")). In some embodiments, the payment instrument identifier may be truncated to a number less than the standard 16 or 17-digit identifier number. For example, the hash functions may truncate a payment instrument identifier to a 10-digit number, and map the 10-digit number to the bloom filter array. Though bloom filters with hash functions are described herein, it is imagined that the other encryption techniques may be used to maintain the security of customer information, such as hash tables, simple arrays, and the like.

In various embodiments, the POS device may incorporate a plurality of bloom filters, each designated to determine if a customer meets one or more criteria of a particular merchant. The criteria may be based on transaction history, customer data, customer device information through device fingerprints, and/or customer history. For example, a bloom filter and/or hash function may be designated to determine that a customer is a member of a merchant loyalty program (e.g., a frequent buyer reward program). In some embodiments, the POS device may incorporate one bloom filter (for a particular merchant) with one or more hash functions, each hash function configured to determine if the payment instrument identifier and/or customer satisfies one or more criteria. Each bloom filter may be sized based upon the merchant profile of the particular merchant.

In various embodiments, the size of a bloom filter (i.e., size of the array and number of hash functions) may be determined based upon a false positive tolerance. In such embodiments, the false positive tolerance may be a factor of the importance of each criterion. Thus, the more important the criterion, the lower the tolerance for a false positive.

In various embodiments, the merchant and/or PPS may designate a tolerance by inputting a probability percentage for false positives (i.e., a merchant will tolerate a 1% chance of a false positive). The tolerance may be set for all bloom filters in a merchant profile, or it may be set per criterion. For example, a bloom filter designated to determine whether a payment instrument identifier of a customer is associated with a customer loyalty program may be sized such that the probability of a false positive is relatively high (i.e., >1%). Whereas a bloom filter designated to determine if a payment instrument identifier is associated with a fraudulent transaction may be sized for a low probability of false positives (i.e., <1%).

In various embodiments, the POS device may comprise at least a merchant application for processing transactions. The merchant application may receive and store data from the merchant profile. In some embodiments, the merchant application may process and save transaction data locally on the POS device.

At 604, the POS device transitions from the online mode to an offline mode. While operating in the offline mode, a merchant may swipe an EMV payment instrument, or otherwise input payment instrument information, into the POS device in order to process a transaction.

At 606, first the chip of the payment instrument determines whether or not to approve the transaction. If the chip approves, the POS device performs a second authentication to determine if the customer, customer's device and/or payment instrument is associated with a previous successful (or even unsuccessful) transaction. In various embodiments, the POS device may use a bloom filter with a hash function to make the determination. In such an embodiment, the hash functions in the bloom filter may map or hash a payment instrument identifier to an array stored in the bloom filter to determine if the payment instrument identifier has (most likely) been used in a previous successful transaction. One skilled in the art understands that a bloom filter may have a false positive result. Thus, if the payment instrument identifier matches to all ones "1's" in the bloom filter array, the probability is high that the payment instrument has been used in a previous successful transaction. As previously discussed, the false positive rate may be managed by optimizing the size of the bloom filter.

FIG. 6B continues the illustration of the process 600 and, at 608, the bloom filter determines if the payment instrument or the payment device has (most likely) been used in a previous successful transaction. The bloom filter may make the determination by matching the payment instrument with positions in a bloom filter array, the positions being associated with one or more payment instruments. Responsive to determining a match, the bloom filter may recognize that the payment instrument has (most likely) been used in a previous successful transaction, and may thus may recognize the customer as a trusted customer. The POS device may then provide an indication to the merchant that the customer is a trusted customer.

In various embodiments, responsive to recognizing the customer as a trusted customer, the POS device may automatically proceed with the transaction. In some embodiments, the POS device may provide, via a graphical user interface (GUI), an option for the merchant to select either proceeding with or cancelling the transaction. For each transaction, the POS device may store the transaction data (i.e., date, time, amount of the transaction, item(s) purchased, etc.), payment instrument information, customer data, and any other relevant information.

FIG. 6B illustrates, at 610, the bloom filter determining there is no match between the payment instrument identifier and the array stored in the bloom filter (i.e., at least one position the payment instrument identifier is mapped to contains a zero "0"). Responsive to the determination that there is no match, the POS device may inform the merchant that the payment instrument has not been used in a previous successful transaction with the merchant. In various embodiments, responsive to determining there is no match, the POS device may designate the customer as an untrusted customer, and/or may warn the merchant of the increased risk in processing transactions with the customer while offline.

Alternatively, responsive to the determination that there is a match with a known fraudulent user, the POS device may inform the merchant that the payment instrument has been used one or more times in a previous unsuccessful transaction with the merchant. In various embodiments, responsive to determining there is such match, the POS device may designate the customer as an untrusted customer, and/or may warn the merchant of the increased risk in processing transactions with the customer while offline.

In the illustrative example, the POS device may provide, via a graphical user interface (GUI), an option for the merchant to proceed with or to cancel the transaction. In such examples, the merchant may choose to accept the risk of an unsuccessful transaction. In some examples, the POS device may automatically cancel the transaction.

Responsive to allowing a transaction with no match to occur, the POS device may flag the transaction as risky. Additionally, the POS device may store the transaction data (i.e., risky purchase, date, time, amount of the transaction, item(s) purchased, payment instrument information, customer data, etc.).

At 612, the POS device transitions from the offline mode to the online mode. Responsive to establishing connectivity, the POS device may send, to the payment service, the stored transaction data. The payment service may request approval for the transactions that occurred while in the offline mode. The payment service may also update the merchant profile with the transaction data, and may add new trusted customers, and the respective customer information, for subsequently approved transactions and/or customer information for subsequently declined transactions.

In various embodiments, the POS device may, while operating in the online or offline mode, generate one or more bloom filters, each with a plurality of hash functions and at least one array. In such embodiments, the merchant may input one or more payment instrument identifiers (i.e., elements) associated with one or more customers into the POS device. Responsive to the input of a payment instrument identifier, the plurality of hash functions of a bloom filter may save the payment instrument identifier by mapping or hashing the payment instrument identifier to an array (i.e., changing the mapped-to array positions to "1"). One skilled in the art understands that when the payment instrument identifier is saved in a bloom filter, it will recognize the payment instrument identifier in subsequent transactions.

In various embodiments, the locally generated bloom filter may be stored in and accessed by the POS device. In some embodiments, the bloom filter generated by the POS device may be uploaded to the merchant profile maintained by the payment service, and used to augment the one or more bloom filters provided by the payment service.

Figure 7:
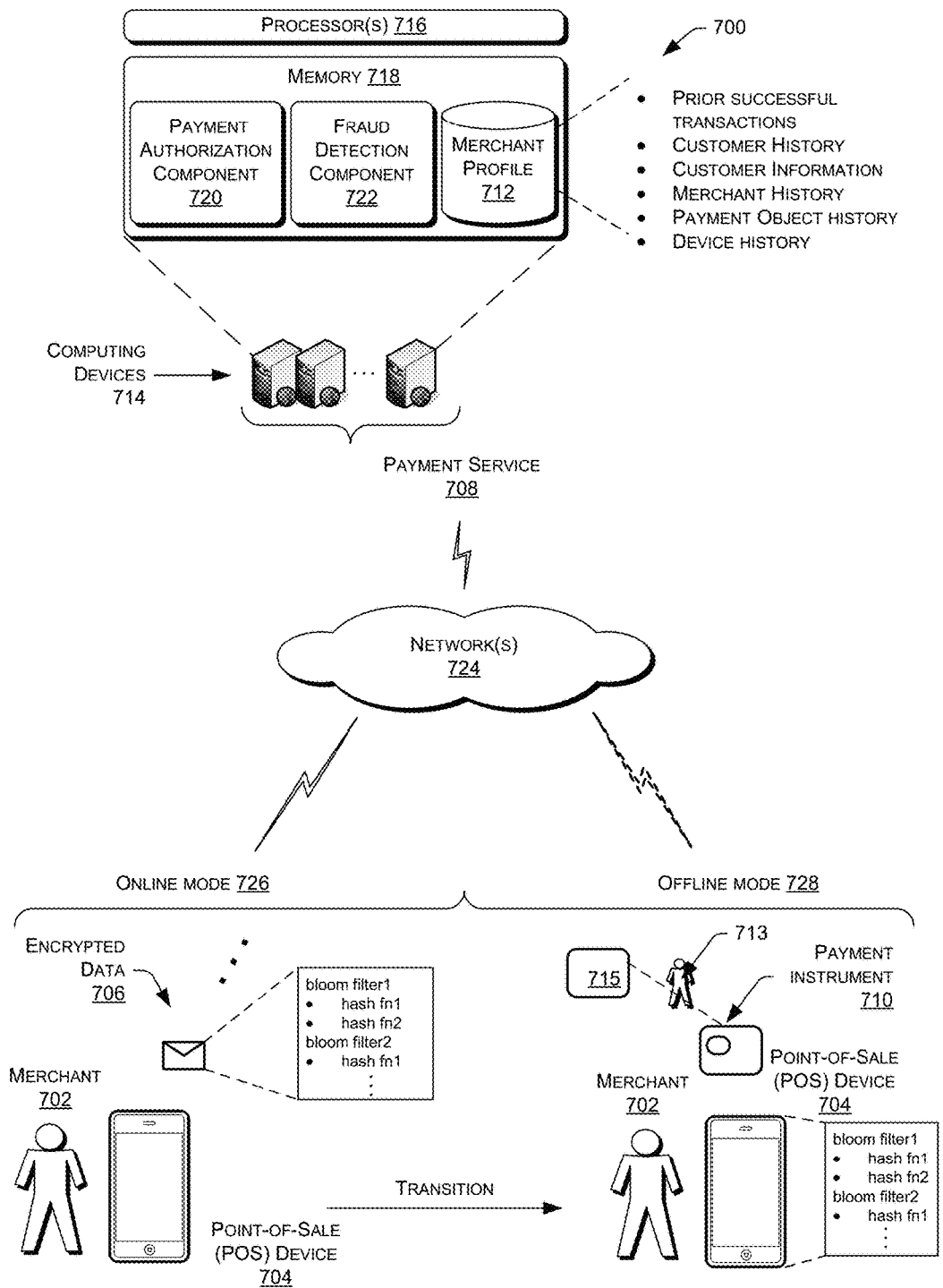
FIG. 7 is an example environment that includes a merchant operating a mobile point-of-sale (POS) device to receive encrypted data associated with multiple payment instruments previously used in successful transactions, when the POS device is in an online mode, according to an embodiment of the present subject matter.

FIG. 7 illustrates an example environment that includes a merchant 702 operating a mobile point-of-sale (POS) device 704 or POS terminal 704 to process transactions in offline mode, according to an embodiment of the present subject matter. The POS device 704 may receive encrypted data 706 from a payment service 708, and may use the encrypted data 706 to reduce the risk of fraudulent transactions in offline mode.

The POS device 704 may comprise any sort of mobile or non-mobile device that includes an instance of a merchant application that executes on the respective device. The merchant application may provide POS functionality to the POS device 704 to enable the merchant 702 (e.g., an owner, employees, individual user, etc.) to accept payments from the customers 703 associated with payment instruments (such as payment objects and/or communication devices 705). In some types of businesses, the POS device 704 may correspond to a store or other place of business of the merchant, and thus, may be a fixed location that typically does not change on a day-to-day basis. In other types of businesses, however, the POS device 704 may change from time to time, such as in the case that the merchant operates a food truck, is a street vendor, a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of goods and/or services that is conducted between a customer and a merchant. In an example of a legitimate customer/merchant transaction, when paying for a transaction, the customer may provide the amount that is due to the merchant using a payment instrument 710 (e.g., a payment card with EMV or EMV like functionality equipped with an integrated circuit or intelligent chip). The merchant can interact with the POS device 704 to process the transaction, such as by inputting (e.g., manually, via a magnetic card reader or an RFID reader, etc.) an identifier associated with the payment instrument 710. For example, a payment instrument of one of the customers may include smart cards having a built-in memory chip, a radiofrequency identification tag, or so forth.

As used herein, encrypted data 706 may include encrypted payment instrument identifiers associated with previous transactions, customer history, known high risk or low risk customer devices, other environmental data, and/or customer information. The encrypted data 706 may be stored in one or more bloom filters and encrypted using hash functions. The payment service 708 may periodically send encrypted data 706 to the POS device 704 in one or more bloom filters.

As illustrated, the payment service 708 may store the encrypted data in a merchant profile 712 on one or more computing devices 714. The computing devices 714 may include one or more processors 716, and a memory 718, which may store a payment authorization component 720, a fraud detection module 722, and the merchant profile 712. In various embodiments, the merchant 702 may manage the merchant profile 712, selecting the customer information desired by merchant 702. For example, the merchant may want to know a) if a customer has purchased any goods or services from the merchant in the past, b) if the customer has spent over $1000 with the merchant, and c) if the customer is a member of a merchant loyalty program. In such an example, each one of a, b, and c may be stored in one or more bloom filters with one or more hash functions.

In some implementations, the payment service 708 may also provide the merchant 702 with fraudulent transaction data. Fraudulent transaction data may be stored in the fraud detection component 722, and may include identifiers associated with stolen payment instruments and/or information regarding known nefarious customers (i.e., customers known to have previous unsuccessful transactions, etc.).

In various implementations, payment service 708 may send encrypted data 706 and/or fraudulent transaction data via a network 724, while the POS device 704 is in an online mode 726. The POS device 704 may store the encrypted data 706 and/or fraudulent transaction data in a local memory. In some embodiments, the encrypted data 706 and/or fraudulent transaction data may be stored in association with one or more applications on the POS device 704. The POS device may access the encrypted data 706 and/or fraudulent transaction data while the POS device is operating in the online mode 726, or in an offline mode 728.

During a transaction, the POS device 704 may receive an identifier associated with a payment instrument 710. In various embodiments, the POS device 704 may compute an element for the identifier. For example, the POS device may truncate a payment instrument identifier from a 16 or 17-digit number to a 10-digit element. The POS device 704 may apply the payment instrument identifier or the element to the encrypted data 706 (bloom filter arrays) to determine if there is a match. If there is a match between the payment instrument identifier or the element and the encrypted data 706, the merchant may know the customer is a returning customer (i.e., the payment instrument has been used in a previous successful transaction). After determining a match, the POS device 704 may apply the identifier to one or more other bloom filters and/or hash functions to determine additional customer information, such as whether the customer is a member of a loyalty program. The POS device 704 may determine and display the additional customer information as set by the merchant profile 712.

Knowing the payment instrument 710 or customer's device has been used in previous successful transactions, the merchant may be certain of a decreased risk in a fraudulent transaction with the customer. In various embodiments, while operating the POS device in the offline mode, the POS device may automatically process the transaction if there is bit array match.

If there is no match between the payment instrument identifier and the encrypted data, the merchant 702 may know the customer is not a returning customer. The POS device 704 may provide a warning to the merchant 702, informing the merchant of an increased risk in processing the transaction. In various embodiments, while operating in the offline mode 728, the POS device may provide an option for the merchant 702 to proceed with, or cancel, the transaction. In some embodiments, the POS device may automatically cancel the transaction if there is no payment instrument identifier (or element) to bit array match.

In various embodiments with a fraud detection module 722, the POS device may determine a match between payment instrument identifiers associated with fraudulent transactions and the payment instrument used in the particular transaction. If a match exists, the POS device may automatically cancel the particular transaction and/or may provide a warning to the merchant 702.

With each transaction, the POS device may store data describing the transaction, such as the identifier of the payment instrument 710, an amount of payment received from the customer, the item(s) acquired by the customer, a time, place and date of the transaction, and so forth. The POS device 704 may send the transaction information to the payment service 708 over a network 724, either substantially contemporaneously with the conducting of the transaction (in the case of online transactions) or later when the POS device 704 is in the online mode 726 (in the case offline transactions). Responsive to receiving the transaction information, the payment service 708 may update the merchant profile 712 and/or the fraudulent detection module 722.

The POS device 704 may be configured to transition between an online mode 726 and an offline mode 728 (and vice versa) based on an array of different reasons such as a loss of network connectivity or the merchant 702 manually switching the POS device 704 between modes. In the illustrated example, the merchant 702 conducts numerous transactions on the POS device 704 while in the offline mode 714 by swiping or otherwise inputting information regarding respective payment instruments 710.

Figure 8:
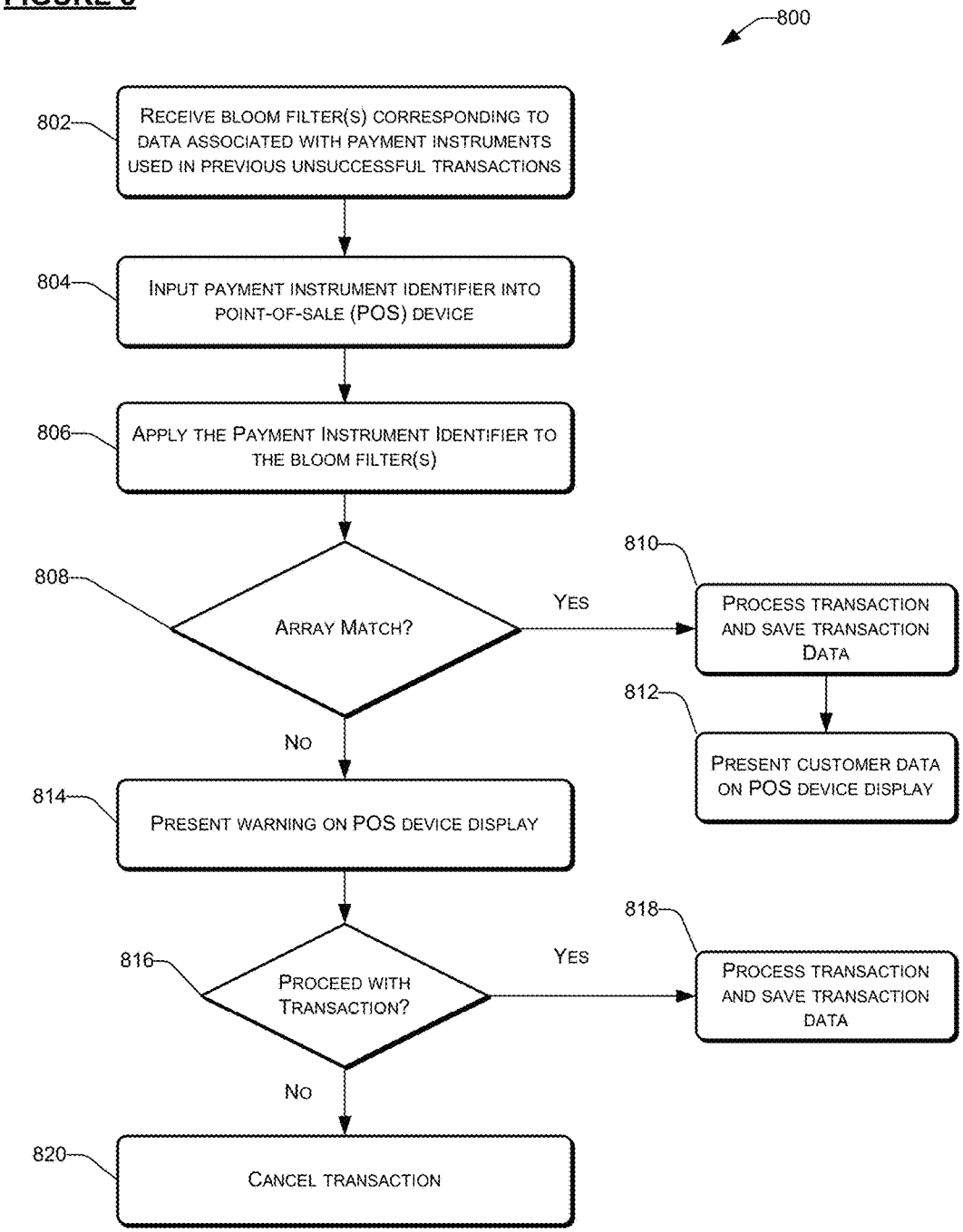
FIG. 8 illustrates a flow diagram of a process for managing risk in offline transactions by verifying the payment instrument is associated with a prior successful transaction, according to an embodiment of the present subject matter.
Figure 9:
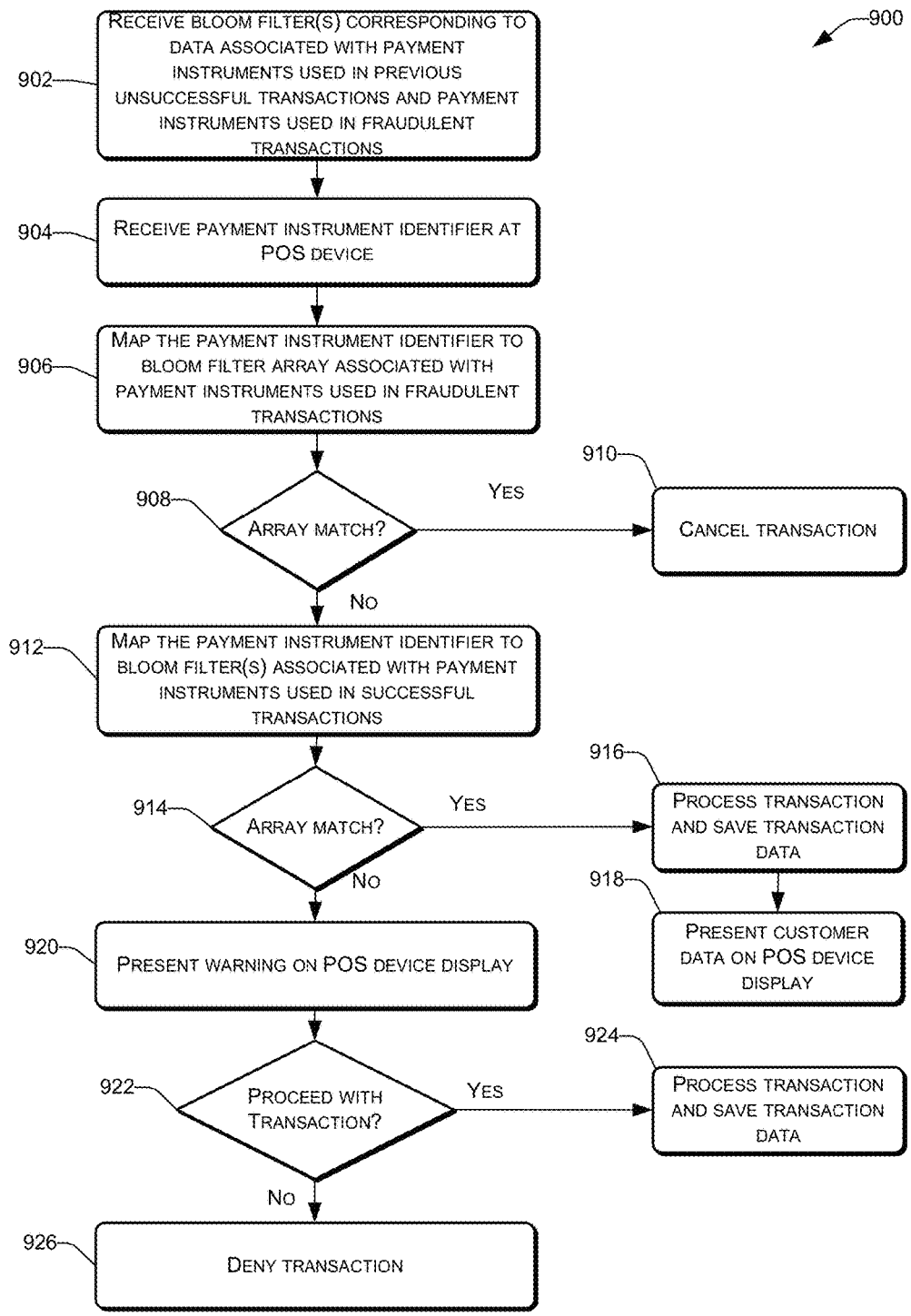
FIG. 9 is a flow diagram that illustrates a process for managing risk in offline mode payment transactions by ensuring a payment instrument has not been associated with prior fraudulent transactions, according to an embodiment of the present subject matter.

FIGS. 8 and 9 illustrate flow diagrams of processes for managing risk of merchant transactions by verifying prior successful use of the payment instrument. If the payment instrument has not been previously been associated with a successful transaction, the POS device may refrain from processing the current transaction. Alternatively, of the payment instrument has been previously been associated with an unsuccessful transaction or unsuccessful customer device, the POS device may refrain from processing the current transaction.

At 802, the process 800 receives encrypted data corresponding to payment instruments used in previous successful transactions. The encrypted data may also include customer data, such as customer information, customer devices, and customer transaction history. In various embodiments, the encrypted data may be transferred in the form of one or more bloom filters, each with one or more hash functions.

At 804, a merchant may input a payment instrument identifier into the POS device. The merchant may input the payment instrument identifier by inserting a smart card device into a smart card reader, or manually entering the identifier via a user interface. The POS device may be operating in an online or an offline mode. The merchant's POS device may also detect devices in the neighborhood of the POS devices. Such customer devices can be associated to known registered or known fraudulent users.

At 806, the process 800 maps the payment instrument identifier (i.e., element) to the bloom filter array to determine if the payment instrument identifier corresponds to a payment instrument which was previously used in a successful transaction (or optionally, an unsuccessful transaction). Additionally, the bloom filter array may also determine any known or associated devices with the payment instrument identifier. In various embodiments, the POS device may convert the payment instrument identifier into a smaller element. For example, the POS device may truncate the 16 or 17-digit identifier into a 10-digit element. In other embodiments, a larger or smaller element may be used.

At 808, the process 800 determines whether a match exists between the payment instrument identifier and the bloom filter (i.e., all positions the payment instrument identifier is mapped to in the bloom filter array have a value equal to "1"). If a match exists, at 810, process 800 processes the transaction and saves the transaction data. If the match is with respect to a fraudulent user, a previously authorized offline transaction is rejected. While the POS device is operating in an online mode, the transaction data may be sent to a payment service after payment authorization substantially contemporaneously with the process 800. While the POS device is operating in an offline mode, the transaction and authorization data is saved locally on the POS device, for later submission to the payment service for fund transfer.

At 812, the process 800 may apply merchant-specific criteria to one or more bloom filters to determine customer data. The customer data may include customer information and transaction history with the merchant. The customer data may be selected by the merchant, as designated in a merchant profile. For example, the merchant may want to know if each known customer has recently purchased goods and/or services from a competitor of the merchant.

If no match is determined between the payment instrument identifier and the bloom filter array (at least one position value equals "0"), process 800 presents a warning on the POS device display at 814. The warning may alert the merchant that it is not a returning customer, and to be wary of processing the transaction due to the increased risk in transacting with an unknown customer.

At 816, the process 800 determines whether to proceed with the transaction. While operating in an online mode, process 800 may proceed with the transaction 818 based on a payment authorization from the POS terminal and the chip of the payment object. While operating in the offline mode, process 800 may provide the merchant an option at 816 to accept the risk of a fraudulent transaction, and proceed with the transaction. If the merchant decides to proceed, the transaction may be processed and data may be saved to the POS device at 818. If not, then at 820, the process 800 cancels the transaction.

FIG. 9 illustrates a flow diagram of a process 900 for managing risk in offline transactions by ensuring a payment instrument has not been associated with prior fraudulent transactions, according to an embodiment of the present subject matter. If the payment instrument has been associated with a fraudulent transaction, the POS device may refrain from processing the current transaction.

At 902, the process 900 receives encrypted data corresponding to payment instruments used in fraudulent transactions. Process 900 may also receive encrypted data corresponding to payment instruments used in previous successful transactions. The encrypted data associated with successful transactions may also include customer data, such as customer information and customer transaction history. In various embodiments, the encrypted data may be in the form of in one or more bloom filters.

At 904, the process 900 receives a payment instrument identifier. The payment instrument identifier may be input into the POS device by inserting a smart card device into a smart card reader, or manually entering the identifier via a user interface. The POS device may be operating in an online or an offline mode.

At 906, the hash functions in the bloom filter map the payment instrument identifier to an array in the bloom filter, the array corresponding to payment instruments used in fraudulent transactions.

At 908, the process 900 determines whether a match exists between the payment instrument identifier and the array corresponding to payment instruments or customer devices used in fraudulent transactions. If a match exists, at 910, process 900 may cancel the transaction.

At 910, process 900 may provide a notification to the merchant, informing the merchant of a high likelihood of an association between the payment instrument/customer device and a prior fraudulent transaction.

If no match is determined between the payment instrument identifier and the array in the bloom filter corresponding to fraudulent transactions, at 912, process 900 maps the payment instrument identifier to one or more arrays in one or more bloom filters associated with payment instruments used in successful transactions.

At 914, the process 900 determines whether a match exists between the payment instrument identifier and the one or more bloom filter arrays associated with successful transactions.

If a match exists, at 916, process 900 processes the transaction and saves the transaction data. While the POS device is operating in an online mode, the transaction data may be sent to a payment service for payment authorization substantially contemporaneously with the process 900. While the POS device is operating in an offline mode, the transaction data is saved locally on the POS device, for later submission to the payment service for fund transfer.

In various embodiments, the process 900 maps the payment instrument identifier to a bloom filter array to determine whether the payment instrument is associated with a previous successful transaction. Responsive to an array match at 914, the process 900 may apply the payment instrument identifier to one or more bloom filters (mapping the identifier to one or more arrays), to determine customer data.

At 918, the process 900 may present the customer data on a POS device display. The customer data may include customer information and transaction history with the merchant. The customer data may be selected by the merchant, as designated on a merchant profile. For example, the merchant may want to know if each customer is a member of a merchant-specific loyalty program and has previously purchased over $1000 worth of goods from the merchant.

If no match is determined between the payment instrument identifier and bloom filter array associated with successful transactions, process 900 presents a notification on the POS device display at 920. The notification may alert the merchant that it is not a returning customer, and to be wary of processing the transaction due to the increased risk in transacting with an unknown customer.

At 922, the process 900 determines whether to proceed with the transaction. While operating in an online mode, process 900 may proceed with the transaction 924 based on a payment authorization from the payment service. While operating in the offline mode, process 900 may provide the merchant an option at 922 to accept the risk of a fraudulent transaction, and proceed with the transaction. If the merchant decides to proceed, the transaction may be processed and data may be saved to the POS device at 924. If not, then at 926, the process 900 may cancel the transaction.

Figure 10:
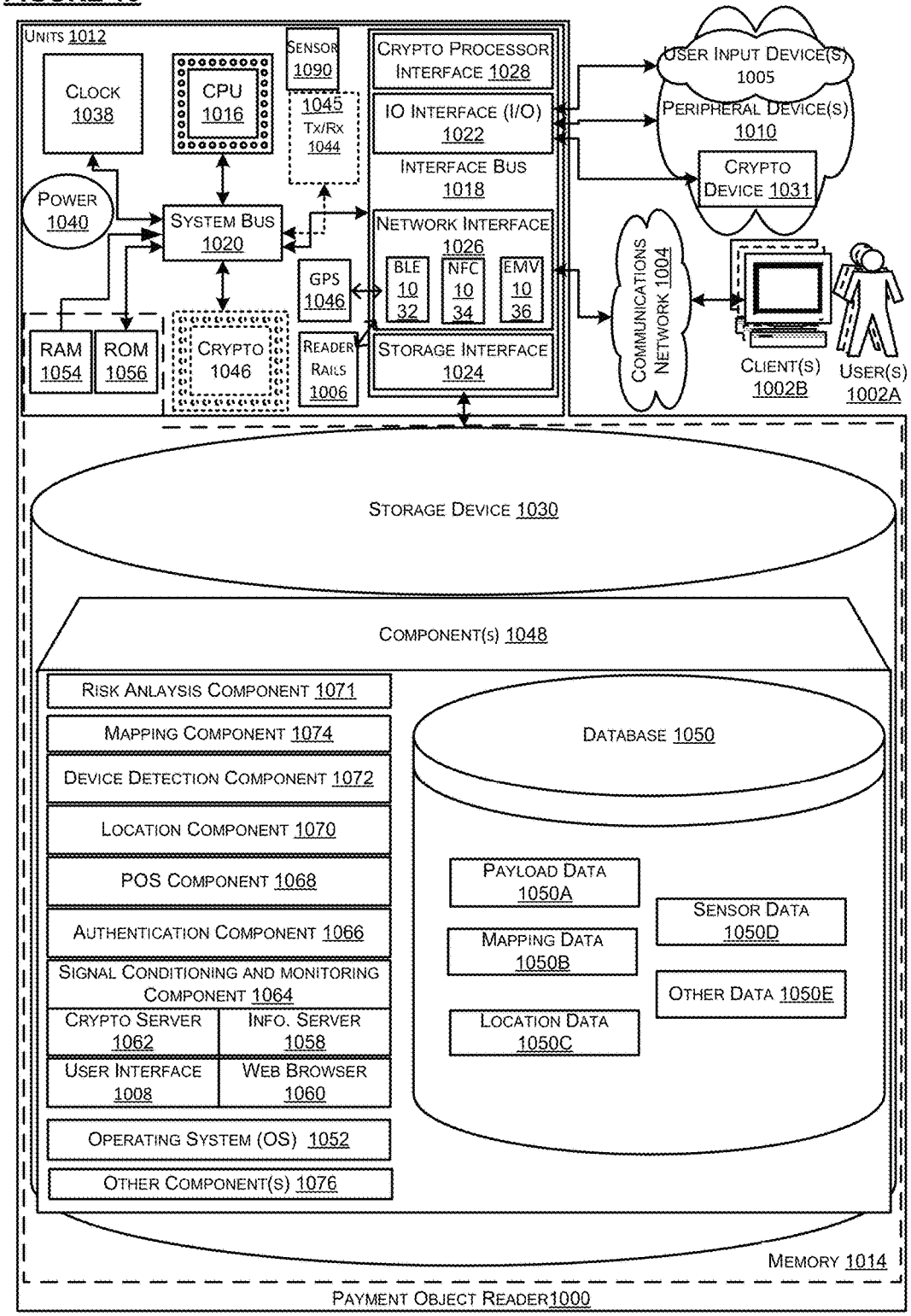
FIG. 10 is a block diagram illustrating components of a payment object reader, according to an embodiment of the present subject matter.

FIG. 10 is a block diagram illustrating embodiments of a payment object reader 1000 configured to allow processing of payment transactions between entities, such as a merchant and a buyer, or a sender and recipient of funds by authorizing transactions initiated by registered devices. In one embodiment, the payment object reader 1000 may serve to aggregate, process, store, search, serve, identify, instruct, generate, match, and/or facilitate interactions with a computer through various technologies, and/or other related data. The payment object reader 1000 may be used to collect data for later retrieval, analysis, and manipulation, which may be facilitated through an internal or external database. For example, the payment object reader 1000 on receiving payment related information may complete the transaction, generate receipt as proof of the transaction, update inventory of the product after the transaction, and obtain data related to the buyer involved in the transaction, such as transaction history, location data, and the like. In some implementations, the components of the payment object reader 1000 can also be found in a buyer device (for example, a mobile phone of a buyer), a merchant device (for example, a point-of-sale terminal for processing payment transactions), a remote, cloud-based entral server such as payment processing system, and a payment beacon to send and receive static or dynamic information, for example, the payment proxy, transaction summary or receipt, either perpetually or on activation. The devices may have fewer or more components than defined here as will be clear by context.

The payment object reader 1000 may communicate with a POS terminal (e.g., transaction processing software applications executing on a tablet, or a computer) and various neighboring and remote, but connected, devices, such as buyer devices. The payment object reader 1000 has the circuitry and logic to register a new device presented at the time of transaction along with a payment object, and mapping the device with the object or without the object for any subsequent payment transactions. The device may be registered in a variety of ways based on the characteristics that are obtained. For example, if the radiated performance is to be used as a factor in device registration and identification, the antenna transmitter and receiver of the payment object reader 1000 are initialized. In another example, if the manufacturing tolerances are to be measures, components like the sensors and accelerometers of the payment object reader 1000 are activated.

Users 1002A, who may be buyers, merchants, consumers, senders or recipients of funds, buyers, sellers, and/or other entities or systems, may engage information technology systems (e.g., computers, mobile devices, laptops, servers) to facilitate processing of information, such as transactional, financial, and so on. It should be noted that the term "server" as used throughout this application refers generally to a computer, other device, program, or combination thereof that processes and responds to the requests of remote users across a communications network. Servers serve their information to requesting "clients" 1002B connected to the users 1002A. The term "client" or "buyer device" as used herein refers generally to a computer, program, other device, user and/or combination thereof that is capable of processing and making requests and obtaining and processing any responses from servers across a communications network 1004. Networks 1004 facilitate the transfer of information from source points to destinations. The users (e.g., merchants) may directly interact with the payment object reader 1000, e.g., via the user inputs devices 605.

In one implementation, the payment object reader 1000 can be configured to receive a payment card or payment card information to process payment card transactions (i.e., those involving reading of a payment card physically provided by the buyer at the merchant's location), as well as card-not-present (CNP) transactions (i.e., those where the instrument is not physically presented at the time that the payment is effected, e.g., through payment proxy), either through a card reader 606 or by providing a graphical user interface 1008 to accept financial account information of the user 1002A initiating the payment. A payment card transaction may be any transaction where a merchant or a buyer uses a payment card to purchase a product or service offered by the merchant, for example, by swiping a user's credit card through a magnetic rails or chip contacts 1006 or by providing the information through voice, text, or other wired or wireless data communication techniques. The term "swipe" here refers to any manner of triggering a magnetic rails or chip contacts 1006 to read data from a payment card, such as by passing a card into or through a magnetic stripe card reader, optical scanner, smartcard (card with an embedded IC chip) reader (e.g., an EMV-compliant card reader or NFC enabled reader), radio frequency identification (RFID) reader, or the like. The magnetic rails or chip contacts are integrated within the payment object reader 1000 (as shown) or connected externally with the PPS controller 1000 and/or client(s) 1002B as peripheral devices 1010. If the card reader 1006 is connected externally, the peripheral devices 1010 may be connected via wired or wireless communication network 1004 and interact to each other through customized interfaces. In one implementation, the payment object reader 1000 can be connected to an audio plug of another device, such as the POS terminal. If the payment object reader 1000 is integrated within the POS terminal, the one or more interfaces and components can be configured to accept payment data through various communication protocols. Accordingly, hardware implementation may include creation of slots, magnetic tracks, and rails with one or more sensors to facilitate a user 1002A, e.g., a merchant, to detect and accept a payment card. In one implementation, the payment card and the peripheral devices 606 may support the same technology for short-range (typically less than 100 meters) and/or low power wireless communication protocols and technologies, such as Bluetooth Low Energy (BLE), standard Bluetooth, WiFi, Near Field Communication (NFC) or Radio-Frequency Identification (RFID). According to the communication protocol preferred or implemented, the payment object reader 1000 may require additional steps to configure the rails or chip contacts 1006 to operate and work alongside the payment object reader 1000. For example, a pairing component (described later) may be used to connect, synchronize, and pair various devices to facilitate exchange of data obtained off the payment card.

The term 'payment card' or 'payment object' refers to a payment mechanism that includes a conventional debit card, a conventional credit card, a prepaid gift card, or the like, a smartcard that has an embedded integrated circuit chip (e.g., Europay-MasterCard-visa (EMV) card), a proxy card, or any card that functions as a combination of any of these mechanisms. The term "proxy card" as used herein refers to a card that may or may not have a card number/account number that appears to be that of a real credit or debit card account (i.e., it is in the correct format), but where that card/account number is actually only a proxy for the buyer's real card/account number. The card/account number generally adheres to a naming standard set by the financial institution associated with or issuing the payment card. Other examples of payment card may also include a prepaid card, a gift card, a rewards card, a loyalty points card, a frequent flyer miles card, a check, cash, or any other kind of payment instrument that holds financial value or provides a promise to pay at a later time.

The payment card used in the example above is one type of a financial instrument. Other types of financial instruments, other than the payment card, can be used to initiate the transfer of funds. Another example of a financial instrument is a biometrically identifiable instrument, such as a person's finger (e.g., for fingerprint recognition), face, iris or retina, heartbeat, voice pattern, genetic parameter unique to the user, etc. Alternatively, a financial instrument can be a software instrument or virtual instrument, such as a virtual wallet, optionally embedded in a hardware device to enable contact or contactless payments.

Payment Object Reader Architecture

In one implementation, the payment object reader 1000 may be based on computer systems that may comprise, but are not limited to, PPS units 1012 and memory 1014. Furthermore, PPS units can comprise hardware and/or software components, referred to as PPS units 1012, which may comprise a central processing unit ("CPU(s)" and/or "processor(s) and/or microprocessor(s)" (these terms are used interchangeably)) 1016 and an interface bus 1018, which may be interconnected and/or communicating through a system bus 1020 on one or more motherboard(s) having conductive and/or otherwise communicative pathways through which instructions (e.g., binary encoded signals) may travel to enable communications, operations, storage, etc. The interface bus 1018 may also include other interfaces or adapters specific to network, storage, peripherals, and input-output interface(s), through which data may pass into and out of a computer and which allow users to access and operate various system components. The interface bus 1018 may be connected to external units, such as peripheral devices 1010 or client(s) 1002B via communication network 1004. Each of the exemplary components 1012 is now described in detail.

Processor(s)

The CPU 1016 may incorporate various specialized processing units, such as, but not limited to: integrated system (bus) controllers, memory management control units, floating point units, and even specialized processing sub-units like graphics processing units, digital signal processing units, and/or the like. In various embodiments, the processor core may be a low-power/ultra-low power/low-cost microcontroller; examples include an Intel Processor like Intel Atom, Apple A4, NVidia Tegra 2, Marvell Armada, Qualcomm Snapdragon, Samsung Hummingbird and Exynos, Tex. Instruments OMAP and MSP microcontroller, ARM Holdings processor like the Cortex-A, -M -R, Series, or ARM series and/or the like processor(s). Should processing requirements dictate a greater amount speed and/or capacity, distributed processors (e.g., Distributed payment object reader 1000), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the payment object reader 1000 may be achieved by implementing a microcontroller, such as Freescale's Kinetis K21D; and/or the like. Also, to implement certain features of the payment object reader 1000, some feature implementations may rely on embedded components, such as: Application-Specific Integrated Circuit ("ASIC"), Digital Signal Processing ("DSP"), Field Programmable Gate Array ("FPGA"), and/or the like embedded technology. Depending on the particular implementation, the embedded components may include software solutions, hardware solutions, and/or some combination of both hardware/software solutions.

Interface Bus and Adapters

Interface bus(ses) 1018 may accept, connect, and/or communicate to a number of interface adapters, although not necessarily in the form of adapter cards, such as but not limited to: input-output interfaces (I/O) 1022, storage interfaces 1024, network interfaces 1026, and/or the like. Optionally, cryptographic processor interfaces 1028 may be connected to the interface bus 1018.

Storage interfaces 1024 may accept, communicate, and/or connect to a number of storage devices such as, but not limited to: storage devices 1030, removable disc devices, and/or the like. Storage interfaces 1024 may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), fiber channel, Small Computer Systems Interface (SCSI), Universal Serial Bus (USB), and/or the like.

Input-Output interfaces (I/O) 1022 may accept, communicate, and/or connect to user input devices 1005, peripheral devices 1010, such as externally connected card readers, cryptographic processor devices 1031, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); USB 2.0; USB 3.1; USB Type C; Ethernet; infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, Li-Fi etc.); and/or the like. In various embodiments, an audio or video display with a touch screen and driver may be included, the touch screen being based upon a variety of later-developed or current touch screen technology including resistive displays, capacitive displays, optical sensor displays, electromagnetic resonance, or the like. Additionally, touch screen display may include single touch or multiple-touch sensing capability. Any display technology may be used for the output display, such as a Liquid Crystal Display (LCD) or solid state device such as light-emitting diode (LED) or organic light-emitting diode (OLED), Plasma display, trans-reflective (Pixel Qi) display, electronic ink display (e.g. electrophoretic, electrowetting, interferometric modulating). In various embodiments, the resolution of such displays and the resolution of such touch sensors may be set based upon engineering or non-engineering factors (e.g. sales, marketing). In some embodiments, speakers and LED indicators can be used to present audio and visual identifiers of transaction and device status. In addition, buttons may be configured to power Payment object reader 1000 on or off, operate the controller or reset the controller 600.

In some embodiments of the payment object reader 1000, image capture device may be included, which may further include a sensor, driver, lens and the like. The sensor may be based upon any later-developed or convention sensor technology, such as CMOS, CCD, or the like. Image recognition components may be provided to process the image data. For example, such components can support functionalities including, but not limited to, barcode detection, facial recognition, camera parameter control, etc.

Network interface(s) 1026 may be regarded as a specialized form of an input-output interface. One or more network interfaces 1026 may be used to engage with various communications network types 1004. For example, multiple network interfaces may be employed to allow for the communication over broadcast, multicast, and/or unicast networks. Through a communications network 1004, the PPS controller 1000 is accessible through remote clients 1002B (e.g., computers with web browsers) by users 1002A. Network interfaces 1026 may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed PPS architectures may similarly be employed to pool, load balance, and/or otherwise increase the communicative bandwidth required by the payment object reader 1000.

In some implementations, the network interfaces 1026 may be communicatively coupled to hardware components, which facilitate detection of payment cards. For example, the network interfaces 1026 may couple to a payment card slot or rail designed to accept payment cards through swipe or insertion or any other action. In another example, the network interfaces 1026 may couple to one or more sensors included to detect presence of payment card or a tap of the payment card onto a surface of the payment object reader 1000.

In various embodiments, the network interface 1026 may also support wireless data transfers between the Payment object reader 1000 and external sources, such as clients 602B and cameras, or the like. Wireless protocols may include Wi-Fi (e.g. IEEE 802.11a/b/g/n, WiMax), Bluetooth or Bluetooth low energy (BLE); infrared, and the like, through BLE interface, WiFi interface, QR interface, NFC interface, EMV interface, cellular technology interface, and other interface(s), described subsequently.

According to one implementation, BLE interface ("BLE") 1032 is configured to work on Bluetooth® or BLE® protocol to facilitate communication with a BLE transceiver installed on other devices. In one implementation, BLE is intended for low-power and low-latency applications for wireless devices within a short range, such as up to about 50 meters. BLE interface 1032 may be used in applications requiring intermittent communications, smaller amounts of data transfer and bandwidths, and/or low duty cycles. BLE interface 1032 can be configured to use only a fraction of the power as compared to other interfaces. In many cases, BLE interface 1032 may be able to operate more than a year on the power source without charging.

BLE interface 1032 is capable of being paired with a peripheral device, such as another reader, a payment card, or a client 1002B associated with a user 1002A, thus allowing the payment object reader 1000 to (a) serve as a "beacon" and broadcast data and/or (b) become a relay point between the payment object reader 1000 and payment card, card reader 1006 or a client 1002B serving as a point of sale terminal for a merchant. The BLE interface 1032 allows the controller 1000 with BLE interface 1032 can be placed at merchant locations, museums, ski resorts, state parks, entertainment venues, parking garages, etc.

As defined herein, a beacon is a short range communication device having a known or fixed location that provides a signal that can be detected by mobile devices within proximity of the beacon. For example, BLE interface 1032 can transmit a radio frequency (RF) signal that includes its position coordinates (e.g., latitude, longitude), which can be detected by a mobile device. Alternatively, BLE interface 1032 can transmit other data, such as payment proxy related to the financial account information of the user 1002B.

The payment object reader 1000 BLE beacon allows for constant, scheduled or random scanning of other Bluetooth peripherals and devices. In one implementation, a component, such as BLE interface component, within the Payment object reader 1000 and/or the client 1002B can be set to run in the background under a BLE protocol, persistently, intermittently or on activation monitoring for a significant change in location and/or presence of an appropriate BLE peripheral or beacon at a merchant or vendor location. BLE beacon also allows for persistent or intermittent transmission of data. For example, BLE beacon may persistently transmit or receive information related to payment proxy associated with the client 1002B or payment object reader 1000.

When the owner or user of the client 1002B or payment card enters a store having payment object reader 1000 as a point of sale terminal, he or she would get in the BLE network radius of the payment object reader 1000. Payment object reader 1000 then serves as a bidirectional conduit for the card reader 1006 to communicate with the CPU 1024 collecting or handling the credit card transaction. Along with receiving transaction data or any other data by the BLE interface 1032, the payment object reader 1000 may also encrypt, decrypt, or store the data for future processing. It does these actions in addition to running the payment application itself, which may display items for sale, up-sell based on purchases, allow confirmation of purchases, application of coupons, the ability to provide feedback, etc.

In one implementation, the payment object reader 1000 or the client 1002B may be connected to a BLE peripheral device having BLE interface 1032 functionalities. In some implementations, the payment card may include a chip supporting BLE functionalities. A control logic unit (not shown) may also be included to bridge BLE interface either to ISO 10816 contact interface or ISO 14443 contactless interface to provide for autonomous bi-directional data transfer between paired devices. In one implementation, the payment object reader 1000 is capable of communicating using Bluetooth, and is thus able to pair with a peripheral device 1010 to obtain payment object information from a phone that at least has Bluetooth capabilities. In one implementation, a plurality of BLE peripheral devices may be connected via the BLE protocol, or other communication network, to form a mesh network. Such a mesh network may allow for transfer of data between the peripheral devices, even those that are more than the distance prescribed by the BLE protocol.

Similar to BLE beacons, data can be exchanged using other kind of RF beacons, infrared beacons, cellular communications (CDMA, GSM, LTE, etc.), beacons, pattern generation beacons, such as barcodes, Quick Response (QR) codes, or a radio frequency identifier (RFID) tag. QR code or NFC may have short range but high accuracy; Wi-Fi or Bluetooth may have mid-range and medium accuracy; and cellular may have long-range but low accuracy. In some embodiments, the controller 1000 can receive and permanently store payment information so that the controller 600 acts as a payment object that does not require a payment card or other payment object to be present.

In one example, an NFC interface 1034 ("NFC") can allow for close range communication using standards such as ISO 18092, ISO 21481, TransferJet® protocol and in compliance with FIME certifications. Close range communication with the NFC interface may take place via magnetic field induction, allowing an NFC interface chip 634 to communicate with other NFC devices or to retrieve information from tags having RFID circuitry via the NFC interface. In instances where it is desired to read an NFC enabled payment object, or an NFC enabled payment object is determined to be in proximity to the CPU 1016 may be configured to drive antenna 1045 via a driving circuit (not shown) to induce a magnetic field capable of being modulated by the NFC enabled payment object. From here, the modulated magnetic field signal may be converted into a digital signal that CPU 1016 can interpret via the NFC component 10102. On the other hand, when it is desired to transmit data via antenna 1045, CPU 1016 may be configured to disable the driving circuit and transmit data using the NFC protocol by instructing a NFC modulator (not shown) to modulate the magnetic field to which antenna 1045 is operatively coupled. In some embodiments, there can be a switch within the NFC modulator to turn on or off the load applied to the antenna 1045. The switch can be under the control of the CPU 1016. In some embodiments the antenna 1045 can drift from a desired frequency (become detuned). This can be the result of a metal object being in the proximity of device 1010 or reader 1000. The monitor circuit (not shown) can monitor the frequency of the antenna 1045, and determine when the frequency of the antenna 1045 has drifted away from the desired frequency. When the it is determined that the NFC antenna 1045 is out of tune, NFC antenna monitor circuit can work in concert with the CPU 1016 to vary one or parameters such as capacitance, voltage, or impendence of the antenna 1045 to tune the NFC antenna 1045. The antenna 1045 along with transmitter-receiver 1044 is configured to detect characteristics, such as radiated performance, radiated signal strength, frequencies, etc., via radio communication protocol.

In another example, an EMV interface 1036 ("EMV") can allow the payment object reader 1000 to accept Chip and PIN cards follow technical standards more formally known as EMV, after Europay, MasterCard and Visa (EMV). In one implementation, the EMV interface complies with EMV's Level 1, Level 2 and Level 3 certifications. In some instances, CPU 1016 receives payment data read by the EMV interface 1036 via the card contacts (not shown), or alternatively from a magnetic stripe reader reading payment data from a magnetic stripe card. The payment data received at the CPU 1016 is stored, either temporarily or permanently, in memory 1014 of the reader 1000. The payment data stored in memory can then be transmitted via the NFC antenna 1018. The network interfaces 1026 may work in conjunction with components explained later.

In other implementations, a plurality of beacon technologies may be used based on specific accuracy or power requirements. Such technologies may be combined based on weight or some other relationship. In yet another implementation, selections may be made based on user preference or availability of the beacon technology at that time. For example, the reader 1000 may be configured to provide and detect a plurality of beacons. For example, if a camera is on, a QR code on the client 1002B display may be read, for example to pair two payment devices. If only cellular is on, a modem may detect a femtocell may be nearby. The client 1002B, such as a merchant's register or point of sale terminal, may combine data from the multiple beacons and use such data for analysis of transactions over a course of time. For example, the buyer device 1002B may be configured to use Wi-Fi RSSI/RTT and BT RSSI/RTT measurements from a first beacon, QR code value from a second beacon, and WiFi RSSI and cellular measurements from a third beacon for accurately identifying and establishing secured connections with the buyer device 1002B.

The beacons can be dynamic with data and other beacon parameters changing as per environment or the type of device pairing with the reader 1000; in other implementations, the beacons can be static and displayed using LED displays, electronic displays, or the like, described with reference to I/O interface.

In one embodiment, the Payment object reader 1000 may also be connected to and/or communicate with entities such as, but not limited to: one or more users, for example users 602A, associated with user input devices 1005; one or more users 602A through their respective buyer devices 1002B; peripheral devices 1010; an internal or external cryptographic processor device 1031; and/or a communications network 1004.

Communications Network

The network 1004 can include any combination of local area and/or wide area networks, using both wired and wireless communication systems. In some embodiments, the network 1004 uses standard communications technologies and/or protocols. Thus, the network 1004 can include links using technologies such as Ethernet, 802.11, a Wi-Fi, a Bluetooth network; and/or the like worldwide interoperability for microwave access (WiMAX), 3G, 4G, CDMA, digital subscriber line (DSL), etc. Similarly, the networking protocols used on the network 608 may include multiprotocol label switching (MPLS), transmission control protocol/Internet protocol (TCP/IP), hypertext transport protocol (HTTP), and/or file transfer protocol (FTP). Data exchanged over the network 1008 can be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec). Additionally, the communication network may be a mesh network. For example, in a wireless local area network (WLAN), network devices may be configured to receive and forward communications which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP.

Clock

Clock 1038 may have a crystal oscillator that generates a base signal through the reader's circuit pathways. The clock 1038 may be coupled to the system bus 1020 and various clock multipliers that increase or decrease the base operating frequency for other components interconnected in the Payment object reader 1000.

Power Source

The units 1012 may also include a power source 1040. The power source 640 may be of any form capable of powering small electronic circuit board devices such as the following power cells or batteries: alkaline, lithium hydride, lithium ion, lithium polymer, nickel cadmium, solar cells, and/or the like. Other types of AC or DC power sources may be used as well. The power source 1040 is connected to at least one of the interconnected subsequent components of the Payment object reader 1000 thereby providing an electric current to all subsequent components. In one example, the power source 1040 is connected to the system bus 1004. In an alternative embodiment, an outside power source 1040 is provided through a connection across the I/O 1022 interface. For example, a USB connection can carry both data and power across the connection and is therefore a suitable source of power. To this end, coupled to power source 1040 may be a USB micro interface (not shown) configured to receive a USB micro jack, although other types of connectors are anticipated. In certain embodiments, connection of a jack to USB micro interface can activate a switch within power source 1040 to override power supplied by the battery. This allows for battery power to be conserved for situations where external power cannot be provided. Furthermore, power source 1040 may also include a battery charger to allow the battery to be charged when external power is supplied via USB micro interface.

In one implementation, the power source 1040 may include a selector (not shown) to selectively power one or more units within the payment object reader 1000. For example, the power source 1040 may power the BLE network interface and BLE component and power the CPU 1016 only on receiving a wake up signal, using an activation signal, triggered by a tactile, visual, or audio input. To this end, the payment object reader 1000 may include wake-up electronics (not shown) configured to wake-up the payment object reader 1000 from a low-power state to an active state in response to detection of a payment object. In some embodiments, wake-up electronics can also power down payment object reader 1000 to a low-power state after a predetermined amount of time or after completion of a communication.

Cryptographic Processor

A cryptographic processor 1042 and/or transceivers (e.g., ICs) 644 may be connected to the system bus 1020. In another embodiment, the cryptographic processor and/or transceivers may be connected as either internal and/or external peripheral devices 1010 via the I/O interface bus 1022. To this end, the transceivers 644 may be connected to antenna(s) 1045, thereby enabling wireless transmission and reception of various communication and/or sensor protocols. For example the antenna(s) may connect to a transceiver chip or a wireless microcontroller targeting Bluetooth applications, e.g., providing 802.11n, Bluetooth 4.2, Bluetooth 2.1+EDR, FM, GSM/EDGE/GPRS/2G/3 G/HSDPA/HSUPA/LTE (4G) communications, global positioning system (GPS) thereby allowing payment object reader 1000 to determine its location, for example. A separate GPS unit 1046 (also referred to as the location component) may be used to determine the location of a merchant or buyer performing a payment transaction using a payment card. The GPS unit may work on any of the protocols mentioned above. The location information may be used to advertise location specific information to the user.

Furthermore, the communicative instructions may be stored and/or transmitted in batches (e.g., batches of instructions) as programs and/or data components to facilitate desired operations.

Peripheral Devices

Peripheral devices 1010 may be connected and/or communicate to I/O interface 1022 and/or other facilities of the like such as network interfaces, storage interfaces, directly to the interface bus 1018, system bus, the CPU, and/or the like. Peripheral devices 1010 may be external, internal and/or part of the Payment object reader 1000. Peripheral devices 1010 may include: antenna, audio devices (e.g., line-in, line-out, microphone input, speakers, etc.), cameras (e.g., still, video, webcam, etc.), dongles (e.g., for ensuring secure transactions with a digital signature, and/or the like), external processors (for added capabilities; e.g., crypto devices 1031), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like.

The card reader 1000 may comprise user interfaces, such as, for example, a PC/SC EMV L1/L2/NFC certified Smart Card Reader, a keypad for PIN entry, such as key keypad, a display, such as the illustrated LCD display, etc., and electrical interfaces, an interface for back-up battery power, an interface for a display, a power interface, LED lights for indicating status of a transaction, a buzzer, etc. The card reader may be, for example, PCI v3 compliant and configured to facilitate the acceptance of credit/debit card payments.

A sensor 1090 may be included. In some embodiments, the sensor 1090 may include accelerometers, antenna decouplers, signal generator, signal modification and conditioning components to detect certain characteristics of neighboring devices. The characteristics are generally physical, mechanical or design related. The sensor 1090 is also capable of sending and receiving signals or test parameters, the parameters are then compared internally to determine whether the values correspond to a known device.

Peripheral devices 1010 may also include sensors, devices, and subsystems can be coupled to network interface to facilitate multiple functionalities. For example, motion sensor, magnetic, light sensor, and proximity sensor can be coupled to network interface to facilitate orientation, detection, lighting, and proximity functions of the payment object reader 1000, by analyzing any input, such as audio, visual, tactile, mechanical, electrical, magnetic, hydraulic, electromagnetic input, and the like. Location processor (e.g., GPS receiver similar to GPS 646) can be connected to the network interface to provide geo-positioning. Motion sensor can include one or more accelerometers configured to determine change of speed and direction of movement of the payment object reader 1000. Magnetic sensors may detect presence or absence of a payment card and differentiate a payment card from other cards.

Peripheral devices 1010 may also include a camera subsystem and an optical sensor, e.g., a charged coupled device (CCD) or a complementary metal-oxide semiconductor (CMOS) optical sensor, can be utilized to facilitate camera functions, such as recording photographs and video clips.

Peripheral devices 1010 may also include an audio subsystem can be coupled to a speaker and a microphone to facilitate voice-enabled functions, such as voice recognition, voice replication, digital recording, and telephony functions. Audio subsystem can be configured to receive voice commands from the user.

Peripheral devices 1010 may also include an I/O subsystem that can include touch surface controller and/or other input controller(s). Touch surface controller can be coupled to a touch surface or pad. Touch surface and touch surface controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface. Touch surface can include, for example, a touch screen.

Other input controller(s) can be coupled to other input/control devices, such as one or more buttons, rocker switches, thumb-wheel, infrared port, USB port, and/or a pointer device such as a stylus. The one or more buttons (not shown) can include an up/down button for volume control of speaker and/or microphone.

In one implementation, a pressing of the button for a first duration may disengage a lock of the touch surface; and a pressing of the button for a second duration that is longer than the first duration may turn power to PPS controller 100 on or off. The user may be able to customize a functionality of one or more of the buttons. The touch surface can, for example, also be used to implement virtual or soft buttons and/or a keyboard. The touch surface may also activate the PPS controller to actively relay information. At all other times, the reader 1000 may be dormant to conserve power.

User input devices 1005 often are a type of peripheral device 1010 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like. The card readers, as mentioned before, may be configured to read a variety of payment cards. Such card readers may either be dongle like or puck style.

Cryptographic units such as, but not limited to, microcontrollers, processors 1016, interfaces 1018, and/or devices 1031 may be attached, and/or communicate with the payment object reader 1000. Cryptographic units support the authentication of communications from interacting agents, as well as allowing for anonymous transactions. Cryptographic units may also be configured as part of the CPU.

It should be noted that although user input devices 1005 and peripheral devices 1010 may be employed, the payment object reader 1000 may be embodied as an embedded, dedicated, and/or monitor-less (i.e., headless) device(s), wherein access would be provided over a network interface connection. Additionally, part or all peripheral devices may be integrated within the payment object reader 1000.

Memory

Memory 1014 may further include, but is not limited to, one or more components 1048 that include programs that supplement applications or functions performed by the Payment object reader 1000, database 1050, operating system 1052, random access memory (RAM) 1054, read only memory (ROM) 1056, and storage device 1030, etc., into which data may be saved that serves, amongst other things, as repository for storing data pertinent to functioning of the components.

The payment object reader 1000 may employ various forms of memory 614, such as ROM 1054, and a storage device 1030. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like.

PPS Components

The memory 1014 may contain a collection of program and/or database components and/or data such as, but not limited to: operating system component(s) 1052 (operating system); information server component(s) 1058 (information server); user interface component(s) 1008 (user interface); Web browser component(s) 1060 (Web browser); database(s) 1050; cryptographic server component(s) 1062 (cryptographic server); the component(s) 1048; and/or the like (i.e., collectively a component collection). These components 1048 may be stored and accessed from the storage devices and/or from storage devices accessible through an interface bus 1018.

Operating System

The operating system component 1052 is an executable program component facilitating the operation of the payment object reader 1000. The operating system can facilitate access of I/O, network interfaces, peripheral devices, storage devices, and/or the like. In various embodiments, any number of current or future operating systems may be supported such as: any highly fault tolerant, scalable, portable, ROM-able, real-time, deterministic, multitasking and secure kernels systems, e.g., μC/OS-III, μC/OS-III, Apple Macintosh OS X (Server); Unix and Unix-like system distributions; Linux distributions; limited and/or less secure operating systems, e.g., AppleMacintoshOS, MicrosoftWindows XP, Windows Server2003, Windows Server 2008, Windows Server2012, Windows Vista®, Windows 10, and Windows 8, Blackberry OS (e.g., Blackberry 10), Firefox OS, Sailfish OS, Tizen, Ubuntu Touch OS, Chrome OS, iPhone OS (e.g. iOS), WindowsMobile (e.g. Windows 10 Mobile), Google Android (e.g. Lollipop 5.1); and/or the like. In various embodiments of the present subject matter, the operating system may be a multi-threaded multi-tasking operating system. Accordingly, inputs and/or outputs from and to a display and inputs/or outputs to physical sensors may be processed in parallel processing threads. In other embodiments, such events or outputs may be processed serially, or the like. Inputs and outputs from other functional blocks may also be processed in parallel or serially, in other embodiments, such as image acquisition device and physical sensors.

The operating system 1052 may provide communications protocols that allow the payment object reader 1000 to communicate with other entities through a communications network 1013. Various communication protocols may be used by the payment object reader 1000 as a subcarrier transport mechanism for interaction, such as, but not limited to: multicast, TCP/IP, UDP, unicast, and/or the like.

Information Server

The information server 1058 may: support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols; provide results in the form of Web pages to Web browsers; and allows for the manipulated generation of the Web pages through interaction with other program components.

Web Browser

A Web browser component 1060 is a stored program component that is executed by a CPU. The Web browser may be a hypertext viewing application such as Google Chrome or Macintosh Safari. Web browsers and like information access tools may be integrated into PDAs, cellular telephones, and/or other mobile devices. Also, in place of a Web browser and information server, a combined application may be developed to perform similar operations of both. The combined application would similarly affect the obtaining and the provision of information to users, user agents, and/or the like from the enabled nodes. The web browser may be coupled to a web server (not shown). In other implementations, the payment object reader 1000 may host a website (hereinafter, "system website") that includes one or more graphical user interfaces (GUIs) for organizing and presenting content to users. For example, through the system website, users create account logins to connect to their social identities (e.g., social profiles or social accounts), read content (e.g., messages, comments, posts), create or post content, communicate in real-time with other users (e.g., chat), and/or otherwise engage or interact with other users of the system website (e.g., "friends," "followers," "social contacts," or other types of social network connections). In some embodiments, the user interactions on the system website lead to internal API communication, which involves the Payment object reader 1000 monitoring the user interactions for an indication of an intent to transfer money, sending, in response to such indication, requests (e.g., POST or GET requests) to the API of the server(s) to query the database(s) 1050, and displaying the data returned by the API of the server(s) as appropriate. The indication of the intent is determined may be based on an identification of a user input, e.g., a string of characters, that has a particular syntax, the syntax being a monetary indicator preceding one or more alphanumeric characters. The user input having the syntax operates as a trigger to send money to a payment proxy represented by the user input.

User Interface

The user interface 1008 may allow for the display, execution, interaction, manipulation, and/or operation of program components and/or system facilities through textual and/or graphical facilities through one or more interaction interface elements, such as check boxes, cursors, menus, scrollers, and windows (collectively and commonly referred to as widgets) to facilitate the access, capabilities, operation, and display of data and computer hardware and operating system resources, and status. Graphical user interfaces (GUIs) 1008 may be used to provide a baseline and means of accessing and displaying information graphically to users. The user interface may also be a graphic user interface as provided by, with, and/or atop operating systems and/or operating environments such as already discussed.

Cryptographic Server

A cryptographic server component 1062 is a stored program component that is executed by a CPU 1016, cryptographic processor 1042, cryptographic processor interface 1028, cryptographic processor device 1031, and/or the like, to enable encryption schemes allowing for the secure transmission of information across a communications network to enable the PPS. components to engage in secure transactions. The cryptographic server 1062 facilitates the secure accessing of resources on the PPS and facilitates the access of secured resources on remote systems; i.e., it may act as a client and/or server of secured resources. Cryptographic processor interfaces 1028 can allow for expedition of encryption and/or decryption requests by the cryptographic component. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Secure Socket Layer (SSL), Secure Hypertext Transfer Protocol (HTTPS), and/or the like. Employing such encryption security protocols, the payment object reader 1000 may encrypt all incoming and/or outgoing communications.

The Payment object reader 1000 may be associated with a secure enclave unit (not shown) that may represent any logic, circuitry, hardware, or other structures for creating and maintaining a secured, protected, or isolated environment, in which an application or other software may run, execute, be loaded, or otherwise be present an information processing system. The secure enclave unit may further include encryption unit (not shown), which may include any logic, circuitry, or other hardware to execute any one or more encryption algorithms and the corresponding decryption algorithms, and may include logic, circuitry, or other hardware shared with another encryption unit in processor. In one embodiment, the secure enclave unit includes the digital signatures, and biometric payment instruments created thereof.

Database

The database component 1050 may be a fault tolerant, relational, scalable, secure database, such as Oracle or Sybase. Alternatively, the database 1050 may be implemented using various data-structures, such as an array, hash, (linked) list, struct, structured text file (e.g., XML), table, and/or the like. Such data-structures may be stored in memory and/or in structured files. In another alternative, an object-oriented database may be used. Also, the database may be implemented as a mix of data structures, objects, and relational structures.

In one embodiment, the database 1050 includes several data tables 1050A-E. A payload table 1050A includes fields such as, but not limited to: payload information, payment parameters, and/or the like. A mapping data table 1050B includes fields such as, but not limited to: mapping tables storing association between the payment objects and devices, digital signatures, or the relationship between payment objects and a plurality of devices, so cluster information. A location data table 1050C includes fields such as, but not limited to: signal strength, and the like. A sensor data table 1050D includes fields such as, but not limited to: payment card detected, payment card received, beacon activated, beacon deactivated, etc. An other data table 1050E includes fields such as, but not limited to: relationship between a communication protocol and component to execute, test sequences, data deletion sequence, and the like.

In one embodiment, specific tables may be created when each of the components are executed. Furthermore, the tables may be stored temporarily or permanently in the database 1050.

Components

The component(s) 1048 is a stored program component that is executed by the CPU 1016. In one embodiment, the PPS component 1048 incorporates any and/or all combinations of the aspects of the payment object reader 1000 that was discussed in the previous figures. As such, the payment object reader 1000 affects accessing, obtaining and the provision of information, services, transactions, and/or the like across various communications networks.

Examples of components include, but are not limited to, Signal Conditioning and Monitoring component(s) 1064, Authentication component(s) 1066, POS component(s) 1068, location component 1070, risk analysis component 1071, Device Detection Component 1072, mapping component(s) 1074, and other component(s) 1076. The signal conditioning and monitoring component 1064 receives data from the device characteristics obtained from the device during registration, and removes noise or other irrelevant parameters. The authentication component 1066 may allow and enable the payment object reader 1000 to authenticate the digital device fingerprints as valid payment instruments or fraudulent customers once the registration is confirmed. The authentication component 1066 configured to associate one or more conditions with the digital device fingerprint, wherein the conditions include at least one of: a time period within which the communication device is accessible to a payee as the valid authentication instrument; a particular payee requesting the payment transaction; a particular category of the merchant requesting the payment transaction; a particular location from where the payer is requesting the payment transaction; a predefined limit of the payment transaction; the identity of the payer making the purchase; and a particular type of goods or services corresponding to the payment transaction.

The POS component 1068 may allow and enable the payment object reader 700 to accept payment object data, e.g., from the credit card or NFC based payment methods, and process or transfer the transaction data to an external server, such as a payment processing system and financial network system, to obtain financial account information of users to fulfill a transaction. The location component(s) 1070 tracks the user's mobile device and the merchant point of sale device to push information based on proximity through for example, short-range communication networks, such as Bluetooth, BLE, and NFC technologies. The API component 1071 allows and enables the payment object reader 1000 to create APIs for functionalities such as determining which protocols or ports are available in proximate devices, which devices are proximate, for creating receipts, associating rewards, recording loyalty points, etc.

The device detection component 1072 generates, sometimes on-the-fly, payloads and detection sequences, for example based on the communication protocol or ports that the mobile device is designed to operate on. The component 1072 also creates a digital signature of the data received from the characteristics and converts it into tokenized information. Not all data is used. For this the component may interact with a communication protocol layer. The device detection component 1072 can also apply a tokenization technique to generate a signature or representation of the imprint in response to the captured fingerprint. It does so in the form of discrete cosine transform (DCT) coefficients, and creates feature vectors. The device detection component 1072 can also apply tokenized pseudo-random numbers (also referred to as hash keys) to the feature vectors to generate the digital signature. A National Institute of Standard and Technology (NIST) compliant True Random Number Generator (TRNG) can generate the pseudo-random numbers.

The device detection component 1072 can encrypt the minutiae sets based on keys generated by a cryptographic unit (not shown). Examples of keys include authentication keys, which include SCP03 master keys (Message Authentication Code Key: MAC, Encryption Key: ENC and Key Encryption Key: KEK, which are 256-bit Advanced Encryption Standard (AES) symmetric keys with associated key derivation data) or Key Agreement Keys (e.g., user server signature verification public key, user server static public key, user static key pair with both public and private key).

The device detection component 1072 can also create the digital signature or an encrypted fingerprint using other schemes, such as fuzzy vault algorithm, a cancelable fuzzy vault scheme based on irreversible hash functions, fingerprint minutiae algorithms based on a thinned fingerprint image as opposed to an original fingerprint image using hash functions, such as hash functions, such as MD, RIPEMD, and SHA.

The mapping component(s) 1074 may allow and enable the payment object reader 1000 to map the digital signatures to financial card information or buyer profiles. The mapping component 1074 may also allow the payment object reader 1000 to generate a dynamic digital signature based on a randomly generated token changing with time of day, merchant location, etc. The other component(s) 1076 may enable and allow processing of data/signals required by the payment object reader 1000. The risk analysis component (also e.g., fraud detection component 722) 1071 determines merchant, customer, object or device profiles corresponding to entry of a payment object, and compares the determined profiles with risk data. This risk data may have been locally stored at an earlier time instant.

The structure and/or operation of any of the payment object reader 1000 components may be combined, consolidated, and/or distributed in any number of ways to facilitate development and/or deployment. To this end, one may integrate the components into a common code base or in a facility that can dynamically load the components on demand in an integrated fashion. The components may be consolidated and/or distributed in countless variations through standard data processing and/or development techniques. Multiple instances of any one of the program components may be instantiated on a single node, and/or across numerous nodes to improve performance through load-balancing and/or data-processing techniques. Furthermore, single instances may also be distributed across multiple controllers and/or storage devices; e.g., databases.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components. The grammar syntax itself may be presented as structured data that is interpreted and/or otherwise used to generate the parsing mechanism. Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

Regarding the process 300, 400, 500, 600, 800, and 900 while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further, any specific numbers noted herein are only examples; alternative implementations can employ differing values or ranges.

While aspects of the described subject matter can be implemented in any number of different systems, circuitries, environments, and/or configurations, the embodiments are described in the context of the following exemplary system(s) and configuration(s). The descriptions and details of well-known components are omitted for simplicity of the description. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof. Some recurring terms are now described. These definitions should not be considered limiting.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, note that the terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

In some implementations, the network(s) may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks may include both wired and/or wireless communication technologies, including Bluetooth®, Bluetooth® low energy, Wi-Fi and cellular communication technologies like worldwide interoperability for microwave access (Wi-MAX), 3G, 4G, CDMA, digital subscriber line (DSL), etc., cloud computing technologies, as well as wired or fiber optic technologies. Additionally, the communication network may be a mesh network. For example, in a wireless local area network (WLAN), network devices may be configured to receive and forward communications which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

The term "component," "module" or "engine" refers broadly to general or specific-purpose hardware, software, or firmware (or any combination thereof) components. Components and engines are typically functional components that can generate useful data or other output using specified input(s). A component or engine may or may not be self-contained. Depending upon implementation-specific or other considerations, the components or engines may be centralized or functionally distributed. An application program (also called an "application") may include one or more components and/or engines, or a component and/or engine can include one or more application programs.

What is claimed is:

1. A computer-implemented method of processing a payment transaction between a buyer and a merchant, the method comprising:
   detecting at least one transaction activity associated with a point-of-sale (POS) device, of the merchant, in an offline mode in response to interaction of a payment object with a payment object reader associated with the POS device, wherein the offline mode prevents network connectivity between the POS device and a payment processing system;
   detecting at least one communication device within a communication range of the payment object reader, wherein the communication range is based on a short-range communication protocol;
   obtaining, by the POS device, at least one device characteristic corresponding to the communication device, wherein the at least one device characteristic is associated with an operational or physical feature of the communication device;
   obtaining, by the POS device and from the payment processing system, risk data including previous payment transactions that satisfied decline criteria;
   determining whether the at least one device characteristic corresponds to the risk data; and
   at least partly in response to determining that the at least one device characteristic corresponds to the risk data, either declining the payment transaction or generating a notification for the merchant to attempt the transaction in an online mode.

2. The method of claim 1, wherein the at least one device characteristic is selected from a group of characteristics including timing parameters, radiated performance, wireless performance, quality of communication links, radio frequency response, transmission measurements, receiver measurements, and engineering tolerances.

3. The method of claim 1, wherein the at least one transaction activity includes at least one of: (a) the payment object being introduced in proximity to the POS device; (b) accessing a payment account associated with the buyer; (c) retrieving a transaction history; (d) approving authenticity of an action; or (e) detecting the payment transaction.

4. The method of claim 1, further comprising:
   establishing a communication channel between the POS device and the communication device on an RF communication protocol to obtain the at least one device characteristic;
   generating a digital device fingerprint based at least in part on the at least one device characteristic and information related to the payment object;
   determining whether the digital device fingerprint is substantially similar to an existing device fingerprint stored in the memory of the POS device, wherein the existing device fingerprint includes an association of a previously obtained device characteristic with information identifying a previously received payment object;
   if the digital device fingerprint is substantially similar to the existing device fingerprint, declining the payment transaction in the offline mode on account of established presence of the communication device; and
   if the digital device fingerprint is not substantially similar to the digital device fingerprint, processing the payment transaction in the offline mode.

5. The method of claim 4, further comprising generating a request to store the digital device fingerprint in the memory if the digital device fingerprint does not exist in the memory, wherein storing enables use of the communication device as an authentication instrument in subsequent payment transactions between the buyer and the merchant.

6. The method of claim 4, wherein establishing the communication channel between the POS device and the communication device includes:
   detecting a list of available communication ports of the communication device; and
   selecting a communication port from amongst the available communication ports for communicating with the communication device.

7. The method of claim 4, further comprising:
   establishing one or more communication channels between a plurality of components within the POS device and the communication device through the selected communication port;

obtaining, by each of the plurality of components, the at least one device characteristic corresponding to the communication device;

generating, by each of the plurality of components, instances of the digital device fingerprint corresponding to the communication device based at least in part on the at least one device characteristic; and comparing the instances of the digital device fingerprint to determine whether the combination and/or order of the instances of the digital device fingerprint match the risk data.

8. The method of claim 1, further comprises:
receiving a notification by an integrated circuit of the payment object, wherein the notification indicates a preliminary authorization of the payment transaction in the offline mode based on pre-stored criteria in the integrated circuit;

obtaining at least one payment identifier associated with the payment object;

generating profiles, wherein the profiles include a merchant profile, a transaction profile, a profile of the communication device, and a customer profile based on the payment identifier;

comparing the profiles with risk data; and generating, based at least in part on the comparing, a final authorization of the payment transaction in the offline mode.

9. The method of claim 1, wherein authorizing further comprises:
detecting another communication device within the communication range of the payment system POS device;

obtaining, from the other communication device, a device characteristic corresponding to the other communication device;

generating a combined device fingerprint based at least in part on the at least one device characteristic obtained from the communication device and in part on the device characteristic obtained from the other communication device; and declining the payment transaction based on the combined device fingerprint.

10. The method of claim 4, wherein if the digital device fingerprint is substantially similar to the existing device fingerprint, further determining whether the existing device fingerprint has associated thereto:
device characteristics from a cluster of communication devices besides the communication device, or
another device profile known to be fraudulent.

11. The method of claim 4, further comprising storing, the digital device fingerprint, within a secure enclave in the POS device, wherein the digital device fingerprint is retrieved from the secure enclave during the payment transaction involving the buyer.

12. The method of claim 1, further including:
receiving a request for fulfillment of the authorized payment transaction on a most proximate POS device in response to a determination of a current geographical location of the communication device and a proximate POS device based on a current geographical location of neighboring POS devices with respect to the communication device;

establishing one or more communication links with the communication device and through the POS device to send a confirmation message to the buyer, the confirmation message including a confirmation link; and sending, to the payment processing system, an indication of buyer engagement with the confirmation link, wherein the buyer engagement includes an additional identifier selected from a group of a buyer name, a buyer address, a buyer email address, a buyer phone number, a social security number, a passcode set at the time of registration of the communication device, and a transaction detail, wherein the transfer of the money transfer amount is authorized in response to the received indication of the buyer engagement.

13. The method of claim 4, further comprising:
storing the digital device fingerprint in the payment processing system; and
using the digital device fingerprint along with the communication device to validate subsequent payment transactions if the current payment transaction is unsuccessful after authorization.

14. The method of claim 1, further comprising sending a request to detect the at least one device characteristic of the communication device for processing the payment transaction upon entry or exit into a geo-fence associated with the POS device.

15. The method of claim 14, further comprising creating one or more conditions to be applied during a final authorization of the payment transaction, wherein the conditions include at least one of: a time period within which the communication device is authorized; a particular merchant requesting the authorization; a particular category of the merchant requesting the authorization; a particular location from where the buyer is requesting the authorization; a total value of the payment transaction; a predefined limit of the authorization; an identity of the buyer making the purchase; or a particular type of goods or services corresponding to the payment transaction.

16. The method of claim 1, further comprising:
generating at least one bloom filter, the at least one bloom filter defining:
a plurality of hash functions; and
an array comprising multiple positions, decline criteria, and representing one or more identifiers of the payment object of the buyer that has previously conducted a transaction with the merchant;

receiving, while the POS device operates in an offline mode, an identifier of the payment instrument of the buyer;

mapping, using the plurality of hash functions, the identifier of the payment object or the communication device of the buyer to the array;

determining a decline criteria for the payment transaction based at least in part on a transaction history between the customer and the merchant;

determining whether the identifier of the payment object or the communication device of the buyer matches respective positions or decline criteria in the array;

responsive to determining a match between the payment object or the communication device of the first buyer and the respective positions in the array, presenting, on the display, an indication that the buyer has previously conducted a transaction with the merchant and an indication that the payment object of the buyer has previously been declined; and responsive to determining that no match exists between the payment object or the communication device of the buyer and at least one position in the array, presenting, on the display, an indication that the buyer has not previously conducted a transaction with the merchant and processing the transaction between the merchant and the buyer.

17. The method of claim 1, wherein the POS device comprises at least one of a POS terminal or the payment object reader.

18. A point-of-sale (POS) device for facilitating an offline payment transaction, the POS device associated with a merchant, the POS device comprising:
a memory; and
a processor configured to execute instructions stored in the memory to perform operations comprising:
detecting one or more devices in a communication range of the POS device in response to a transaction activity, wherein the communication range is based on a wireless communication protocol;
measuring a device characteristic of a communication device associated with a payer, wherein the measuring is in response to a payment object being introduced in proximity to the POS device;
generating, based at least in part on the device characteristic and information associated with the payment object, a digital device fingerprint;
obtaining, from a payment processing system, risk data including data associated with previous payment transactions;
in an offline mode, comparing the digital device fingerprint to the risk data; and
at least partly in response to comparing the digital device fingerprint to the risk data, either declining a payment transaction previously authorized to transfer funds between the payer and the merchant, or generating a notification for the merchant to attempt the payment transaction in an online mode.

19. The POS device of claim 18, wherein the transaction activity includes at least one of: (a) the payment object being introduced in proximity to the payment system; (b) accessing a payment account; (c) retrieving a transaction history; (d) approving authenticity of an action; or (e) detecting the payment transaction.

20. The POS device of claim 18, wherein the operations further comprise:
detecting at least one other communication device within the communication range of the POS device;
establishing a communication channel with the at least one other communication device;
obtaining, from the other communication device, at least one other device characteristic corresponding to the other communication device;
generating a combined digital device fingerprint based at least in part on the device characteristic obtained from the communication device and the at least one other device characteristic obtained from the at least one other communication device; and
authorizing, based at least in part on the combined digital device fingerprint, the payment transaction.

21. The POS device of claim 18, the operations further comprising:
associating one or more conditions with the digital device fingerprint, wherein the conditions include at least one of: a time period within which the communication device is accessible to a payee as a valid authentication instrument; a particular payee requesting the payment transaction; a particular category of the merchant requesting the payment transaction; a particular location from where the payer is requesting the payment transaction; a predefined limit of the payment transaction; an identity of the payer making the purchase; or a particular type of goods or services corresponding to the payment transaction.

22. The POS device of claim 18, wherein the POS device comprises at least one of: a cell phone, an electronic handheld device, a payment object reader, or a POS terminal.

23. The POS device of claim 18, the operations further comprising:
detecting a list of available communication ports of the communication device;
selecting, from amongst the available communication ports, a communication port for communicating with the communication device;
establishing, through the communication port, one or more communication channels between the communication device and a plurality of components within the POS device;
obtaining, by each of the plurality of components, the device characteristic of the communication device;
generating, by each of the plurality of components, instances of the digital device fingerprint corresponding to the communication device based at least in part on the device characteristic; and
corroborate the instances of the digital device fingerprint to determine a relationship of the communication device with the transaction activity.

24. The POS device of claim 18, wherein the device characteristic is selected from a group of characteristics including timing parameters, radiated performance, wireless performance, quality of communication links, radio frequency response, transmission measurements, receiver measurements, and engineering tolerances.

25. The POS device of claim 18, wherein the operations further comprise:
receiving a bloom filter from the payment processing system, the bloom filter containing at least one array corresponding to payment objects and communication devices used in previous transactions with the merchant;
receiving a first payment object identifier of a first payment object for satisfying a cost of a transaction between the payer and the merchant;
determining if a match exists between the first payment object identifier and the at least one array; and
responsive to determining that a match exists between the first payment object identifier and the at least one array, processing the payment transaction between the payer and the merchant.

26. The POS device of claim 25, wherein the bloom filter further comprises an array corresponding to a payer transaction history with the merchant, the payer transaction history comprising one or more of:
a number of transactions made by the payer in one or more previous transactions over a specified amount;
a frequency of payer transactions with the merchant; or
a total value of previous transactions between the payer and the merchant.

27. The POS device of claim 25, wherein the bloom filter includes an array associated with fraudulent transactions, the bloom filter further configured to:
determine if a match exists between the first payment object identifier and the array associated with fraudulent transactions; and
responsive to determining that a match exists between the first payment object identifier and the array associated with fraudulent transactions, refrain from processing the transaction between the payer and the merchant.

28. The POS device of claim 18, wherein the operations further comprise:
   processing transactions in the offline mode and in the online mode; and
   sending information regarding transactions processed in the offline mode to the payment processing system after transitioning from the offline mode to the online mode, the payment processing system configured to update a payer profile and a payee profile in response to receiving the information.

* * * * *